United States Patent
Phillips

(10) Patent No.: US 11,557,888 B2
(45) Date of Patent: Jan. 17, 2023

(54) ADJUSTABLE DEPTH ELECTRICAL WALL MOUNT RING

(71) Applicant: ERICO INTERNATIONAL CORPORATION, Solon, OH (US)

(72) Inventor: Bruce G. Phillips, Gilbert, AZ (US)

(73) Assignee: ERICO International Corporation, Solon, OH (US)

( * ) Notice: Subject to any disclaimer, the term of this patent is extended or adjusted under 35 U.S.C. 154(b) by 406 days.

(21) Appl. No.: 16/790,974

(22) Filed: Feb. 14, 2020

(65) Prior Publication Data

US 2020/0266616 A1    Aug. 20, 2020

Related U.S. Application Data

(60) Provisional application No. 62/805,501, filed on Feb. 14, 2019.

(51) Int. Cl.
| | | |
|---|---|---|
| H02G 3/12 | (2006.01) | |
| H01R 13/74 | (2006.01) | |
| H02G 3/08 | (2006.01) | |

(52) U.S. Cl.
CPC ............ *H02G 3/12* (2013.01); *H01R 13/746* (2013.01); *H02G 3/081* (2013.01); *H02G 3/086* (2013.01); *Y10T 29/49826* (2015.01)

(58) Field of Classification Search
CPC .......... H02G 3/08; H02G 3/081; H02G 3/12; H02G 3/086; H02G 3/10; H01R 13/746; H01R 13/53; H01R 13/533; H01R 13/46; Y10T 29/49826

USPC ............. 174/50, 53, 57, 58, 480, 481; 220/3.2–3.9, 4.02; 248/906
See application file for complete search history.

(56) References Cited

U.S. PATENT DOCUMENTS

| | | |
|---|---|---|
| 740,663 A | 10/1903 | Krantz |
| 916,436 A | 3/1909 | Greenfield |
| 989,854 A | 4/1911 | Kruse |
| 1,024,902 A | 4/1912 | Kronberger |
| 1,038,963 A | 9/1912 | Roe |
| 2,378,861 A | 6/1945 | Peevey |
| 2,989,206 A | 6/1961 | McAfee |
| 3,573,344 A | 4/1971 | Snyder |
| 4,098,423 A | 7/1978 | Marrero |
| 4,634,015 A * | 1/1987 | Taylor ............ H02G 3/121 220/3.7 |
| 5,012,043 A | 4/1991 | Seymour |
| 5,042,673 A | 8/1991 | McShane |

(Continued)

FOREIGN PATENT DOCUMENTS

| | | |
|---|---|---|
| EP | 1039607 A | 1/2002 |
| EP | 1355399 A1 | 10/2003 |

(Continued)

*Primary Examiner* — Angel R Estrada
(74) *Attorney, Agent, or Firm* — Quarles & Brady LLP

(57) ABSTRACT

An adjustable depth electrical wall mount ring can include a base ring and a finishing ring. The base ring can be configured to be attached to a junction box. The finishing ring can be configured to be adjusted relative to a ring portion of the base ring to extend away from the junction box through a wall layer. Adjusting the finishing ring can cause one or more outward extensions on the finishing ring to bear on an exterior surface of a wall layer and thereby urge the junction box towards the wall layer.

20 Claims, 32 Drawing Sheets

(56) References Cited

U.S. PATENT DOCUMENTS

| | | | |
|---|---|---|---|
| 5,117,996 A * | 6/1992 | McShane | H02G 3/121 |
| | | | 220/3.7 |
| 5,223,673 A | 6/1993 | Mason | |
| 5,661,264 A | 8/1997 | Reiker | |
| 5,931,325 A | 8/1999 | Filipov | |
| 5,975,323 A | 11/1999 | Turan | |
| 6,533,225 B1 | 3/2003 | Berges et al. | |
| 6,820,760 B2 | 11/2004 | Wegner et al. | |
| 6,875,922 B1 | 4/2005 | Petak et al. | |
| 6,953,894 B2 * | 10/2005 | Ungerman | H02G 3/086 |
| | | | 174/53 |
| 6,956,171 B1 | 10/2005 | Gretz | |
| 6,965,078 B1 | 11/2005 | Gretz | |
| 7,005,578 B2 | 2/2006 | Gretz | |
| 7,038,131 B1 | 5/2006 | Gretz | |
| 7,045,713 B1 | 5/2006 | Gretz | |
| 7,053,301 B2 | 5/2006 | Johnson | |
| 7,064,271 B1 | 6/2006 | Gretz | |
| 7,083,467 B2 | 8/2006 | Kidman | |
| 7,087,837 B1 | 8/2006 | Gretz | |
| 7,115,820 B1 | 10/2006 | Gretz | |
| 7,151,219 B1 | 12/2006 | Gretz | |
| 7,166,801 B1 | 1/2007 | Gretz | |
| 7,176,377 B1 | 2/2007 | Gretz | |
| 7,235,739 B2 | 6/2007 | King, Jr. et al. | |
| 7,259,328 B1 | 8/2007 | Gretz | |
| 7,273,982 B1 | 9/2007 | Lalancette | |
| 7,276,661 B2 | 10/2007 | Wegner et al. | |
| 7,294,781 B1 | 11/2007 | Gretz | |
| 7,301,099 B1 | 11/2007 | Korcz | |
| 7,312,396 B1 | 12/2007 | Gorman | |
| 7,378,591 B2 | 5/2008 | Dinh | |
| 7,410,072 B2 | 8/2008 | Wegner et al. | |
| 7,414,193 B1 | 8/2008 | Le | |
| 7,435,900 B1 | 10/2008 | Gretz | |
| D579,879 S | 11/2008 | Wegner et al. | |
| 7,449,633 B2 | 11/2008 | Lalancette | |
| 7,468,486 B2 | 12/2008 | Yan | |
| D584,236 S | 1/2009 | Wegner et al. | |
| 7,476,806 B2 | 1/2009 | Dinh | |
| 7,485,805 B1 | 2/2009 | Gretz | |
| 7,495,170 B2 | 2/2009 | Dinh et al. | |
| 7,518,061 B1 | 4/2009 | Gretz | |
| 7,525,043 B1 | 4/2009 | Gretz | |
| 7,531,743 B2 | 5/2009 | Johnson et al. | |
| 7,541,539 B2 | 6/2009 | Le | |
| 7,563,978 B2 | 7/2009 | Lalancette et al. | |
| 7,572,977 B2 | 8/2009 | Gorman | |
| 7,637,385 B2 | 12/2009 | Wegner et al. | |
| 7,645,936 B2 | 1/2010 | Magno, Jr. | |
| 7,718,893 B2 | 5/2010 | Purves et al. | |
| 7,816,604 B1 | 10/2010 | Gretz | |
| 7,935,886 B2 | 5/2011 | Jafari | |
| 8,013,243 B2 | 9/2011 | Korcz et al. | |
| 8,076,577 B2 | 12/2011 | Mango, Jr. et al. | |
| 8,253,017 B1 | 8/2012 | Cleghorn et al. | |
| 8,269,102 B1 | 9/2012 | Baldwin et al. | |
| 8,288,650 B1 | 10/2012 | Baldwin et al. | |
| 8,536,452 B2 | 9/2013 | Jafari | |
| RE44,546 E | 10/2013 | Gorman | |
| 8,575,484 B1 | 11/2013 | Witherbee | |
| 8,633,384 B1 | 1/2014 | Shotey et al. | |
| 8,658,894 B1 | 2/2014 | Witherbee | |
| 8,710,368 B2 | 4/2014 | Phillips et al. | |
| 8,816,604 B1 | 8/2014 | Cleghorn et al. | |
| 8,899,431 B1 | 12/2014 | Shotey et al. | |
| RE45,430 E | 3/2015 | Gorman | |
| 8,981,217 B1 | 3/2015 | Baldwin et al. | |
| 8,987,593 B2 | 3/2015 | Korcz et al. | |
| 9,048,640 B2 | 6/2015 | Gagne et al. | |
| 9,083,166 B2 | 7/2015 | Gagne et al. | |
| 9,088,143 B2 | 7/2015 | Brey | |
| 9,209,610 B1 | 12/2015 | Dieterle et al. | |
| 9,209,611 B2 | 12/2015 | Gagne et al. | |
| 9,252,579 B2 | 2/2016 | Korcz et al. | |
| 9,362,729 B2 | 6/2016 | Wade et al. | |
| 9,362,730 B2 | 6/2016 | Petak | |
| 9,502,874 B2 | 11/2016 | Gagne et al. | |
| 9,553,438 B2 | 1/2017 | Korcz et al. | |
| 9,608,421 B2 | 3/2017 | Wade et al. | |
| 9,667,053 B2 | 5/2017 | Wurms | |
| 9,787,073 B1 | 10/2017 | Townsend | |
| 9,847,631 B2 | 12/2017 | Shotey et al. | |
| 9,893,503 B2 | 2/2018 | Geno | |
| 10,128,644 B1 | 11/2018 | Gilstrap | |
| 10,177,509 B1 | 1/2019 | Gilstrap | |
| 10,230,229 B2 | 3/2019 | Wurms | |
| 10,263,403 B2 * | 4/2019 | Korcz | H02G 3/126 |
| 10,454,257 B2 | 10/2019 | Gilstrap | |
| 10,700,501 B2 | 6/2020 | Korcz et al. | |
| 10,756,522 B2 | 8/2020 | Losaw | |
| 10,770,875 B2 | 9/2020 | Byrne et al. | |
| 2003/0189043 A1 | 10/2003 | Wegner et al. | |
| 2005/0051546 A1 | 3/2005 | Dinh | |
| 2008/0020632 A1 | 1/2008 | Gorman | |
| 2008/0047729 A1 | 2/2008 | Wegner et al. | |
| 2008/0053698 A1 | 3/2008 | Purves et al. | |
| 2008/0156514 A1 | 7/2008 | Webb | |
| 2009/0020306 A1 | 1/2009 | Purves et al. | |
| 2009/0021895 A1 | 1/2009 | Purves et al. | |
| 2009/0057303 A1 | 3/2009 | Oddsen et al. | |
| 2009/0183891 A1 | 7/2009 | Kramer, Jr. | |
| 2010/0025066 A1 | 2/2010 | De La Borbolla | |
| 2010/0089912 A1 | 4/2010 | Wegner et al. | |
| 2010/0218969 A1 | 9/2010 | Purves et al. | |
| 2010/0252552 A1 | 10/2010 | Nikayin et al. | |
| 2012/0186871 A1 | 7/2012 | Roberts | |
| 2012/0247803 A1 | 10/2012 | Purves et al. | |
| 2013/0134270 A1 | 5/2013 | Gagne et al. | |
| 2014/0202758 A1 | 7/2014 | Lolachi | |
| 2014/0345933 A1 | 11/2014 | Purves et al. | |
| 2015/0236490 A1 | 8/2015 | Purves et al. | |
| 2016/0226232 A1 | 8/2016 | Gagne et al. | |
| 2018/0013277 A1 | 1/2018 | Korcz et al. | |
| 2018/0241187 A1 | 8/2018 | Korcz et al. | |
| 2019/0222010 A1 | 7/2019 | Peterson | |
| 2019/0222011 A1 | 7/2019 | Peterson | |
| 2019/0305538 A1 | 10/2019 | Korcz et al. | |
| 2020/0052473 A1 | 2/2020 | Gilstrap | |

FOREIGN PATENT DOCUMENTS

| | | | |
|---|---|---|---|
| EP | 1727254 A2 | 11/2006 | |
| EP | 1848082 B1 | 6/2009 | |
| EP | 1791236 B1 | 11/2009 | |
| EP | 1944846 B1 | 2/2010 | |
| EP | 2519999 A2 | 11/2012 | |
| EP | 2802050 A2 | 12/2014 | |
| EP | 3059817 A1 | 8/2016 | |
| EP | 2106005 B1 | 5/2018 | |
| EP | 3524738 B1 | 8/2019 | |
| EP | 3703207 A1 | 9/2020 | |
| WO | 2011113655 A3 | 10/2012 | |
| WO | 2013028872 A1 | 2/2013 | |
| WO | 2013078543 A1 | 6/2013 | |
| WO | 2013106912 A1 | 7/2013 | |
| WO | 2013134851 A1 | 9/2013 | |
| WO | 2014047716 A9 | 4/2014 | |
| WO | 2016100580 A1 | 6/2016 | |
| WO | 2016196074 A1 | 12/2016 | |
| WO | 2019160876 A1 | 8/2019 | |

* cited by examiner

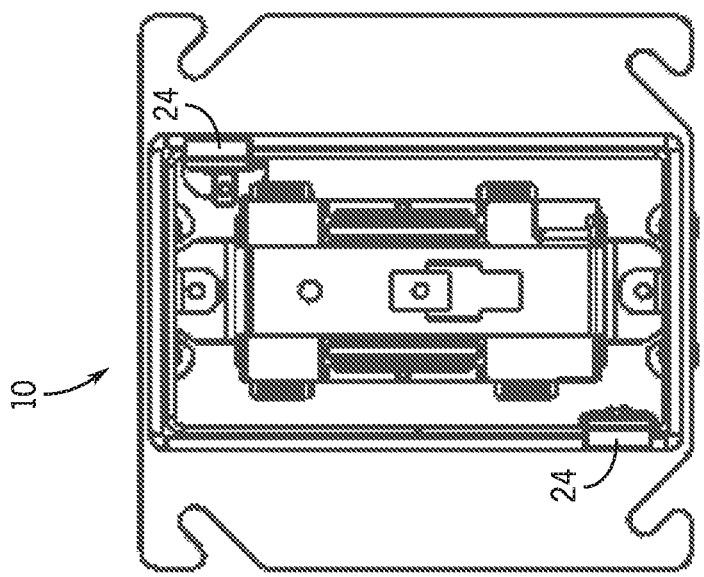
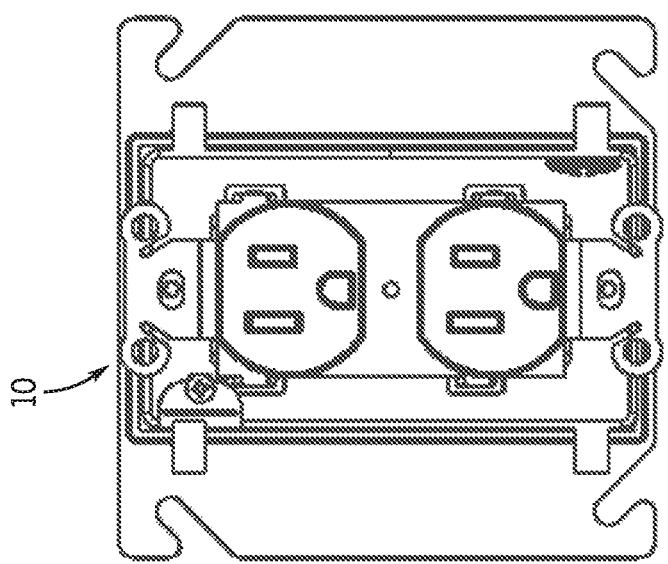
FIG. 3A
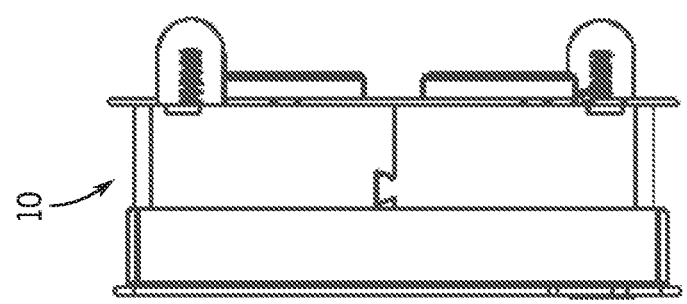
FIG. 3B
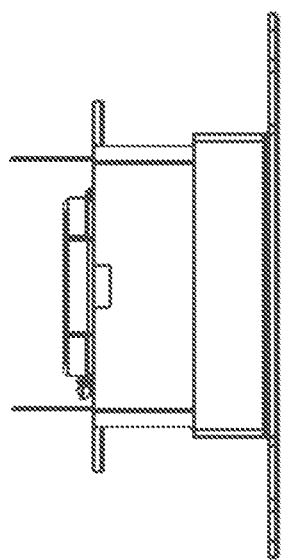
FIG. 3D
FIG. 3C

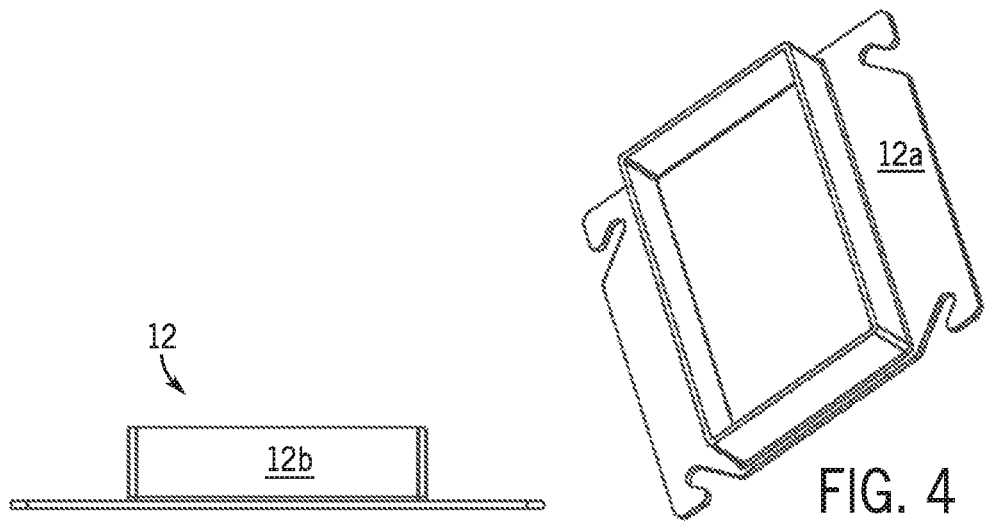
FIG. 4
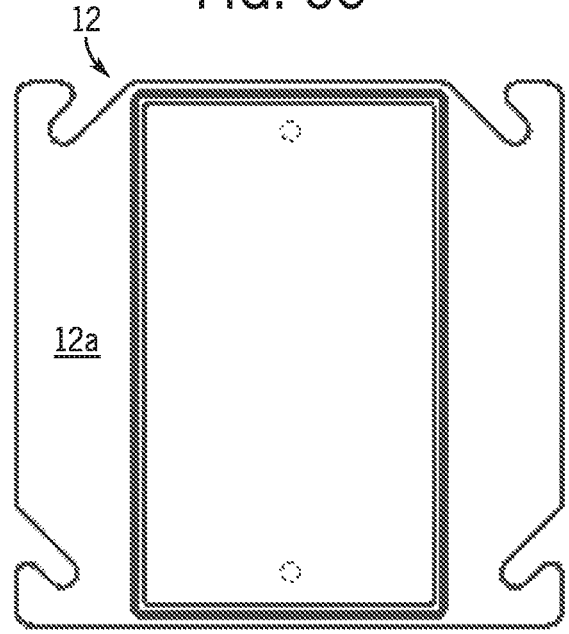
FIG. 5C
FIG. 5A
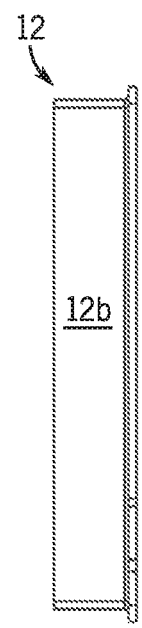
FIG. 5B

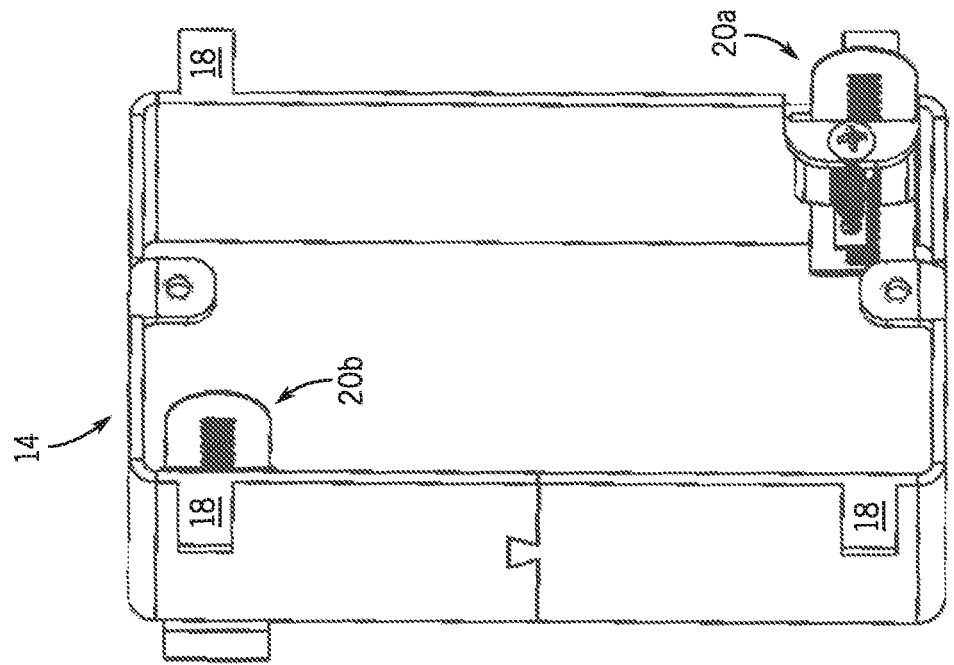
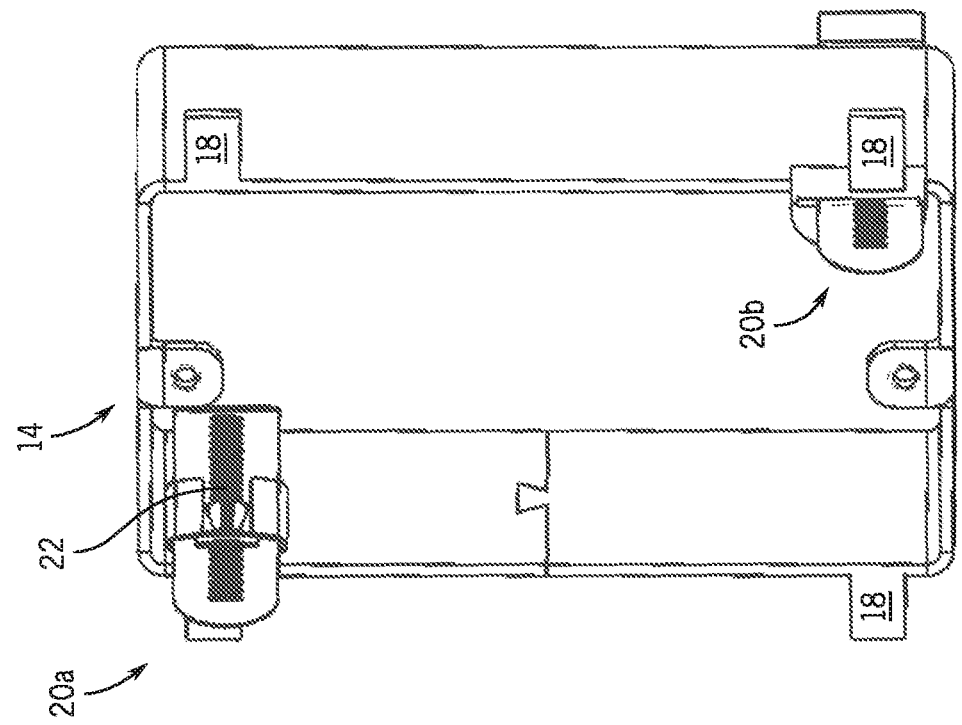

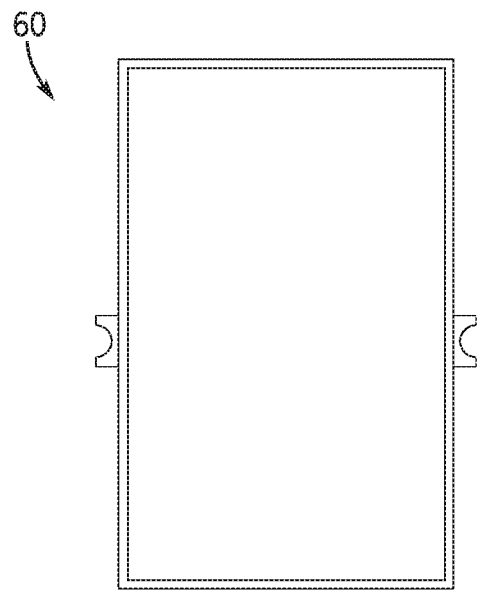 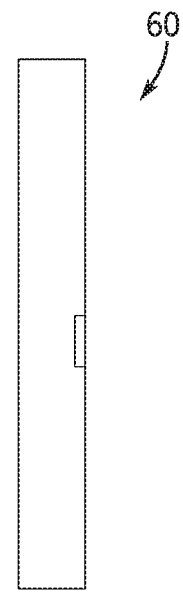
FIG. 15A       FIG. 15B
FIG. 15C
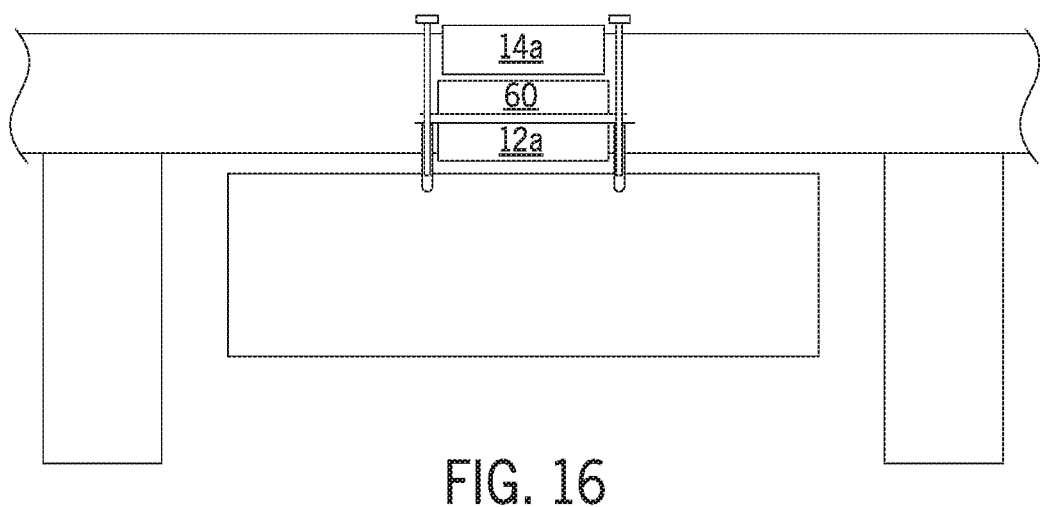
FIG. 16

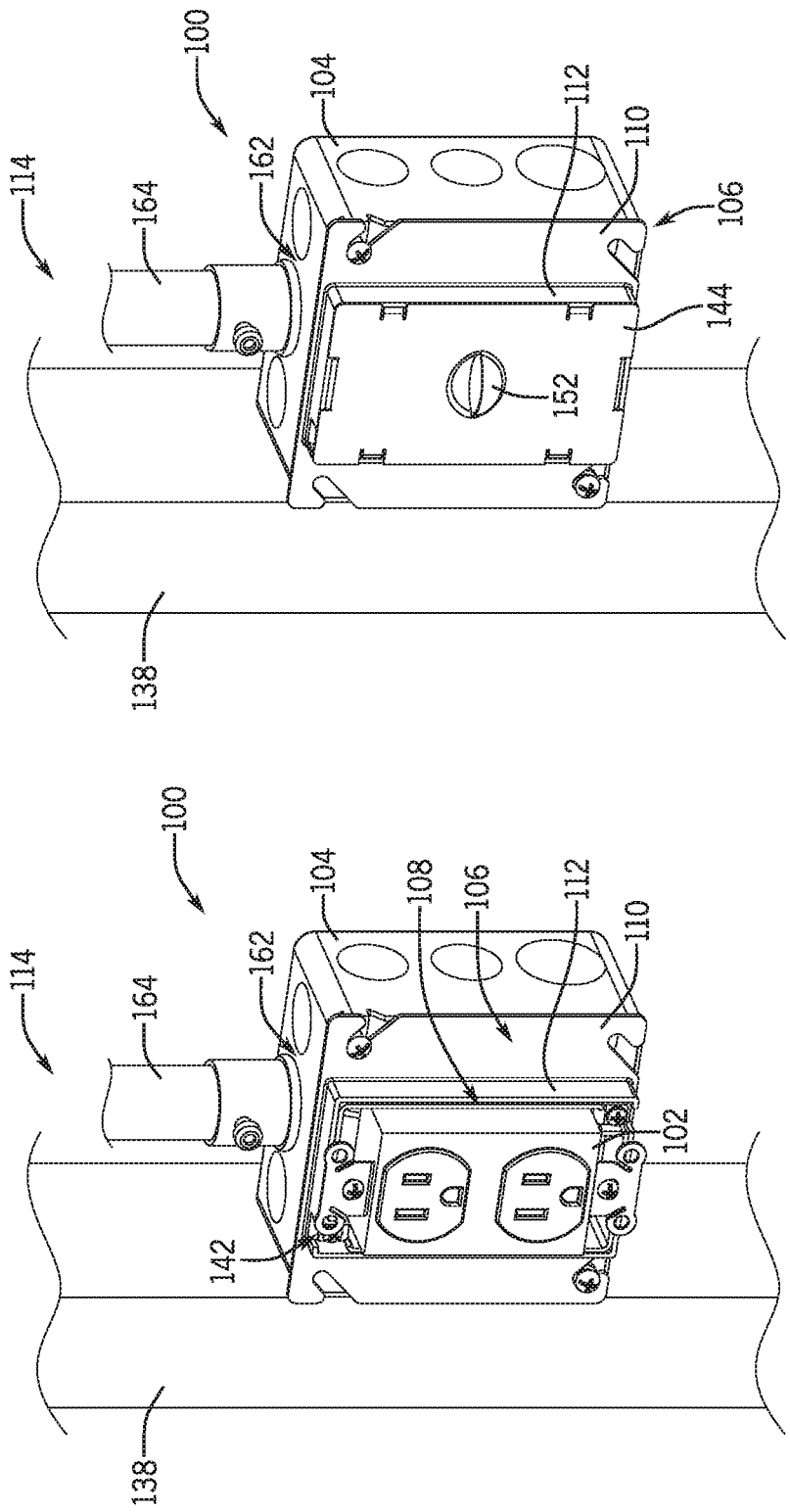

ADJUSTABLE DEPTH ELECTRICAL WALL MOUNT RING

CROSS-REFERENCE TO RELATED APPLICATIONS

This application claims priority under 35 U.S.C 119 from U.S. Provisional Application No. 62/805,501, filed Feb. 14, 2019 and incorporated herein by reference in its entirety.

BACKGROUND OF THE INVENTION

The present invention relates to electrical in-wall wiring, including adjustable depth electrical wall mount rings for wiring operations that use prefabricated assemblies.

Electrical contractors have been accelerating the use of prefabrication (e.g., configuration of electrical assemblies at an off-site facility or otherwise at locations other than an installation location) to install electrical wiring and systems in both residential and commercial applications. Most prominently, prefabrication is being adopted for "in-wall" rough installation typically required for receptacles, switches, lighting and other electrical branch distribution needs.

Traditionally, electrical contractors complete the electrical installation by installing electrical wiring devices such as receptacle and switches after all wall finishes, e.g., painting, wallpapering, tile, etc., have been applied to walls. Devices are installed after wall finish because a device's "yoke" (metal frame) must rest on the outside of the finished wall to support the device so it does not push into the wall when used by the consumer, e.g., by pushing an electrical plug into an electrical receptacle. After the device is installed a finish plate is attached to protect the consumer from internal wiring as well as to improve the aesthetics of the installation.

SUMMARY OF THE INVENTION

Embodiments of the present invention can provide improved devices and methods for installation of electrical devices, including by providing an adjustable depth electrical wall mount ring that can include a base ring and a finishing ring. The base ring can include an attachment portion including mounting holes that allow attachment to a junction box using a standard hole pattern and a first ring portion reaching out from the attachment portion. The finishing ring can include a second ring configured to telescopically slide inside the first ring portion and tabs reaching out from an end of the second ring portion opposite the base ring. Attaching features on opposite sides of the second ring can be configured to attach the finishing ring to the base ring at variable depths of the second ring into the first ring. The attaching features may be catches attached to the finishing ring and straps which engage the catches in a ratcheting fashion and hook onto a rear surface of the base ring, may be screws, or may be push-in fasteners.

Some embodiments of the invention can include an adjustable depth electrical wall mount ring for a junction box and an electrical device, for use with a wall layer. The adjustable depth electrical wall mount ring can include a base ring that includes an attachment portion and a ring portion that extends away from the attachment portion. The base ring can be configured to be secured to the junction box with the ring portion extending away from a front opening of the junction box. A finishing ring can be included that has one or more tabs or other lateral extensions. The finishing ring can be configured to secure the electrical device relative to the junction box and the base ring, and can be sized to be telescopically adjusted relative to the ring portion of the base ring between a retracted configuration and an extended configuration. One or more threaded fasteners or other adjusters can be included that extend between the base ring and the finishing ring. The one or more threaded fasteners or other adjusters can be configured to be actuated to telescopically adjust the finishing ring between the retracted and extended configurations. The one or more tabs or other lateral extensions can be configured to engage an outer surface of the wall layer to urge the junction box towards the finishing ring and the wall layer, or otherwise clamp the wall layer between components of the adjustable depth electrical wall mount ring when the wall mount ring is installed with the finishing ring extending through an opening in the wall layer and the one or more threaded fasteners or other adjusters are actuated to move adjust the finishing ring towards the retracted configuration.

Some embodiments can include a method of configuring an electrical device for installation. The method can include securing a base ring to a junction box, with a ring portion of the base ring extending away from a front opening of the junction box and providing a finishing ring that is sized to slide telescopically within the ring portion of the base ring. The method can further include either of: (a) separately providing a finishing ring assembly and the base ring secured to the junction box, with the finishing ring assembly including the finishing ring with the electrical device secured thereto, so that: the base ring can be configured to be installed in a wall structure prior to installing a wall layer, with the ring portion of the base ring or a cover arranged over the ring portion providing a guide for a first cutting operation to open the wall layer for access to the front opening of the junction box; and the finishing ring can be configured to be installed into and telescopically adjusted relative to the ring portion of the base ring, after the first cutting operation, to align the electrical device with the front opening of the junction box and to cause one or more tabs that are coupled to the finishing ring to bear on an exterior surface of the wall structure and thereby urge the junction box towards the wall layer; and (b) providing a base ring assembly that includes the finishing ring secured to the base ring and the junction box, with the finishing ring in a retracted configuration relative to the ring portion of the base ring, so that: the base ring assembly can be configured to be installed in the wall structure prior to installing the wall layer; the finishing ring can be configured to be telescopically extended relative to the ring portion of the base, after a second cutting operation to open the wall layer for access to the front opening of the junction box, with the ring portion of the base ring or the cover providing a guide for the second cutting operation; and the finishing ring can be configured to be telescopically adjusted towards to the junction box, after being telescopically extended, to cause the one or more tabs to bear on an exterior surface of the wall layer and thereby urge the junction box towards the wall layer.

In some embodiments, the method can further include securing the cover to block the front opening of the junction box so that the wall layer can be installed over the cover. The cover can be configured to be removed after either of the first or second cutting operation to allow installation of the finishing ring into the ring portion of the base ring or installation of an electrical device into the finishing ring, respectively.

In some embodiments, the one or more tabs can be configured to be attached to the finishing ring after the second cutting operation. Additionally, or alternatively, the one or more tabs can be configured to be attached to the finishing ring before the second cutting operation and to be adjusted after telescopically extending the finishing ring relative to the ring portion of the base to extend to bear on the exterior surface of the wall layer.

In some embodiments, the finishing ring can be configured to be telescopically adjusted relative to the ring portion of the base ring by rotating one or more threaded fasteners that extend from the finishing ring to the base ring to cause the finishing ring to move in an axial direction defined by the one or more fasteners.

In some embodiments, the one or more threaded fasteners can be configured to extend from the finishing ring into one or more threaded sleeves within an interior volume of the junction box, and wherein rotation of the one or more threaded fasteners to adjust the finishing ring relative to the ring portion does not extend the one or more threaded fasteners past the one or more threaded sleeves within the junction box.

In some embodiments, the one or more threaded fasteners can electrically bond the finishing ring to the ring portion of the base ring with the finishing ring in the retracted configuration and a fully extended configuration.

In some embodiments, a front lip of the finishing ring can be flush with or retracted past a front lip of the ring portion of the base ring toward the junction box when the finishing ring is in the retracted configuration.

In some embodiments, the finishing ring can extend into the junction box by half or less of a total depth of the finishing ring when the finishing ring is in the retracted configuration. Additionally, or alternatively, the finishing ring can extend into the junction box by one half inch or less when the finishing ring is in the retracted configuration.

In some embodiments, the finishing ring can be configured to be telescopically extended relative to the ring portion, after the first or second cutting operations, to be spaced apart from the ring portion of the base ring in an extension direction.

According to another embodiment, a method of configuring an electrical device for installation can include securing a plate portion of a base ring to a junction box, with a ring portion of the base ring extending away from the a front opening of the junction box. An electrical device can be secured to a finishing ring as part of a finishing ring assembly, the finishing ring can be sized to slide telescopically within the ring portion of the base ring. The finishing ring assembly can be secured to the base ring and the junction box in a single assembly, so that: the single assembly can be configured to be installed in a wall structure prior to installing a wall layer, with the ring portion or a cover for the electrical device providing a guide for a cutting operation to open the a wall layer for access to the front opening of the junction box; and the finishing ring can be configured to be telescopically adjusted relative to the ring portion of the base ring, after the cutting operation: to extend the finishing ring and the electrical device toward an exterior surface of the wall layer; and subsequently, to telescopically adjust the finishing ring towards the junction box to cause one or more outward extensions on the finishing ring to bear on the exterior surface of the wall layer and thereby urge the junction box towards the wall layer.

In some embodiments, the method can further include securing the cover to the base ring as part of the single assembly so that the a wall layer can be installed over the cover; wherein the cover can be configured to be removed after the cutting operation to allow telescopic adjustment of the finishing ring.

In some embodiments, the one or more outward extensions on the finishing ring can be configured as one or more tabs that are configured to be attached to the finishing ring after the finishing ring is extended toward the exterior surface of the wall layer.

In some embodiments, the one or more outward extensions on the finishing ring are configured to be moved from a retracted configuration to an extended configuration after the finishing ring is extended toward the exterior surface of the wall layer.

In some embodiments, the finishing ring can be configured to be telescopically adjusted relative to the ring portion by rotating one or more threaded fasteners to cause the finishing ring to move in an axial direction defined by the one or more fasteners. Additionally, or alternatively, the one or more threaded fasteners can extend along the outside of the finishing ring to engage one or more threaded sleeves within an interior volume of the junction box; and wherein rotation of the one or more threaded fasteners to adjust the finishing ring relative to the ring portion does not extend the one or more threaded fasteners past the one or more threaded sleeves within the junction box. The method can further include threadedly securing the one or more threaded sleeves to the base ring.

In some embodiments, installing the finishing ring into the ring portion of the base ring can include electrically bonding the finishing ring to the ring portion of the base ring via the one or more threaded fasteners. The finishing ring can be configured to be telescopically extended relative to the ring portion of the base ring so that the finishing ring is spaced apart from the ring portion of the base ring in an extension direction.

In some embodiments, a method of installing an electrical device can include providing a base ring that includes a plate portion and a ring portion that extends away from the plate portion. The base ring can be secured to a junction box at the plate portion with the ring portion extending away from a front opening of the junction box. A finishing ring can be provided that is sized to slide telescopically within the ring portion of the base ring. The finishing ring can have the electrical device secured thereto and can include one or more tabs. The electrical device can be installed after installing a wall layer. The method can further include installing the base ring in the wall structure prior to installing the wall layer, so that the ring portion is disposed to provide a guide for a first cutting operation to open the a wall layer for access to the front opening of the junction box. After the first cutting operation, the finishing ring can be installed into the ring portion of the base ring and the finishing ring can be telescopically adjusted relative to the ring portion of the base ring, to cause the one or more tabs to bear on an exterior surface of the a wall layer and thereby urge the junction box towards the a wall layer.

Some embodiments of installing an electrical device can include providing a base ring that includes a plate portion and a ring portion that extends away from the plate portion. The base ring can be secured to a junction box at the plate portion with the ring portion extending away from a front opening of the junction box. A finishing ring that is sized to slide telescopically within the ring portion of the base ring can be provided. The finishing ring can have the electrical device secured thereto and include one or more tabs. The electrical device can be installed before installing a wall layer. The method can include installing an assembly of the base ring, the finishing ring, and the electrical device prior to installing the a wall layer, with the finishing ring in a retracted configuration relative to the ring portion of the base ring and the ring portion or a cover over the electrical device disposed to provide a guide for a second cutting operation to open the a wall layer for access to the front opening of the junction box. The finishing ring can be telescopically extended relative to the ring portion of the base, after the second cutting operation. The finishing ring can be telescopically adjusted relative to the ring portion of the base ring, after the finishing ring is telescopically extended, to cause the one or more tabs to bear on an exterior surface of the a wall layer and thereby urge the junction box towards the a wall layer.

Some embodiments of installing an electrical device can include securing a base ring to a junction box. A ring portion of the base ring can extend away from a front opening of the junction box. A finishing ring can be provided that is sized to slide telescopically within the ring portion of the base ring. An assembly of the finishing ring can be provided that is secured to the base ring and the junction box, with the finishing ring in a retracted configuration relative to the ring portion of the base ring, so that: the assembly can be configured to be installed in the wall structure prior to installing a wall layer; the finishing ring can be configured to be telescopically extended relative to the ring portion of the base, after a first cutting operation to open the a wall layer for access to the front opening of the junction box; and the finishing ring can be configured to be telescopically adjusted relative to the ring portion of the base ring, after being telescopically extended, to cause the one or more tabs to bear on an exterior surface of the a wall layer and thereby urge the junction box towards the a wall layer.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein:

FIGS. 2 and 3A are front views of the adjustable depth electrical wall mount ring of FIG. 1A.

FIG. 3B is a side view of the adjustable depth electrical wall mount ring of FIG. 1A.

FIG. 3C is a rear view of the adjustable depth electrical wall mount ring of FIG. 1A.

FIG. 3D is an end view of the adjustable depth electrical wall mount ring of FIG. 1A.

FIG. 4 is a front isometric view of the base ring of FIG. 1A.

FIG. 5A is a front view of the base ring of FIG. 1A.
FIG. 5B is a side view of the base ring of FIG. 1A.
FIG. 5C is an end view of the base ring of FIG. 1A.
FIG. 6A is a front right side view of the finishing ring of FIG. 1A and associated other components.

FIG. 6B is a front left side view of the finishing ring and other components of FIG. 6.

FIG. 15A is a top view of a spacer for use with an adjustable depth electrical wall mount ring according to an embodiment of the present invention.

FIG. 15B is a side view of the spacer of FIG. 15A.
FIG. 15C is an end view of the spacer of FIG. 15A.

FIG. 16 is an assembled electrical wall mount ring and spacer according to an embodiment of the present invention.

FIG. 22 shows the adjustable depth electrical mount ring of FIG. 17 with an electrical device, coupled to an electrical box mounted to a wall stud, according to an embodiment of the invention.

FIG. 23 shows the adjustable depth electrical mount ring of FIG. 17 with a cover, coupled to an electrical box mounted to a wall stud, according to an embodiment of the invention.

Corresponding reference characters indicate corresponding components throughout the several views of the drawings.

DETAILED DESCRIPTION OF THE INVENTION

Figure 1A:
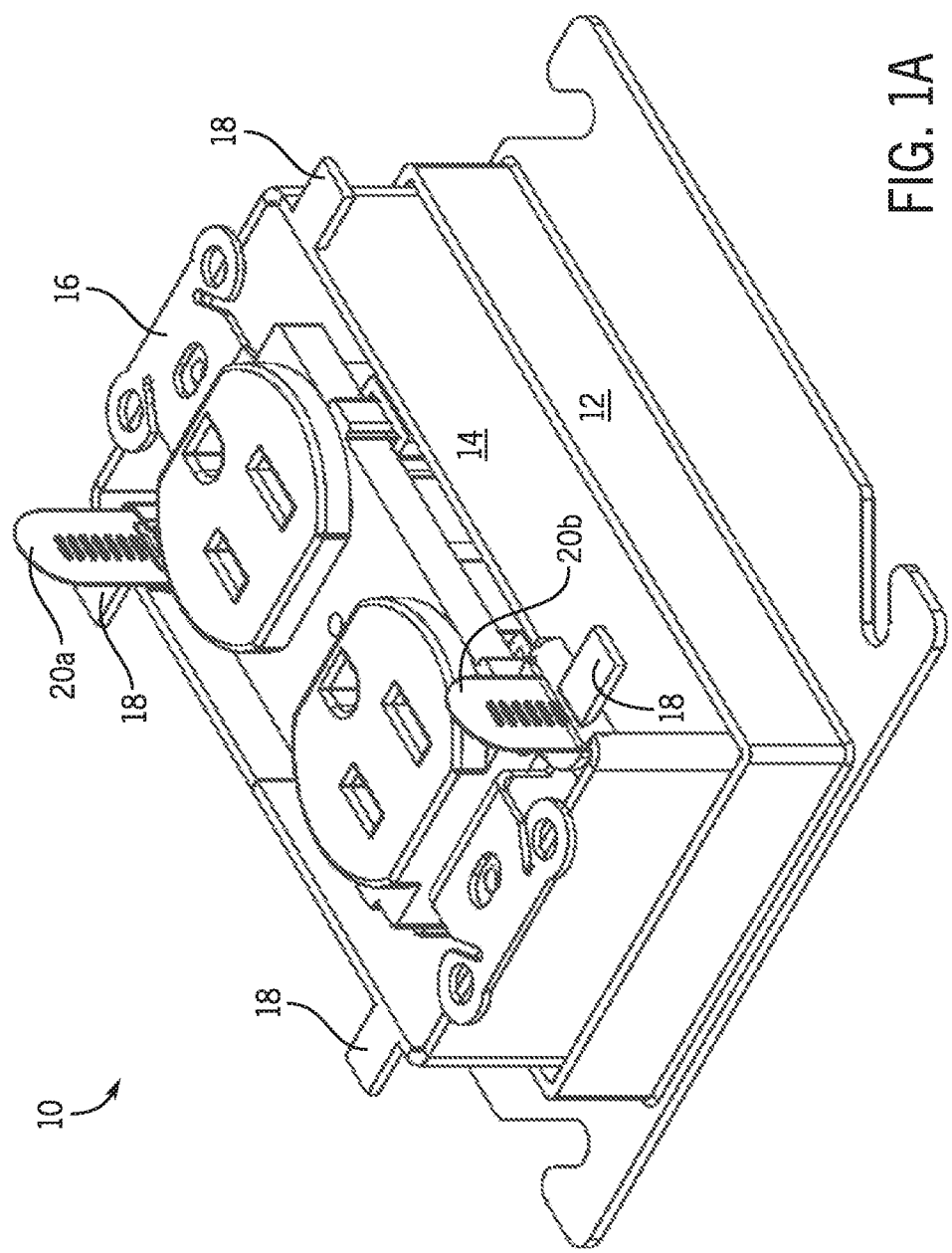
FIG. 1A is a front isometric view of an adjustable depth electrical wall mount ring according to an embodiment of the present invention, including a base ring, a finishing ring, and an adjuster.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

As used herein, unless otherwise specified or limited, "axial" refers to a primary adjustment direction of an adjustable depth electrical wall mount ring, such as a telescoping direction of a set of nested rings. Similarly, "lateral" refers to a direction that is perpendicular to an associated axial direction. Thus, for example, for an adjustable depth electrical wall mount ring that adjusts telescopically via actuation of elongate threaded fasteners, the axial direction may correspond to the elongate direction of the threaded fasteners (e.g., to the axes of rotation thereof) and the lateral direction may correspond to radial directions relative to the axes of rotation of the threaded fasteners. In some installations, an axial direction may be perpendicular to an exterior (e.g., room-side) wall surface and lateral directions may extend in parallel with the exterior wall surface, although other arrangements are also possible.

Also as used herein, unless otherwise specified of limited, "prefabrication" and variations thereof refer to operations that are completed at a different location than a location of final installation of a relevant device or assembly. For example, some prefabrication operations can include assembling together components of an electrical assembly at a prefabrication facility, to prepare the electrical assembly for shipping—as an assembly—from the prefabrication facility to a job site. As another example, some prefabrication operations can include assembling together components of an electrical assembly at a job site, but not immediately at or in an installation location (e.g., not at or within a particular stud cavity), to prepare the electrical assembly for transport—as an assembly—to the installation location. In this regard, some prefabrication operations can be completed at "off-site" locations (i.e., locations not at a job site) and some prefabrication operations can be completed at "on-site" locations (i.e., locations at a job site, but not necessarily at a final installation location).

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

Conventional prefabrication methods have evolved such that the wiring devices are pre-installed in assemblies of other components such as electrical junction boxes, plaster rings and support brackets. The assembly, with the wiring device installed, is then attached to a framing member (metal or wooden stud) prior to wall board being installed over the studs. In conventional assemblies, in order to prevent the wiring device from becoming trapped behind the wall board, tabs on the yoke of the pre-installed wiring device must be detached during factory assembly. The result of removing the yoke tabs is that the wiring device can no longer rest on the outside of the finished wall for support, as described above.

The industry has developed many solutions to provide for the support of devices that have had their yoke tabs removed prior to installation. These include "box-levelers" that are slipped between the wiring device and the finished wall, plastic spacers that are inserted behind the wiring device attachment screws, or the employment of a "box extender" that requires that the wiring device first be removed, and then re-installed. These conventional solutions are often frowned upon by electrical inspectors, and are thought to be Code violations, as they are viewed as a "patch" and do not result in what should be a new, unmodified installation.

Other options exist to adjust a wiring device without a yoke installed. These include the adjustable plaster ring and adjustable box extender. However, these too have limitations and are expensive solutions. Moreover, these solutions do not work in many applications, such as in a wall finished with tile, as the adjustable ring is "trapped" behind the tile if not properly installed thereby making the adjustment feature inoperative. This results in time-consuming and costly re-work.

The process of installing a device assembly with a wiring device pre-installed often requires that a protective cover, made from either metal or plastic, be installed over the device. Then wall board, typically gypsum "blueboard" or "sheetrock" (generally, herein, "drywall"), is installed over the device assembly. The wall board is extremely heavy and is applied by at least two workmen that must apply force to hold the wall board on the studs until it can be secured with screws. There is often a damaging effect on the device assembly as the force of installing the wall board deforms or otherwise pushes the assembly back into the stud cavity, or in extreme cases, even permanently damages the wiring device which then must later be replaced when final troubleshooting determines its inoperability.

Lastly, the wall board installer uses an electric router to cut out a hole so the wiring device can be exposed. The accuracy and size of the hole created by the router depends heavily on the skill of the worker performing the work and often the hole is either too small, or too large. If the hole is too small the electrician who comes later to finish the electrical installation must enlarge the hole which is both time consuming and expensive. If the hole is too large then the finish plate will not cover the hole and the wall must be patched by a drywall contractor which is very time-consuming and expensive. Thus, the use of conventional prefabrication assemblies often results in the use of a non-standard, oversized finished plate. But these non-standard sized plates are often frowned upon by architects and other designers as they deem them aesthetically unpleasing and they are also more expensive than the standard types.

None of the conventional wiring device adjustment device options discussed above, including conventional plaster ring or box extenders, will function properly unless the routed hole is the proper size for the opening. Further, it is not unusual that the router tool, rotating at high speed, and applied with force, will permanently damage the wiring device which will then need to be replaced after it is found to be inoperable by the electrical contractor. Sometimes the router bit will damage electrical wires in the junction box resulting in even more expensive re-work. It is also noted that the drywall contractors often protest about the use of prefabricated electrical assemblies because it makes their job much harder, e.g., they are required to take more care when routering and must take the time to repair overcut holes.

Due to the complications associated with conventional pre-installation of wiring devices in the prefabricated wiring assemblies, many authorities (e.g., municipal wiring inspectors) have either banned the practice or generally frown on it. Moreover, many contractors have deemed the complications with conventional pre-installation of wiring devices as not worth the trouble and so opt to prefabricate the remainder of the wiring system but do not pre-install the device, instead waiting to install the wiring device until after all wall finishes have been complete. But even this method can have complications. Including because wall construction types are dependent on engineering applications and wall thicknesses can accordingly vary widely, including from ½" to as much as 2" thick. In order to prefabricate, and to assemble the correct components for each wall type/thickness, a contractor must studiously identify the requirements for every assembly from information obtained on project plans and then build the relevant assembly from a myriad of individual components, choosing from a large and varied inventory of parts that must be kept on hand. Additionally, National Electrical Code requirements demand that the assembly meet specific standards, and these can only be met with close attention to detail and with the use of the proper components.

Even if a contractor studies the plans carefully and assembles the prefabricated wiring assembly as the plans require, the referenced plans will not necessarily be correct: for example, project plans are continually being revised and updated and it can be a challenge to keep up with changes. Moreover, it is also not unusual that a framing contractor builds something different than that which is shown on the plans, which may result in the prefabricated wiring assembly not being properly configured in spite of best intentions and due diligence. Also, even if the wiring device(s) are not pre-installed, and the proper sized plaster rings are used (or an adjustable plaster ring is used), the drywall contractor must still router a hole in the wall substrate. Without the device(s) installed, the drywall contractor can sometimes plunge the router tool into the center of the empty plaster ring and then use the inside edge of the plaster ring as a cutting guide. The result is that the hole is too small, as it is the outer edge of the plaster ring that must protrude through the wall for a proper and code-compliant installation. And, again, there is a likelihood that the rotating router bit may damage wires that are resident in the junction box.

Even with conventional, non-prefabrication construction techniques, in which all components are assembled on the job site in the stud cavity, great care must be taken to install the proper size components, particularly the plaster ring, to ensure that electrical code requirements will be satisfied once the finish wall board or other substrate is applied to the framing studs. As a result, the installer must keep on hand a large variety of components, of different sizes. If the installer does not have the proper size needed to satisfy code requirements, and must order said component, then the project schedule can be adversely affected and the installation must be revisited once the correct component arrives on site. Thus, even for no-prefabrication installations, a need remains for useful adjustable components.

Embodiments of the invention can address the issues noted above and others. For example, some embodiments can provide an adjustable depth electrical wall mount ring that can be used during installation of prefabricated or non-prefabricated electrical assemblies in order to ensure that an electrical device is appropriately aligned relative to a wall surface (e.g., an exterior surface of drywall, opposite a stud cavity and facing into the interior of a room). In some embodiments, an adjustable depth electrical wall mount ring can be used with wiring assemblies for which wiring devices have been installed prior to installation of wall structures (e.g., drywall) or can be used with wiring assemblies for which wiring devices are installed after installation of wall structures. In some embodiments, a single adjustable depth electrical wall mount ring can be selectively adapted (e.g., prefabricated to selective degrees) for use in either of these types of installation.

In particular, in some embodiments, a set of nested, telescoping rings can be used to extend the effective depth of an electrical box to pass through a wide range of wall thicknesses and, in some cases, to clamp wall structure(s) between lateral extensions of one of the rings and other components of the assembly (e.g., a junction box or face plate of a base ring attached thereto). In some embodiments, a laterally outer ring of a nested, telescoping set of rings can provide a reliable guide for cutting of drywall or other wall structure(s) after an electrical assembly has been installed, in whole or in part, so that little or no subsequent re-work is required to complete to-code installation of electrical devices. Subsequent to such cutting operations, or prior to installation of the wall structure(s) and the cutting thereof, a laterally inner ring of the set can then be installed, with or without an attached electrical device, in order to allow adjustable extension of the laterally inner ring through the cut hole in the wall structure(s) and appropriate alignment of the electrical device relative to the wall.

Figure 1B:
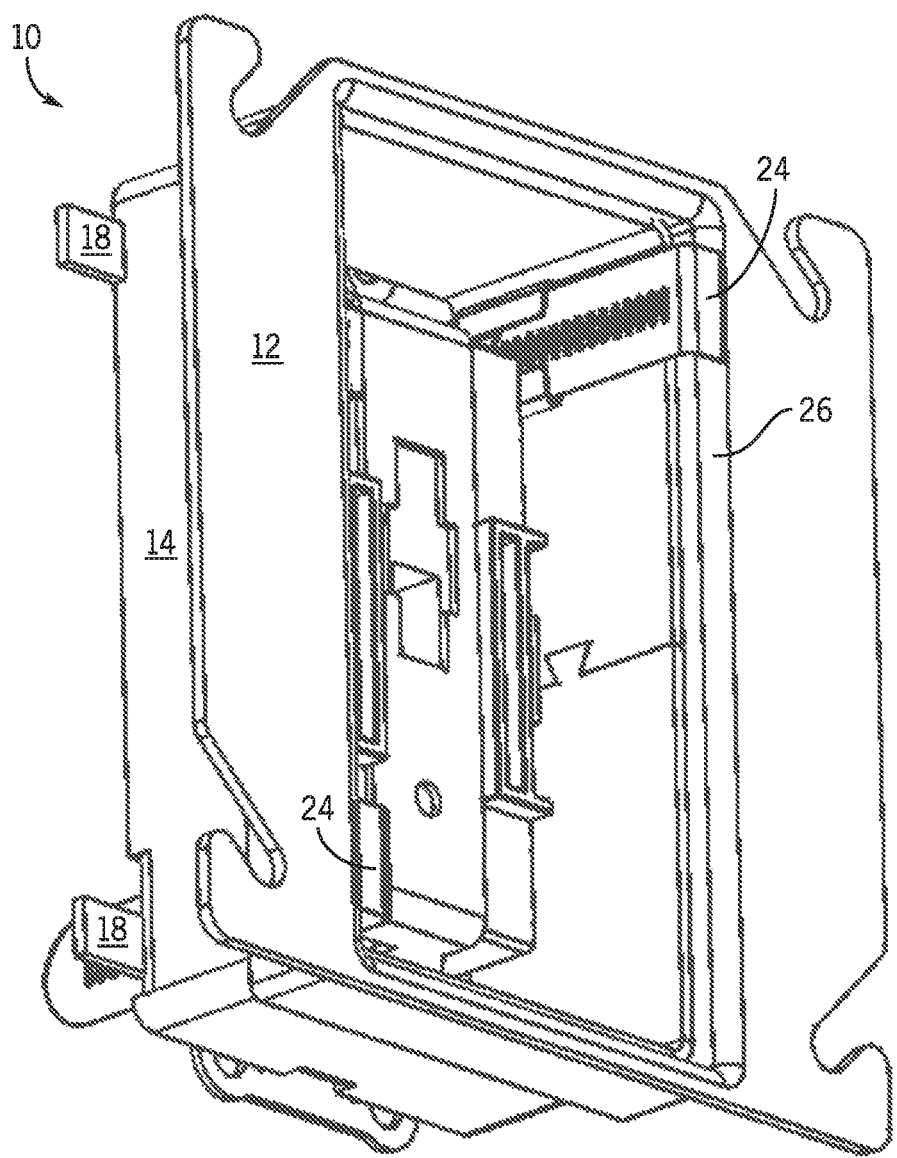
FIG. 1B is a rear isometric view of the adjustable depth electrical wall mount ring of FIG. 1A.
Figure 2:
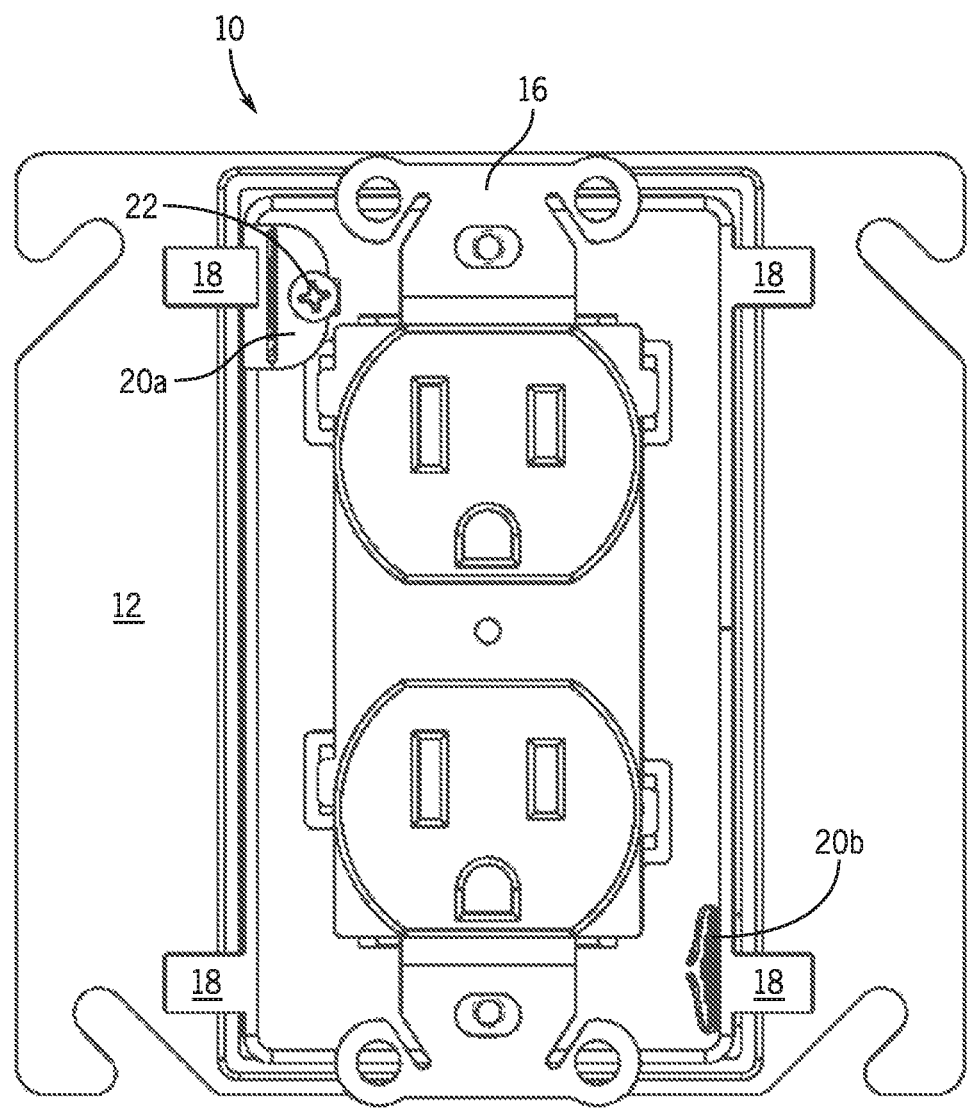

A front isometric view of an adjustable depth electrical wall mount ring 10 according to an embodiment of the present invention is shown in FIG. 1A, a rear isometric view of an adjustable depth electrical wall mount ring 10 is shown in FIG. 1B, a detailed front view of the adjustable depth electrical wall mount ring 10 is shown in FIG. 2, a front view of the adjustable depth electrical wall mount ring 10 is shown in FIG. 3A, a side view of the adjustable depth electrical wall mount ring 10 is shown in FIG. 3B, a rear view of the adjustable depth electrical wall mount ring 10 is shown in FIG. 3C, and an end view of the adjustable depth electrical wall mount ring 10 is shown in FIG. 3D. The mount ring 10 includes a base ring 12, a finishing ring 14, tabs 18, adjusters 20a and 20b, and a grounding screw 22. An electrical receptacle 16 (or a switch, light fixture or any other electrical device designed for the purpose) is mounted to the finishing ring 14. The straps 30 (see FIG. 8) may be mechanically attached or welded to a surface of the base ring 12 or claws 24 at bottom of the straps 30 of may reach under the base ring 12 into recess 26 to hold the straps 30 to the base ring 12.

The tabs 18 serve to support the finishing ring 14 once installed so that when wiring devices are used by the end-user the wiring devices will not push in the wall, e.g., when a corded appliance is plugged in. These tabs 18 may be an integral part of the finishing ring 14, that is fabricated as part of the finishing ring 14, or may be separate components that may be snapped, pushed in or fastened in some fashion to the finishing ring 14. In some embodiments, the tabs 18 may be fabricated in such away that they can be transported (e.g., shipped) straight, parallel to side wall 14a, and then bent 90-degrees (or otherwise) in the field or bent at the factory or contractor's prefabrication operation The base ring 12 attaches to a standard electrical junction box. The junction box can be: 1) 4"×4"; 2) 4¹¹⁄₁₆"×4¹¹⁄₁₆"; 3) 4" Round; 4) 4⁹⁄₁₆"×6¹³⁄₁₆" (2-Gang); 5) 4⁹⁄₁₆"×8⅝" (3-Gang); 6) 4⁹⁄₁₆"×10⅞₁₆" (4-Gang); 7) 4⁹⁄₁₆"×12¼" (5-Gang), or any other standard configurations of "Multi-Gang" electrical boxes. The depth of the electrical junction boxes can be of any size commonly offered in the marketplace for all the junction box sizes referenced here, including, but not limited to, 1½", 2⅛", 2½", 3" and 3½".

An isometric view of the base ring 12 is shown in FIG. 4, a front view of the base ring 12 is shown in FIG. 5A, a side view of the base ring 12 is shown in FIG. 5B, and an end view of the base ring 12 is shown in FIG. 5C. The base ring 12 includes a mechanism that allows for the subsequent assembly with the finishing ring 14, for example, the adjusters 20a and 20b. The base ring 12 is comprised of an attachment portion 12a that sits flat on top of a junction box and includes mounting holes that allow for its attachment to the junction box using its standard hole pattern as required by UL Standards and is customary in the industry.

A ring 12b is fabricated perpendicular to the attachment portion 12a, rising in height at various dimensions to allow it to penetrate gypsum drywall and other wall substrates. In this embodiment of the invention the ring 12b will extend ½" high from the plate 12a but this dimension may change to accommodate different applications. An interior hole exists in the attachment portion 12a where the ring 12b meets the plate 12a to allow wires and the finishing ring 14 (see FIGS. 1-3D) to pass through. In the illustrated embodiment, the attachment portion 12a is formed as an integral flat plate that extends laterally from one end of the ring 12b, although other configurations are possible.

Figure 7B:
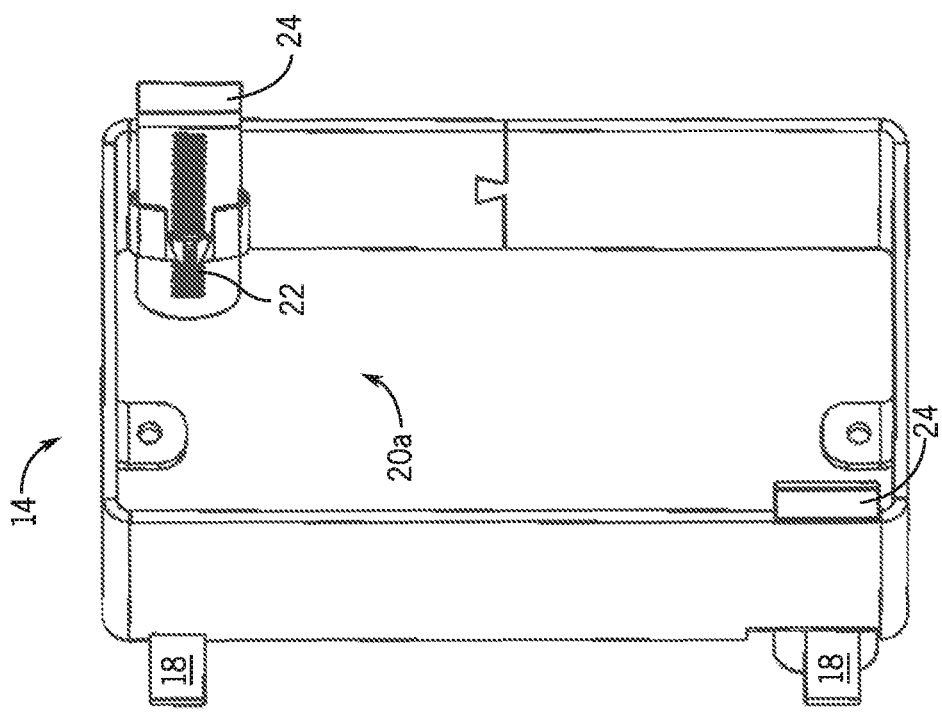
FIG. 7B is a rear left side view of the finishing ring and other components of FIG. 6.
Figure 7A:
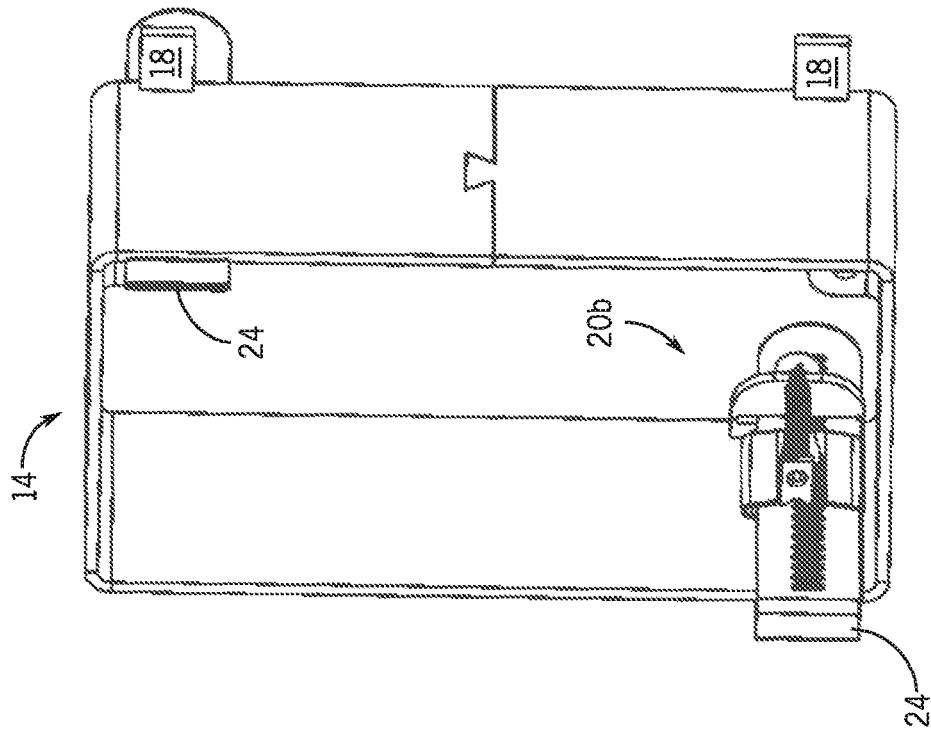
FIG. 7A is a rear right side view of the finishing ring and other components of FIG. 6.

A front right isometric view of the finishing ring 14 is shown in FIG. 6A, a front left isometric view of a finishing ring 14 is shown in FIG. 6B, a rear right isometric view of a finishing ring 14 is shown in FIG. 7A, and a rear left isometric view of a finishing ring 14 is shown in FIG. 7B. The finishing ring 14 supports (e.g., is integrally formed with) the tabs 18, which are configured to rest against a room side surface of a wall structure, and further supports the two adjusters 20a and 20b. As shown in FIG. 2 in particular, the adjuster 20a includes a screw 22.

Figures 8, 9:
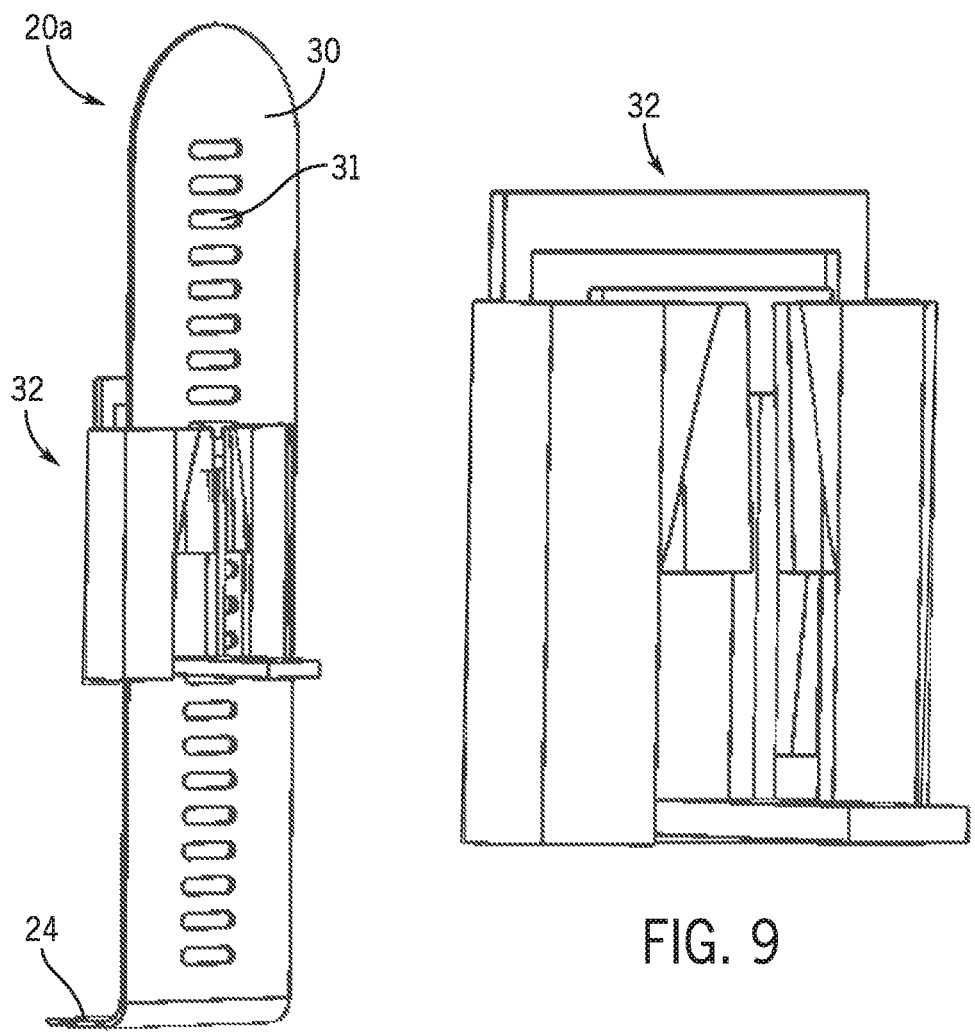
FIG. 8 is an isometric view of an adjuster of FIG. 1A.
FIG. 9 is an isometric view of a sliding catch of the adjuster of FIG. 1A.
Figure 10C:
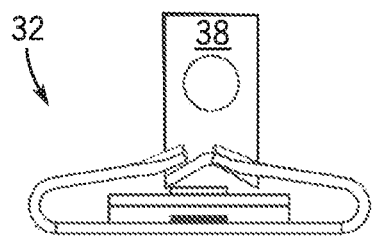
FIG. 10C is a top view of the sliding catch of FIG. 9.
Figure 10A:
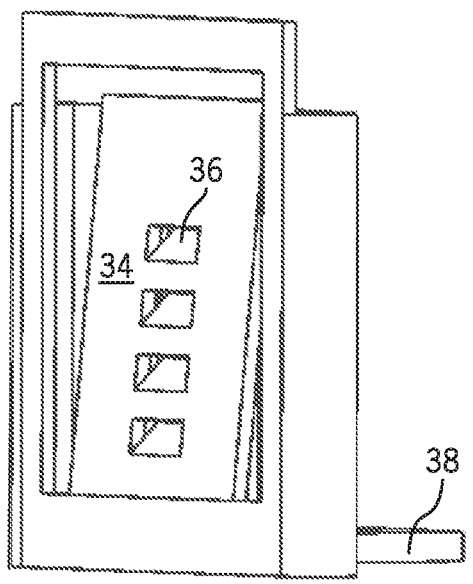
FIGS. 10A and 10B are rear isometric views of the sliding catch of FIG. 9.
Figure 10B:
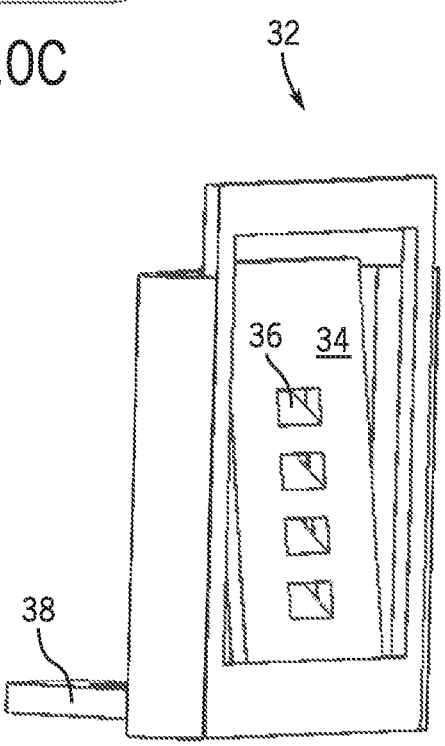
Figure 10D:
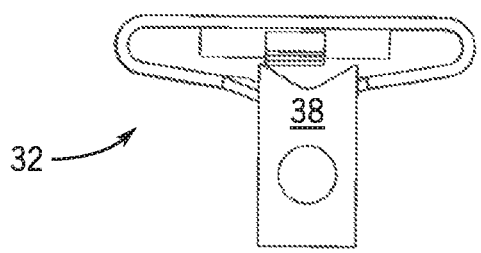
FIG. 10D is a bottom view of the sliding catch of FIG. 9.

An example configuration of the adjuster 20a is shown in FIG. 8, a front right isometric view of a sliding catch 32 of the adjuster 20a is shown in FIG. 9, a rear right isometric view of the sliding catch 32 is shown in FIG. 10A, a rear left isometric view of the sliding catch 32 is shown in FIG. 10B, a top view of the sliding catch 32 is shown in FIG. 10C, and a bottom view of the catch 32 is shown in FIG. 10D. The strap 30 includes lateral slots 31 along its length and engages the catch 32, similar in function to a cable tie. The strap 30 is attached to the base ring 12 via screw, weld, rivet, mechanical forming means or any other process that attaches the strap 30 to the base ring 12 and, in some cases, is permanently attached to the base ring 12. The strap 30 is inserted into the catch 32 attached to the finishing ring 14, and teeth 36 on a plate 34 engage the slots 31 in the strap 30 to permanently attach the finishing ring 14 to the base ring 12. The mechanism may include a feature that allows the user to disengage the teeth to allow for the disassembly of the base ring 12 and finishing ring 14.

Grounding/bonding between all metal components is a requirement of Underwriter Laboratory (UL) "Standards" as well as nationally recognized electrical codes. Correspondingly, the strap 30 is fabricated from metal or other conductive material to achieve electrical conductivity for grounding/bonding requirements between the base ring 12 and finishing ring 14. The catch 32 includes a grounding mechanism that includes the screw 22, or other attachment means, to ensure a permanent electrical bond between all components. The screw 22 may be eliminated if grounding can be achieved in compliance with industry and testing lab standards without it.

Figure 11:
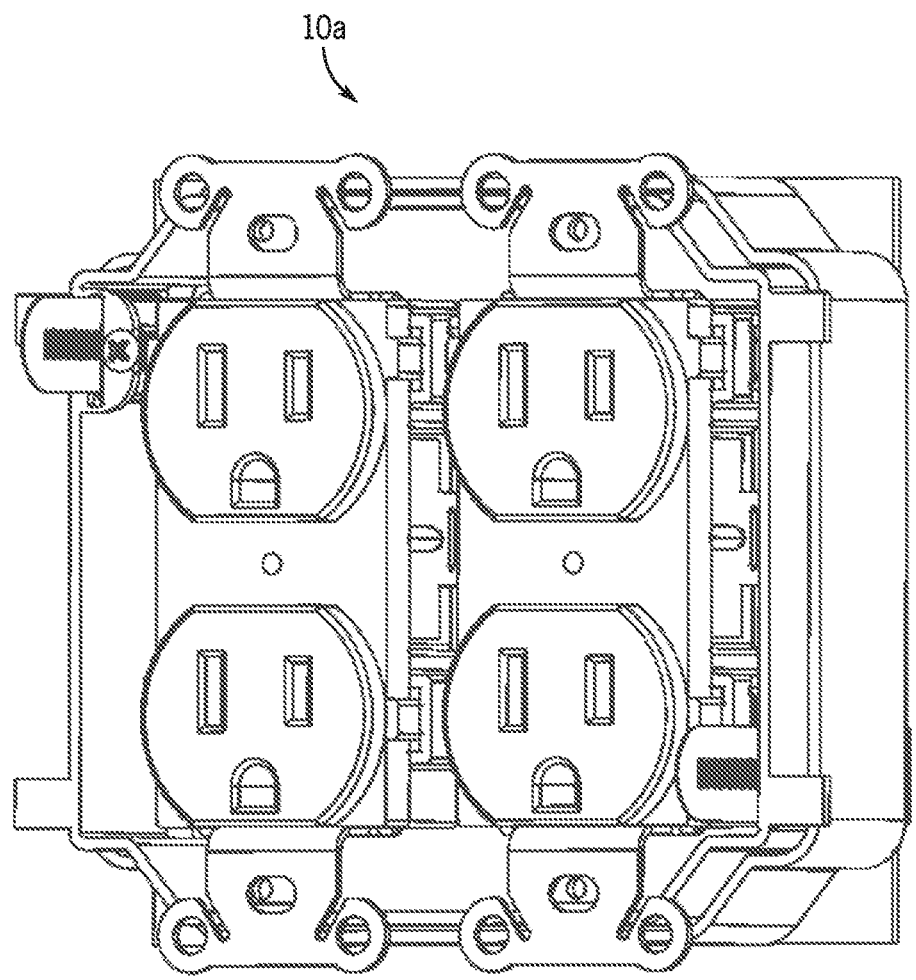
FIG. 11 is a front isometric view of a two-gang adjustable depth electrical wall mount ring according to an embodiment of the present invention.

A two gang embodiment of the adjustable depth electrical wall mount ring 10a is shown in FIG. 11. The adjustable depth electrical wall mount ring 10a can be installed and operated similarly to the electrical wall mount ring 10, as described herein.

Figure 12B:
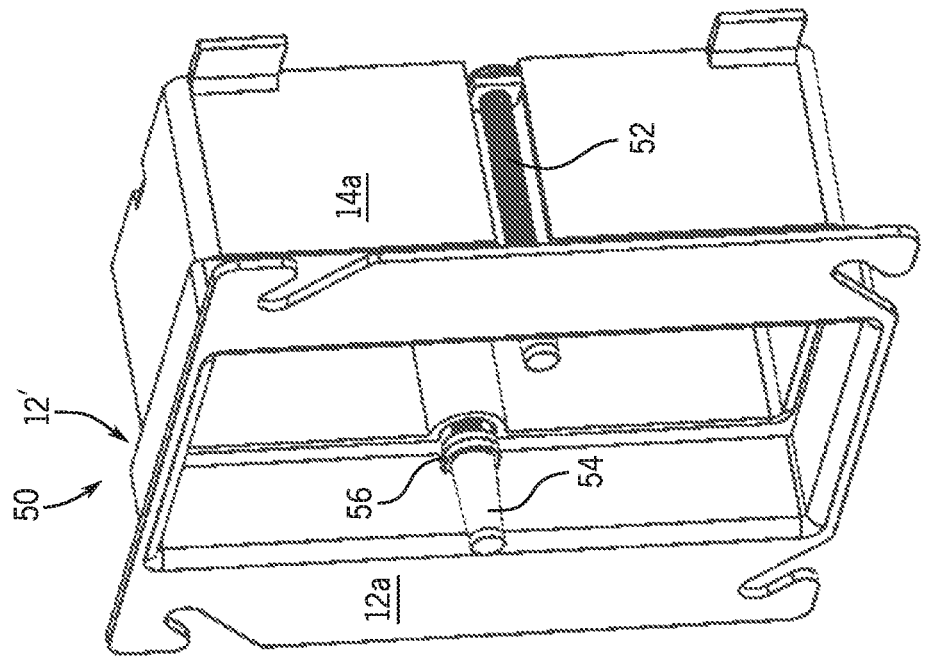
FIGS. 12A and 12B are front and rear isometric views of an adjustable depth electrical wall mount ring according to an embodiment of the present invention.
Figure 12A:
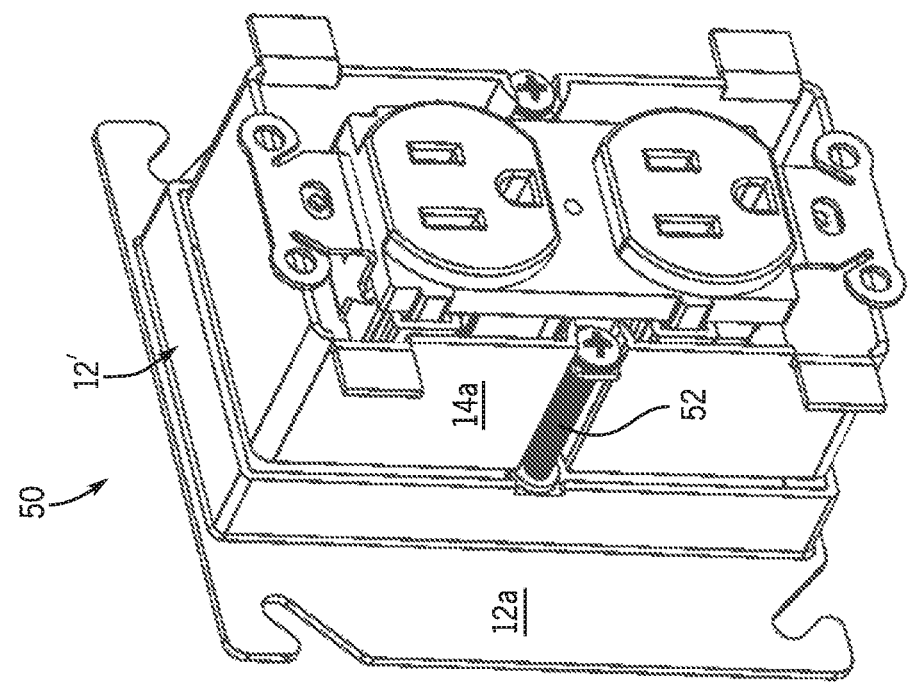
Figure 13A:
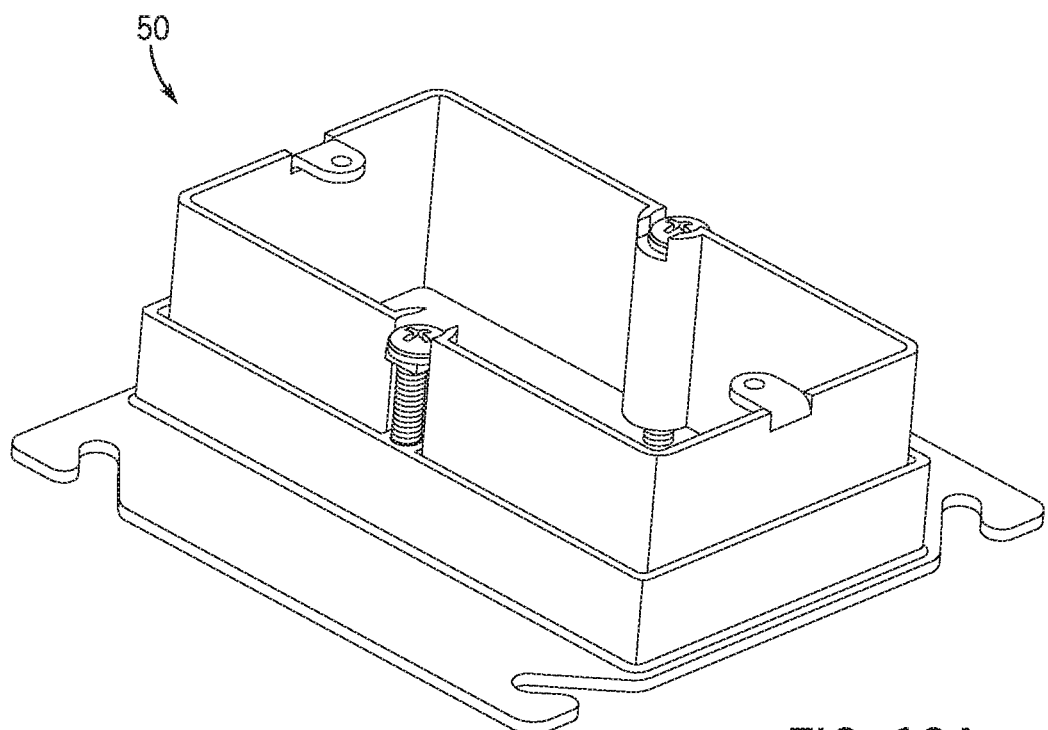
FIG. 13A is a front isometric view of the adjustable depth electrical wall mount ring of FIGS. 12A and 12B.
Figure 13B:
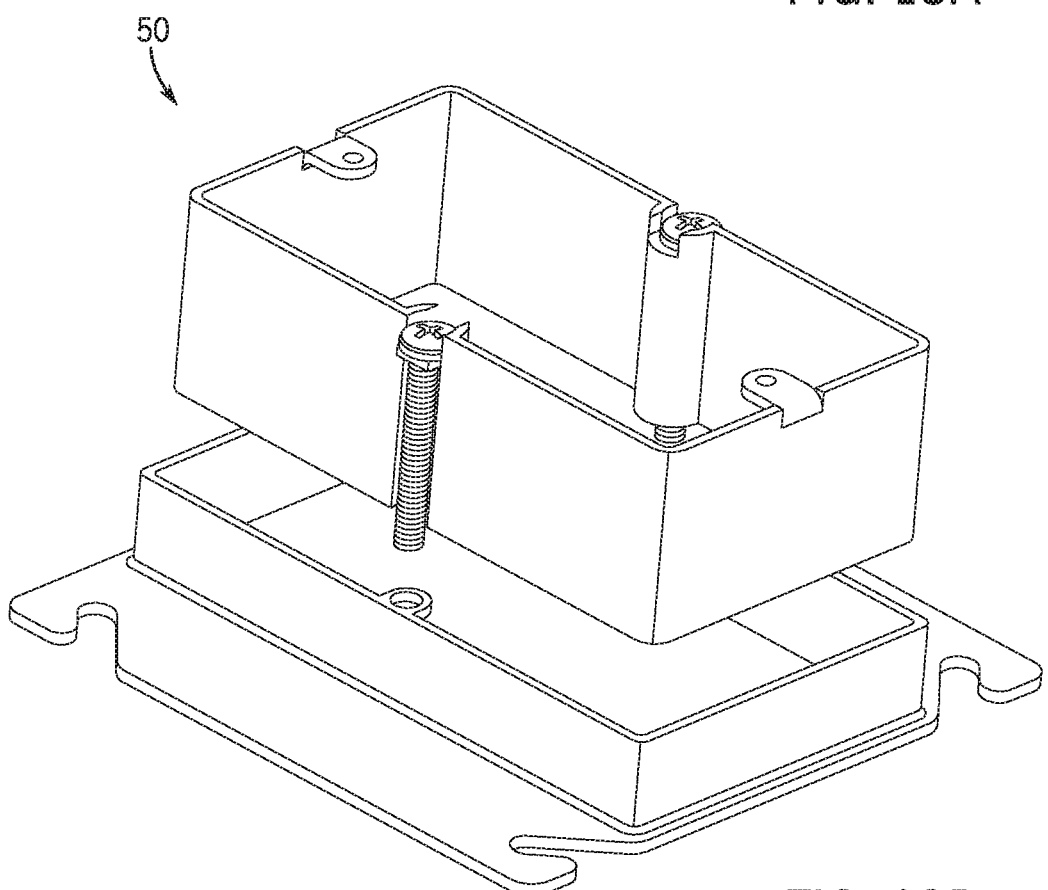
FIG. 13B is an exploded isometric view of the adjustable depth electrical wall mount ring of FIGS. 12A and 12B.

A front right isometric view of a second adjustable depth electrical wall mount ring 50 is shown in FIG. 12A and a rear right isometric view of the adjustable depth electrical wall mount ring 50 is shown in FIG. 12B. The second adjustable depth electrical wall mount ring 50 is shown assembled in FIG. 13A and an exploded view of the second adjustable depth electrical wall mount ring 50 is shown in FIG. 13B. Blind nuts 54 are installed in receiving holes 56 in the base ring 12'. The blind nuts 54 receive screws 52 attached to the finishing ring 14a. The blind nuts 54 may be fabricated from metal or include non-metallic components. The blind nuts 54 will sit below the top surface of the base ring 12' and extend into the electrical junction box. The blind nuts 54 can be smooth on the outside and can completely contain the screws 52 which are driven into it in order to prevent any damage to electrical wire contained within the electrical junction box. Grounding/bonding between all components will be achieved when the attachment screws 52 are driven into the blind nuts 54.

Figure 14:
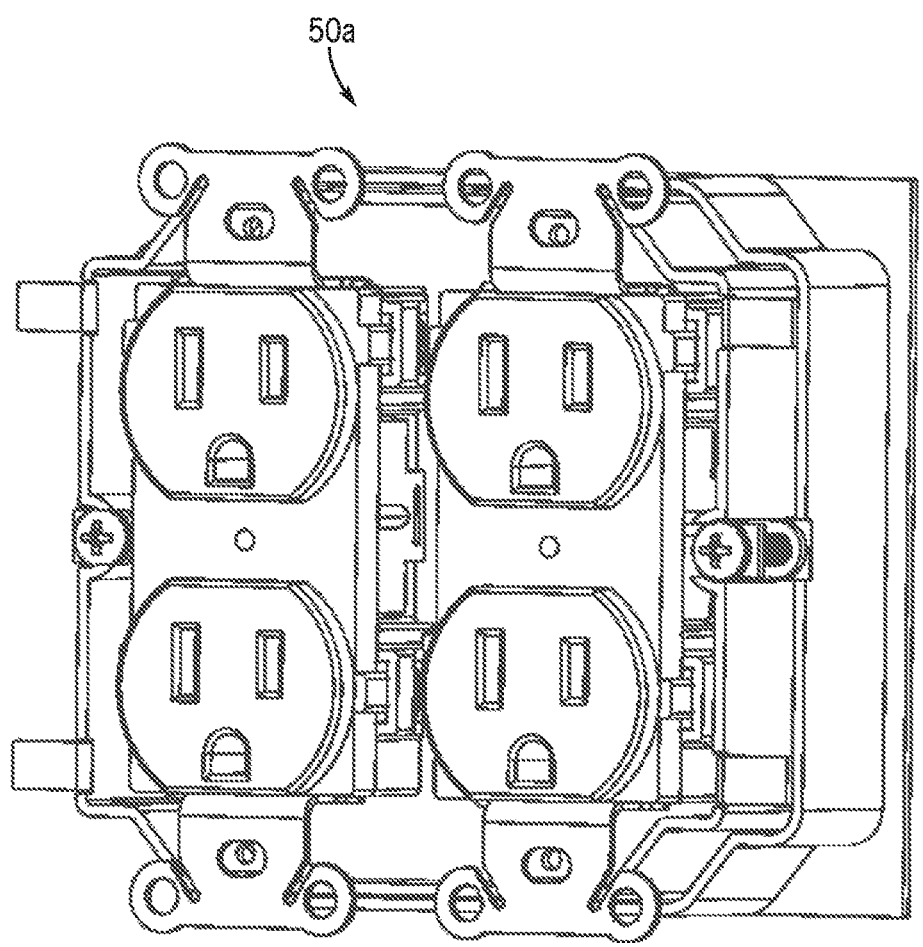
FIG. 14 is a front isometric view of a two gang adjustable depth electrical wall mount ring according to an embodiment of the present invention, with screw adjusters.

A two-gang embodiment 50*a* of the adjustable depth electrical wall mount ring with screw adjusters 52*a* is shown in FIG. 14. The adjustable depth electrical wall mount ring 50*a* can be installed and operated similarly to the electrical wall mount ring 10, as described herein.

A top view of a spacer 60 used with adjustable depth electrical wall mount ring is shown in FIG. 15A, a side view of the spacer 60 is shown in FIG. 15B, an end view of the spacer 60 is shown in FIG. 15C, and an assembled electrical wall mount ring and spacer 60 is shown in FIG. 16. The spacer 60 may be used to adapt the adjustable depth electrical wall mount ring 10 or 50 to thick walls.

In another embodiment, receiving holes in a base ring can receive push-in (or other) fasteners to receive a screw or rod attached to the finishing ring. The push-in fastener may be fabricated from metal or may include non-metallic components. The push-in fasteners can include a hollow tube which sits below the top surface of the base ring and extends into the electrical junction box. The tube can be smooth on the outside and can completely contain the screw or rod that is driven into it, at least within the junction box, in order to prevent any damage to electrical wire contained within the electrical junction box. Grounding/bonding between all components can thus be achieved via the interference—(or other) fit of the mating components.

Some adjustable depth electrical wall mount rings may be installed to a standard electrical box selected as required to accommodate a required quantity of wiring devices and electrical wires and to meet with electrical Code requirements. Some adjustable depth electrical wall mount rings may be attached directly to a framing member (stud, etc.) of a wall structure, attached to a box bracket that is itself attached to a framing member or other structure, attached to a hanger or support fabricated from miscellaneous materials, included in an assembly that is prefabricated on-site or at a remote location, or otherwise included in a factory-supplied assembly that includes various other components.

Wire, cable, conductors, conduit (pipe) and any other means of attaching electrical wiring can be attached to the electrical box for later attachment to wiring devices or to feed other devices and equipment on the given circuits contained in the electrical junction box. The connection of said conductors can be achieved by any UL Listed method. A ground wire and associated bonding conductors can be attached to the junction box in accordance with electrical codes and other industry standards or may not be present at all if said installation meets UL and other code requirements.

In some embodiments, as also discussed above, an adjustable depth electrical wall mount ring can include telescoping rings that are adjustable using threaded fasteners or other similar adjusters. This may be useful, for example, in order to allow easy adjustment of the depth of a finishing ring in either of two opposing directions (e.g., into and out of a stud cavity). Further, use of threaded fasteners or other similar approaches can allow extensions on a finishing ring to be urged against a wall surface, such as an outer (i.e., room-side) surface of drywall or tile. In some cases, this may correspondingly urge an attached base ring and electrical box towards the wall surface. In turn, this can sometimes clamp the wall structure between components of the adjustable depth electrical wall mount ring (e.g., between the base ring and extensions from the finishing ring) and thereby urge the entire electrical assembly into appropriate alignment for final installation and use of an associated electrical device (e.g., an electrical receptacle).

Figure 17:
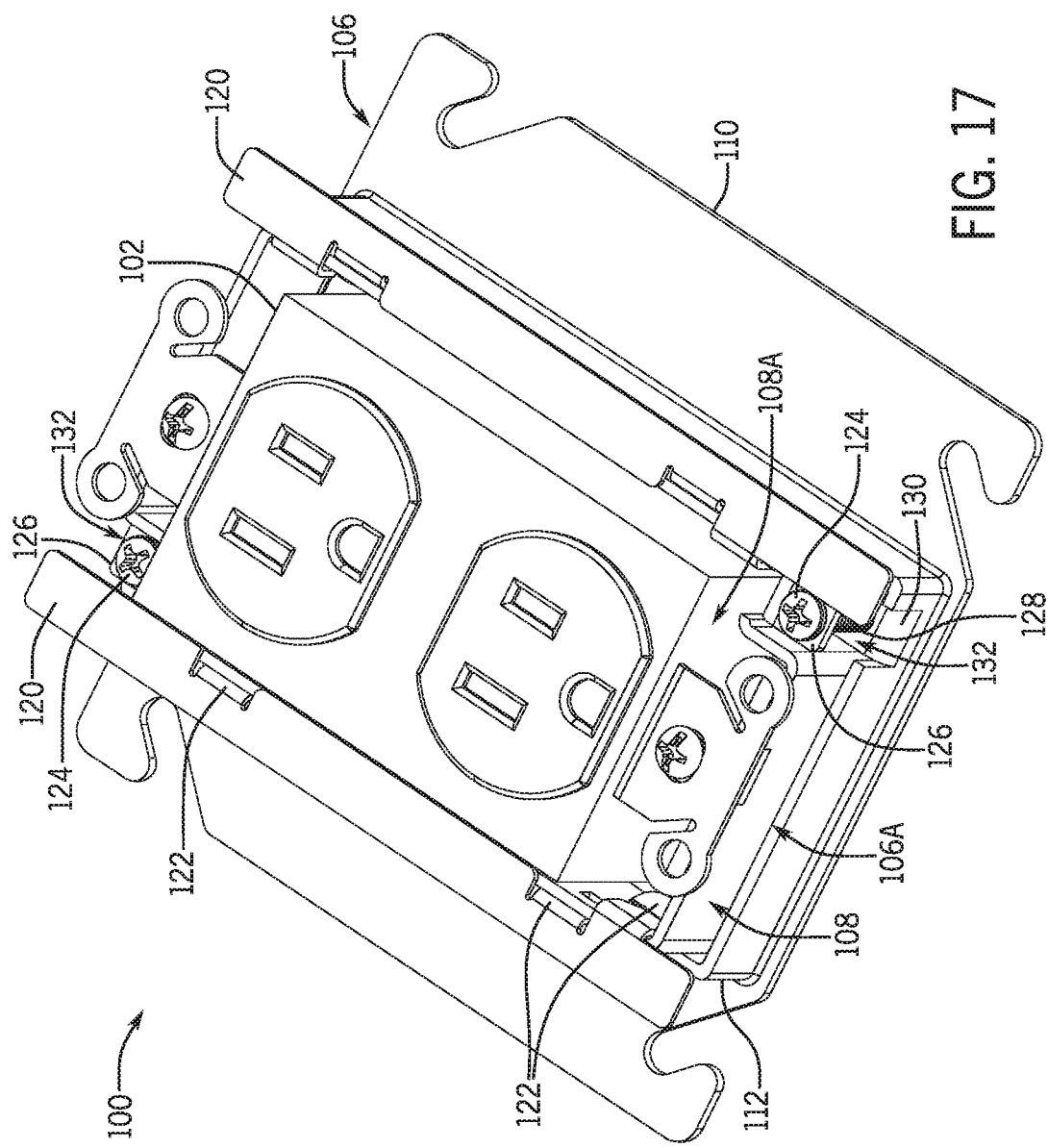
FIG. 17 is a front isometric view of an adjustable depth electrical wall mount ring with an electrical device according to an embodiment of the invention, including a base ring.
Figure 18:
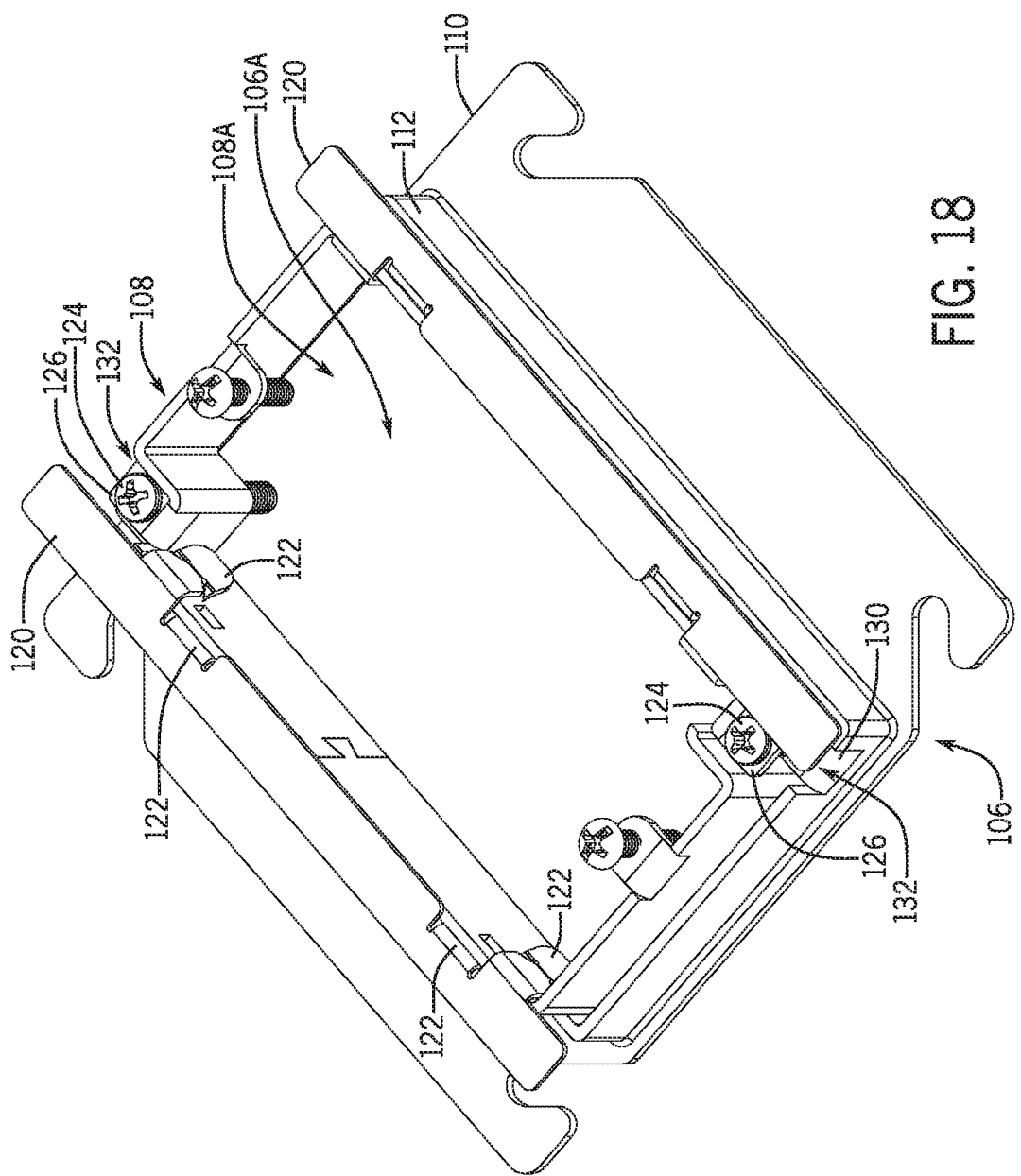
FIG. 18 is a front isometric view of the adjustable depth electrical wall mount ring of FIG. 17 without the electrical device.

Consistent with this discussion, FIGS. 17 and 18 illustrate an adjustable depth electrical wall mount ring 100 configured for threaded adjustment, according to another embodiment of the invention. FIG. 17 also shows an electrical receptacle 102 mounted to the adjustable depth electrical wall mount ring 100. The electrical receptacle 102 is similar to the electrical receptacle 16 discussed above, and, as similarly noted, other electrical devices that can be installed for electrical connections within a junction box 104 (see, e.g., FIG. 21A) can be mounted to the adjustable depth electrical wall mount ring 100 in other installations, including electrical switches, teledata devices, CATV devices, CCTV devices, intercom/call station devices, and so on. FIG. 18 shows the adjustable depth electrical wall mount ring 100 with the electrical receptacle 102 removed, so that certain components of the adjustable depth electrical wall mount ring 100 can be more easily seen.

As used herein, "junction box" refers generally to an enclosing body for electrical devices or connections. Some examples herein illustrate and describe assemblies and operations involving a standard-size square-profile junction box. However, a variety of other configurations are possible, including non-square, non-standard, open-back, and other types of enclosing bodies. In general, some embodiments can be used with virtually any type of junction box, in contrast to some conventional designs that may be limited to use with only junction boxes exceeding a particular depth (e.g., junction boxes that are 2⅛" or deeper).

In particular, the adjustable depth electrical wall mount ring 100 includes a base ring 106 with a central opening 106A and a finishing ring 108 with a central opening 108A. The base ring 106 includes an attachment portion 110, and a ring portion 112 extending away from the attachment portion 110. In the illustrated embodiment, the attachment portion 110 is configured as a plate-like lateral extension, and the ring portion 112 extends away from only a single side of the attachment portion 110. This configuration may be useful, for example, so that attachment portion can extend fully to all sides of a front opening of a junction box and the ring portion 112 does not extend into the interior volume of the junction box, such as might negatively impact the integrity of some electrical connections or devices therein. In other embodiments, however, other configurations are possible.

Figure 28:
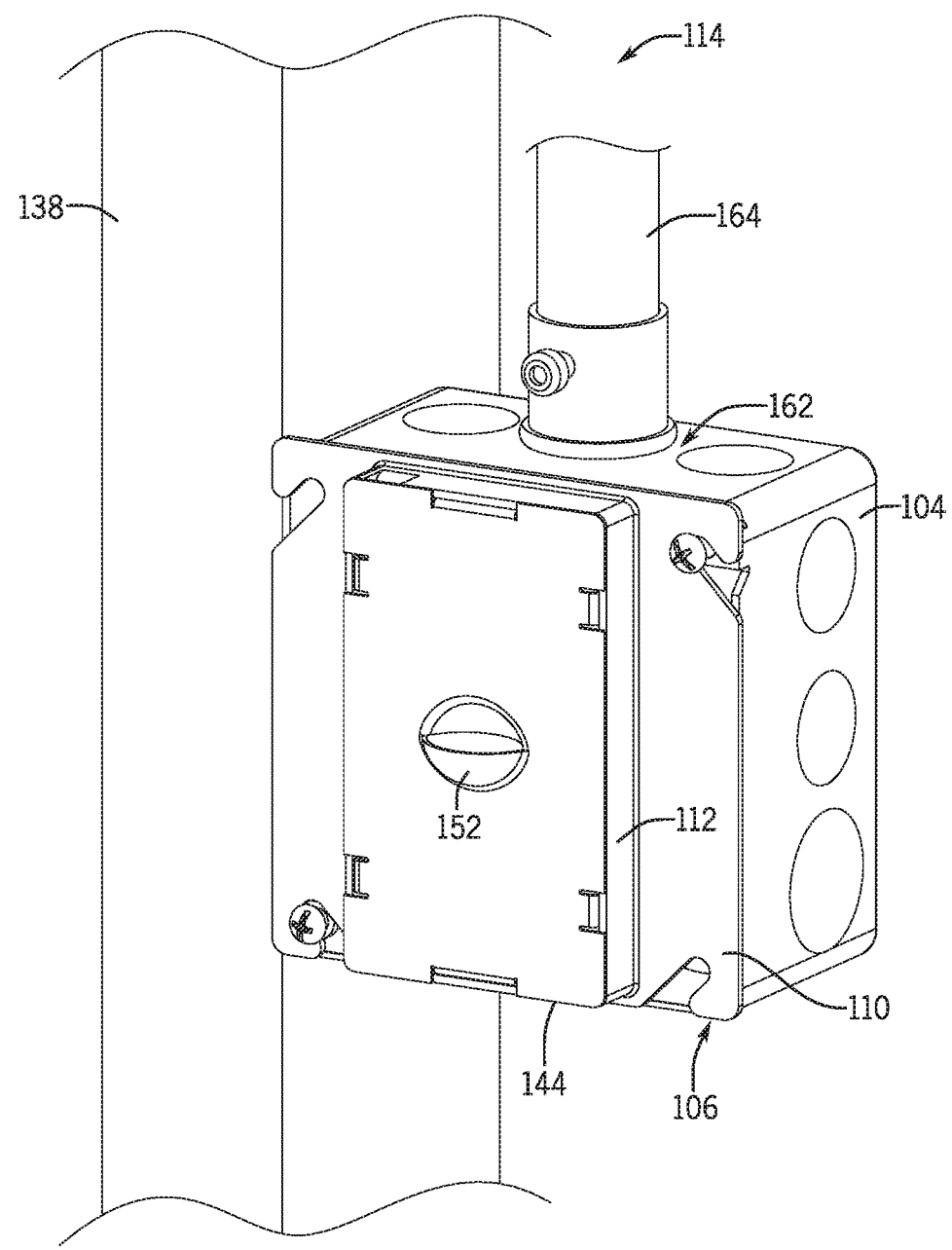
FIG. 28 shows the base ring of the adjustable depth electrical mount ring shown in FIG. 17, coupled to an electrical box that is mounted to a wall stud, with a cover attached, according to an embodiment of the invention.

As further discussed below, the base ring 106 is configured to be installed in a wall structure (see, e.g., wall structure 114 in FIG. 21A) prior to installing one or more wall layers of the wall structure (see, e.g., wall layer 116 in FIG. 25), with the attachment portion 110 of the base ring 106 mounted to a junction box. As further discussed below, once secured to a junction box and installed behind a wall layer, the ring portion 112 of the base ring 106, or a cover arranged over the ring portion 112 (e.g., a cover 144 as shown in FIG. 28), can provide a guide for a first cutting operation, to open the wall layer for access to the front opening of the junction box via the ring portion 112. For example, an operator can cut through the wall layer by running a router bit fully around the laterally outer perimeter of the ring portion 112 (or a cover), with contact between the laterally outer perimeter and the router bit guiding the contours of the cutting operation and helping to prevent over-size cuts or entry of the cutting tool into the junction box.

Although some discussion herein relates to wall layers formed from drywall (i.e., gypsum board), other wall layers can be formed from tile backer board, wood, metal, features of cabinets or other accessory items, tile, or other materials. Similarly, although some examples herein relate to single-layer wall structures, some wall structures can include multiple wall layers (e.g., tile backer board and tile) and some embodiments of the invention can be configured to extend through and engage with multi-layer wall structures similarly to the single-layer wall structures expressly discussed herein.

Figure 19:
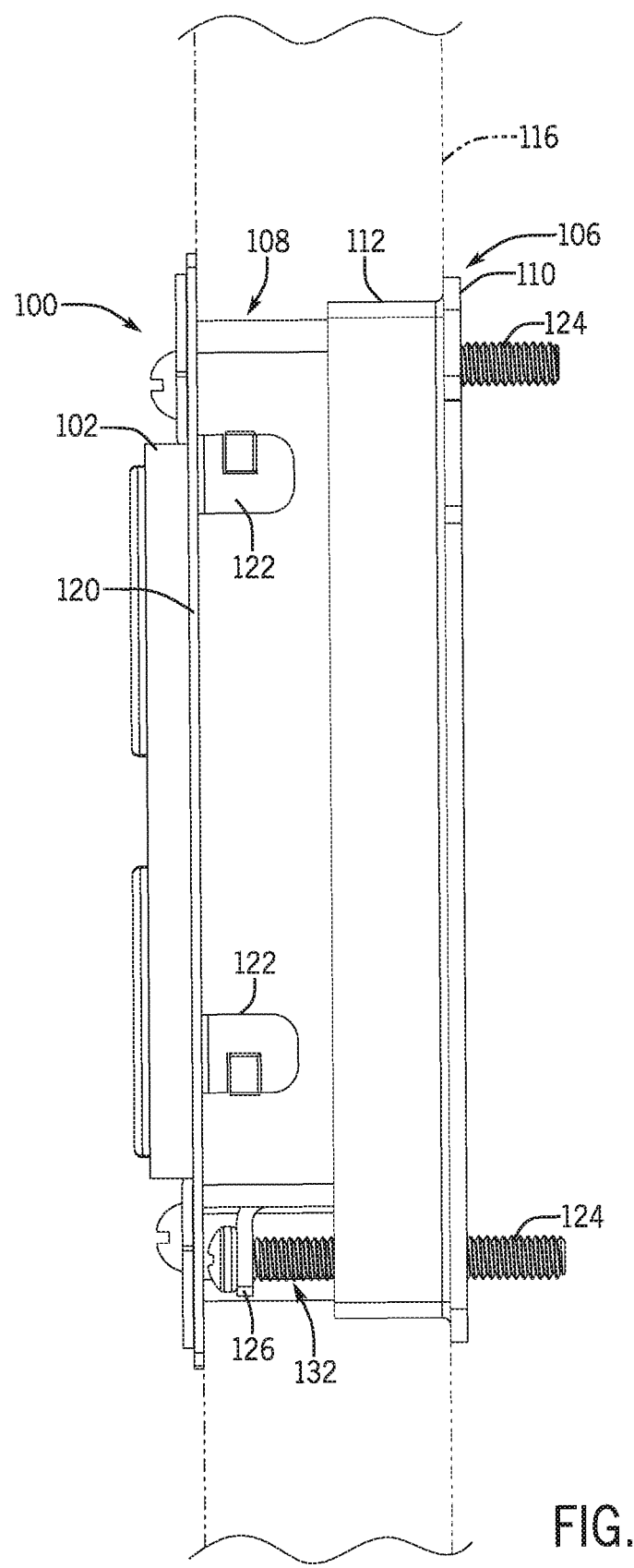
FIG. 19 is a side view of the adjustable depth electrical wall mount ring of FIG. 17 installed in a wall having a first depth.
Figure 20:
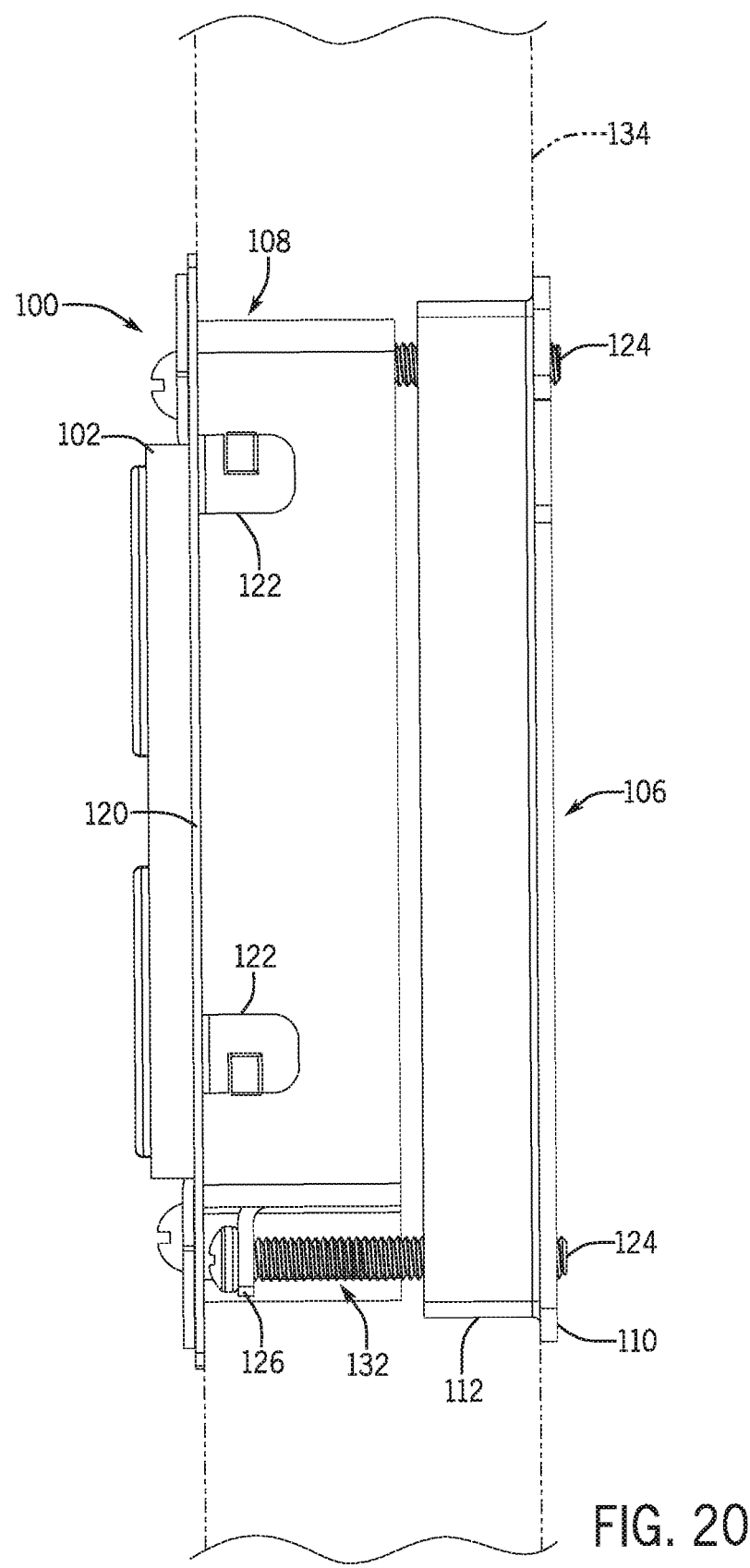
FIG. 20 is a side view of the adjustable depth electrical wall mount ring of FIG. 17 installed in a wall having a second depth.

The finishing ring 108 is generally configured to secure an electrical device (e.g., the electrical receptacle 102) within the central opening 108A of the finishing ring 108, and is sized to slide telescopically within the ring portion 112 of the base ring 106 between a retracted configuration (see, e.g., FIG. 24) and an extended configuration (see, e.g., FIGS. 19 and 20). Thus, the finishing ring 108 can be retracted, as needed for installation of a wall layer or other operation, then extended, as needed, in order to allow for appropriate alignment of an electrical device for final installation and use.

Figure 21B:
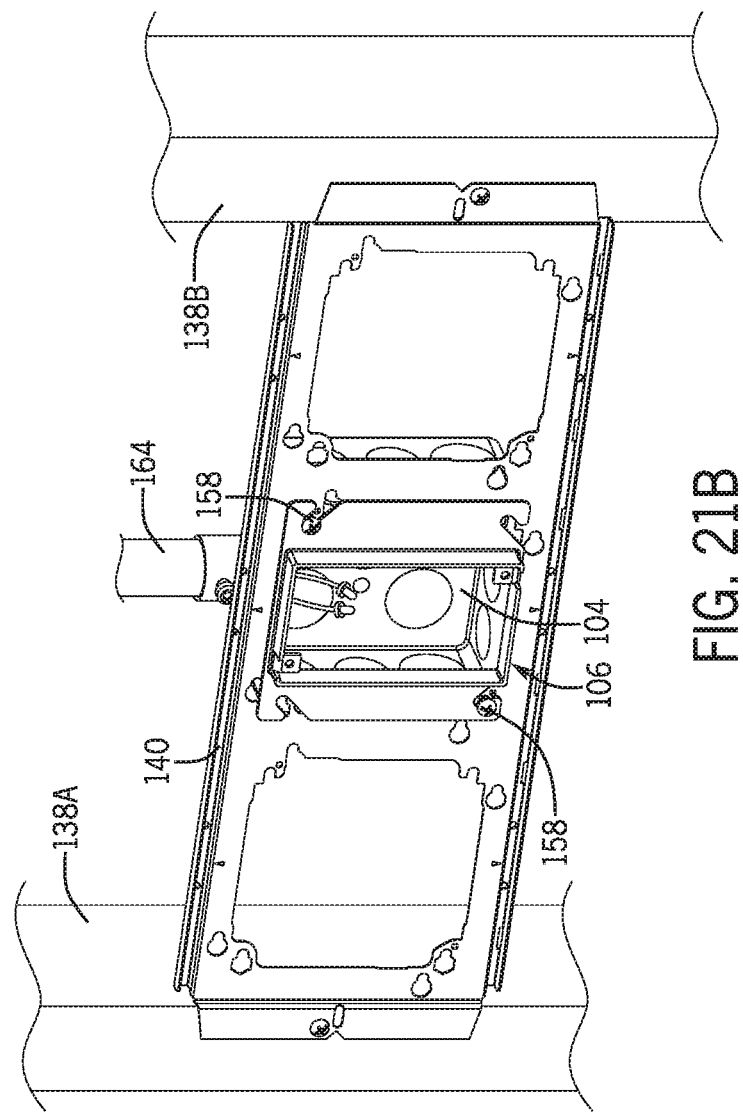
FIG. 21B shows the base ring of the adjustable depth electrical wall mount ring shown in FIG. 17, coupled to an electrical box and a wall-mount bracket, according to an embodiment of the invention.
Figure 21A:
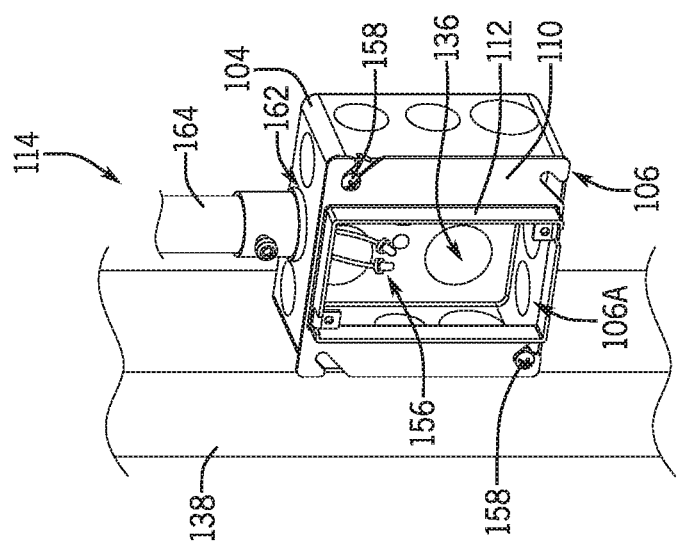
FIG. 21A shows the base ring of the adjustable depth electrical wall mount ring shown in FIG. 17, coupled to an electrical box that is mounted to a wall stud, according to an embodiment of the invention.

In the illustrated embodiment, the finishing ring 108 is sized to extend into a junction box that is attached to the base ring 106 by half or less of a total depth of the finishing ring 108, when the finishing ring 108 is in the retracted configuration. In some embodiments, the finishing ring 108 and the base ring 112 can be sized to extend into the junction box 104 (see, e.g., FIG. 21A) by one half inch or less when the finishing ring 108 is in the retracted configuration (and nested within the central opening 106A). This can be useful, for example, in order to minimize any contact between the finishing ring 108 and electrical components within the junction box, to avoid obstruction of a knock-out or other feature of the junction box (e.g., a knock-out 162 with a conduit 164 therein, as shown in FIG. 21A), and otherwise preserve the space and integrity of the junction box. In some arrangements, a finishing ring can exhibit an axial depth of ¾" and a base ring can exhibit an axial depth of ½", such as can allow ready extension of the rings, collectively, through wall layers of ½" to 1¼", as well as ensuring a relatively small maximum extension of the finishing ring 108 into an attached junction box at a fully retracted configuration. However, a variety of other sizes are also possible and some embodiments can be used with wall layers of greater or smaller thicknesses. Further, as also discussed below, some embodiments can have extended configurations in which a finishing ring can be extended to be spaced axially apart from a base ring, such that the rings can collectively extend through a wall structure with a greater thickness than the combined depth of the rings.

Generally, it may be useful to provide a finishing ring with one or more outward extensions that can extend laterally past a perimeter of a ring portion of the finishing ring. With appropriate adjustment, these extensions can then be caused to bear on an exterior (e.g., room-side) surface of a wall layer during (and after) installation. As also discussed below, this can help to provide appropriate alignment and appropriately secure mounting of an attached electrical device, as well as various other benefits.

As one example, the finishing ring 108 has a set of two tabs 120, each of which extends laterally to the outside of an outer perimeter of the finishing ring 108 along a respective long edge of the finishing ring 108. Further, each of the tabs 120 is longer than the associated long edge of the finishing ring 108. Thus, as also discussed below, the tabs 120 are configured to engage an exterior surface of a wall layer along the sides of an opening in the wall layer through which the finishing ring 108 extends, at a plurality of locations along and past opposing sides of the finishing ring 108. In some embodiments, lateral extensions can be sized so as to extend laterally to the outside of a finishing ring, while also being able to be fully covered by a standard switch or outlet cover plate or other final-installation device, so that the lateral extensions can appropriately engage an exterior surface of a wall layer while also remaining hidden from view.

In different embodiments, lateral extensions may be permanently attached to a finishing ring, may be manually or otherwise attachable to a finishing ring at different points during prefabrication or installation, or can be otherwise configured. As shown in FIG. 18, for example, the tabs 120 have a set of clips 122 that are configured to engage with the finishing ring 108 and retain the tabs 120 on the finishing ring 108. The retention may be accomplished through a friction-fit relationship between the set of clips 122 and the finishing ring 108, a mating relationship in which a portion of a clip 122 (e.g., a prong extending therefrom) is received within a portion of the finishing ring 108 (or vice versa), via an interleaved engagement with opposing sides of the walls of the finishing ring 108 (as shown), or in various other ways. As also discussed below, the tabs 120 can be clipped onto the finishing ring 108 before or after the finishing ring 108 is secured to or adjusted relative to the base ring 106, depending on the particular installation.

In some embodiments, tabs or other outward extensions can be moveable between a first orientation in which the extensions do not extend laterally outside of the outer perimeter of a ring portion of a finishing ring, and a second orientation in which the extensions do extend laterally outside of the outer perimeter of the ring portion of the finishing ring. For example, tabs can be connected to a finishing ring with hinging or other movable attachments, or can be releasably secured to a finishing ring with a fastener that, once loosened, allows the tabs to move between orientations and, once tightened, maintains the orientation. In some embodiments, outward extensions can be formed as part of the finishing ring, including so as to be non-removable.

As also noted above, the adjustable depth electrical wall mount ring 100 can be telescopically adjusted via threaded adjusters that connect the finishing ring 108 and the base ring 106. In particular, threaded fasteners 124 (e.g., standard-thread screws) extend between the base ring 106 and the finishing ring 108, to couple the base ring 106 and the finishing ring 108 together. The threaded fasteners 124 are configured to be rotated in either direction to telescopically adjust the finishing ring 108 in either of two corresponding axial directions, between retracted and extended configurations. For example, during installation operations, as also discussed below, the threaded fasteners 124 can be rotated in a first direction to move the finishing ring 108 from the retracted configuration towards the extended configuration, and thereby extend the finishing ring 108 away from the base ring 106 through a cut opening in a wall layer. The tabs 120 can then be attached, as appropriate, and the threaded fasteners 124 can be rotated in a second direction to move the finishing ring 108 towards the retracted configuration and thereby urge the tabs 120 towards (and into) the exterior surface of the wall layer. In some cases, this can correspondingly also urge the base ring 106 and an attached junction box towards the finishing ring 108 and the wall layer.

In different embodiments, threaded adjustment can be achieved using different arrangements on a finishing ring and on a base ring. In some embodiments, a finishing ring and base ring can include integrally formed features that can receive or support a threaded fastener. For example, the finishing ring 108 includes a set of integrally-formed bent tabs 126 at opposing corners thereof, with openings to receive the threaded fasteners 124, and the base ring 106 includes threaded holes 128 (see FIG. 31) on corresponding tabs 130 also located on opposing corners thereof. Thus, when the threaded fasteners 124 are actuated, relative axial movement of the finishing ring 108 and the base ring 106 can be obtained.

In the illustrated configuration, the tabs 126 are formed so that heads of the threaded fasteners 124 are generally recessed axially rearward of a front lip (or other front surface) of the finishing ring 108. Further, the threaded fasteners 124 extend axially along the outside of the finishing ring 108 within corresponding channels 132. Accordingly, for example, the threaded fasteners 124 may not interfere with wiring or electrical devices within the perimeter of the finishing ring 108, and may not extend forward of the finishing ring 108 to interfere with covers, wall plates, or other components attached thereto.

In other embodiments, however, other configurations are possible. For example, some threaded fasteners can be differently located or supported relative to a finishing ring or a base ring. In some embodiments, a threaded fastener may be captured (e.g., with a collar or a folded retainer) so as to be somewhat fixed against axial movement relative to a finishing ring. In some embodiments, a threaded fastener may threadedly engage a base ring via a differently located or configured threaded opening, including a threaded opening on an extended sleeve (e.g., a cap nut) or otherwise. In some embodiments, non-threaded holes on a base ring can be used in conjunction with self-tapping screws that extend from a finishing ring.

Notably, the use of threaded fasteners can allow an adjustable depth electrical wall mount ring to be manually adjusted in opposing axial directions, between extended and retracted configurations, without requiring the release of latches, ratcheting teeth, and so on. Further, threaded fasteners can allow an adjustable depth electrical wall mount ring to accommodate a wide range of thickness of wall structures, including wall structures with multiple layers or wall structures with one or more relatively thick layers. For example, the adjustable depth electrical wall mount ring 100 can readily span the wall layer 116 (or a similar multi-layer wall structure), as shown in FIG. 19, or a substantially thicker wall layer 134 (or a similar multi-layer wall structure), as shown in FIG. 20, after appropriate adjustment of the threaded fasteners 124. Further, in some cases, even thicker wall structures can also be accommodated through the use of longer threaded fasteners, without necessarily requiring other changes to the design of the adjustable depth electrical wall mount ring 100.

In this regard, metal threaded fasteners (or other metal adjusters) can also provide electrical bonding between a finishing ring and a base ring, even if the finishing ring and the base ring are not themselves in contact. For example, as shown in FIG. 20, the threaded fasteners 124 can maintain electrical continuity between the base ring 106 and the finishing ring 108 even when the base ring 106 and the finishing ring 108 are spaced axially apart from each other (i.e., are not axially aligned). Further, because the bonding between the base ring 106 and the finishing ring 108 is provided by the threaded fasteners 124, rather than via sliding contact between the rings 106, 108, it may generally be relatively easy to adjust the extension depth of the adjustable depth electrical wall mount ring 100 as a whole, even where thermal effects, impacts, or other events may have shifted or deformed one or more relevant components.

Generally, as also discussed above, adjustable depth electrical wall mount rings according to embodiments of the invention can be used to install electrical devices using a variety of combinations of prefabricated and on-site approaches. In some approaches, an electrical device (e.g., the electrical receptacle 102) can be installed prior to installation of a wall layer (e.g., drywall). In many cases, this may generally reduce installation time and also provide other benefits, including the ability to hot check electrical connections before a covering wall layer is in place.

As one example of an installation in which an electrical device is installed before a wall layer, a base ring can be secured to a junction box, a finishing ring can be secured to the base ring and placed in a retracted configuration, and an electrical device can be secured to the finishing ring. A cover can be attached over the electrical device (as needed), the entire assembly can be secured to a wall structure (e.g., directly to a stud or to a stud via a bracket), and a wall layer can then be installed over the entire assembly. A router or other tool can then be used to cut a hole through the wall layer, with the outer perimeter of the base ring (or the cover) providing a cutting guide. Once the hole is cut, the cover can be removed (as needed), and the finishing ring can be telescopically adjusted to extend through the hole towards the exterior side of the wall layer. Finally, extensions (e.g., tabs) can be attached or aligned on the finishing ring and the finishing ring can then be telescopically adjusted back towards the retracted configuration, so that the extensions bear on the exterior surface of the wall layer and, depending on the installation, correspondingly urge the base ring and junction box towards the finishing ring so that the wall layer is sandwiched therebetween.

In this and other similar installations, a variety of different sub-assemblies can be completed as prefabricated assemblies (e.g., off- or on-site) or can be assembled in place as part of installation. For example, a finishing ring, base ring, junction box, cover, electrical device, and associated wiring can be prefabricated and transported (e.g., shipped) together, with a bracket as needed, for collective installation on a wall structure before installation of a wall layer over the entire assembly. Or a sub-combination of these components, such as the base ring, junction box, and wiring, or the finishing ring, electrical device, and cover, can be prefabricated and transported (e.g., shipped) together for installation. In some cases, all of the components can be transported (e.g., shipped) separately, with the entire assembly being completed on a job site. In some embodiments, particular assemblies or sub-assemblies can be labeled during prefabrication for easier matching to particular locations or other sub-assemblies during installation.

Further, unless otherwise required, a variety of the operations discussed above and below can be executed in different orders. For example, a base ring can be secured to a junction box before or after a finishing ring is secured to the base ring. Or an electrical device can be secured to a finishing ring before or after the finishing ring is secured to a base ring, and before or after the base ring is secured to a junction box.

Correspondingly, FIGS. 21A-23 illustrate a variety of configurations for a method of installing an electrical device, which can be implemented separately or in sequence (with various orders) and with varying degrees of prefabrication. In some embodiments, the illustrated configurations can represent initial operations of an installation operation, based on received prefabricated assemblies. However, in other embodiments the same configuration(s) may represent an intermediary operation, with other preceding operations (e.g., assembly of components) having been already completed at an installation site.

First looking at FIG. 21A, the base ring 106 is shown secured to the junction box 104 with the ring portion 112 of the base ring 106 extending away from a front opening 136 of the junction box 104. The base ring 106 is mounted to the junction box 104 with fasteners 158 that secure the attachment portion 110 to the junction box 104. The junction box 104 can be secured to a stud 138 (or other wall structure member), in an operation that can be performed before or after the attachment of the base ring 106 to the junction box 104. In different embodiments, the base ring 106 can be mounted to the junction box 104 as a prefabrication operation or at the installation site.

In some embodiments, as also discussed above, a junction box can be secured to a wall structure using a bracket, rather than directly. For example, FIG. 21B shows the junction box 104 secured to a mounting bracket 140, which extends between and is rigidly secured to wall structure members 138A, 138B. In particular, the mounting bracket 140 is captured between the junction box 104 and the attachment portion 110 of the base ring 106, although other mounting configurations and other types of brackets are possible. In this regard, some embodiments may provide particular advantages relative to conventional systems. For example, in some conventional box extenders, extension of a ring portion behind an attachment portion can prevent the box extenders from being attached to certain types of brackets. As with other sub-assemblies discussed herein, the sub-assembly illustrated in FIG. 21B, or portions thereof, can be prepared through prefabrication operations or at an installation site, and with various orders of assembly.

To continue installation of an electrical device prior to installation of a wall layer, the electrical device can be attached to a base ring via a finishing ring. For example, FIG. 22 illustrates a configuration in which a finishing ring assembly 142, including the finishing ring 108 and the electrical receptacle 102, is mounted to the base ring 106 As desired, electrical connections between the electrical receptacle 102 and circuit conductors 156 within the junction box 104 (see FIG. 21A) can be made before or after the finishing ring assembly 142 is fully attached. In some embodiments, the electrical receptacle 102 can be installed on the finishing ring 108 before or after the junction box 104 is secured to the stud 138 (or other wall structure), before or after the base ring 106 is secured to the junction box 104, or before or after the finishing ring 108 is installed on the base ring 106. Correspondingly, some embodiments may include attachment of the finishing ring assembly 142 to the base ring 106 and the junction box 104 and connection of wiring for the electrical receptacle 102 in a prefabrication operation, remotely from an installation location. Further, some embodiments, including as discussed below, can include installation of the assembly of FIG. 22 (or a similar other arrangement), but without an electrical device, which can be installed in a later operation (e.g., after a wall layer has been installed and cut).

In some embodiments, as also discussed above, a cover can be installed on part or all of an adjustable depth electrical wall mount ring before a wall layer, to protect electrical devices and prevent debris from entering an opening in a base or finishing ring or a junction box. For example, in implementations in which the electrical receptacle 102 is installed before a wall layer that will overlay the associated junction box, the cover 144 can be installed over the electrical receptacle 102 prior to installation of the wall layer. The cover 144 can thus protect the electrical receptacle 102—and the electrical assembly generally—during installation of the wall layer (e.g., drywall) and subsequent cutting, mudding, tiling, painting, or other operations, while also helping to prevent debris from entering the junction box 104. Further, in some cases, the cover 144 can extend laterally outside of the perimeter of the base ring 106 (or the finishing ring 108) and, correspondingly, can provide a guide surface for a cutting (e.g., routering) operation in addition to preventing a cutting tool from entering the space within the base ring 106, the finishing ring 108, and the junction box 104 generally. In other embodiments, a cover may not extend laterally past the perimeter of the base ring and, for example, the base ring may then provide a guide for cutting operations.

FIG. 23 illustrates the result of an installation operation in which the finishing ring 108 has been mounted to the base ring 106, the base ring 106 has been mounted to the junction box 104, the electrical receptacle 102 has been mounted to the finishing ring 108 (see FIG. 22), and the cover 144 has been installed over the finishing ring 108 to cover the electrical receptacle 102 and the openings into the junction box 104 provided by the finishing ring 108 and the base ring 106. Thus, as also discussed above, the cover 144 is arranged to protect the electrical receptacle 102 and electrical components within the junction box 104, and to block debris (e.g., from routering and mudding operations) from entering the finishing ring 108, the base ring 106, and the junction box 104. In some embodiments, a differently configured cover can be used in order to accommodate particular sizes, profiles, or other characteristics of an electrical device. For example, some covers can include protruding central portions that can extend over protruding features of an electrical device.

In some implementations, a cover can be installed on a job site, such as after an electrical device has been installed and relevant electrical connections made. In some implementations, a cover can be installed as part of a prefabrication operation, and an assembly including two or more of the cover, a finishing ring, a base ring, a junction box, or one or more electrical devices can be transported to a job site for installation. In some implementations, no cover may be used, although in some contexts this may result in unwanted infiltration of debris or tools into an electrical assembly, or other issues.

Once a relevant electrical assembly has been secured to wall structure (e.g., within a stud cavity), one or more wall layers can then be installed over the electrical assembly. For example, drywall can be installed over the assembly illustrated in FIG. 23 or similar other assemblies (e.g., a bracket assembly such as shown in FIG. 21B). As noted above, some such assemblies can have an electrical device, a base ring, a finishing ring, a junction box, and a cover in place before the wall layer is installed, although one or more of these components can be omitted in some cases. Similarly, although it may be beneficial to complete electrical connections (e.g., within a junction box) before installing a wall layer, electrical connections can be made after the installation of a wall layer in some implementations.

Generally, an adjustable depth electrical wall mount ring can be installed so that the front edge of a junction box, bracket, or attachment portion of a base ring is flush with a plane corresponding to an interior side of the wall layer. Accordingly, the ring portion of the base ring may extend past such a plane, resulting in local deformation of the wall layer upon installation. In some implementations, however, other alignments are possible. Further, depending on the type and strength of a mounting connection between the relevant electrical assembly and a wall structure, installation of a wall layer may sometimes deflect the electrical assembly further into the wall (e.g., into the stud cavity). For example, with a relatively loose or flexible connection between a junction box and a stud, installation of drywall may cause the junction box and any attached components (e.g., components of an adjustable depth electrical wall mount ring) to deflect away from the drywall.

In any case, once the wall layer has been installed, with a cover or a base ring of an adjustable depth electrical wall mount ring at least partly seated against an interior surface of the wall layer, an operator can execute a cutting operation in order to provide a hole in the wall layer that is aligned with the installed components of the adjustable depth electrical wall mount ring, particularly the ring portion of the base ring thereof. As also noted above, the ring portion or a cover attached thereto can usefully provide a guide for such a cutting operation, which can help to ensure that the resulting hole is sufficiently large to receive the ring portion, while not being so large as to require later patching. Similarly, a cover can also help to prevent a cutting tool or associate debris from entering into the opening through the ring portion and, potentially, impacting electrical devices supported by the ring portion or pre-installed within the associated junction box.

Figure 24:
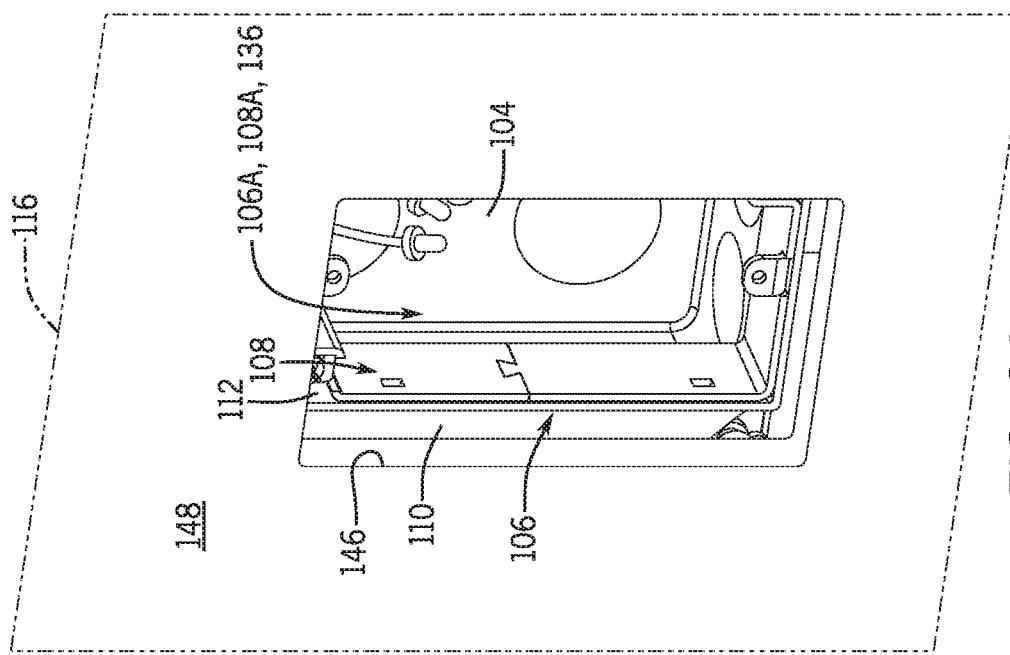

As an example, looking to FIG. 24, the wall layer 116 has been installed over the assembly shown in FIG. 23, and an opening 146 has been cut through the wall layer 116, as guided by the cover 144 (see FIG. 23) or by the base ring 106, to provide access to the front opening 136 of the junction box 104 via the adjustable depth electrical wall mount ring 100. The cover 144 can then be removed via the opening 146 for further operations.

Figure 25:
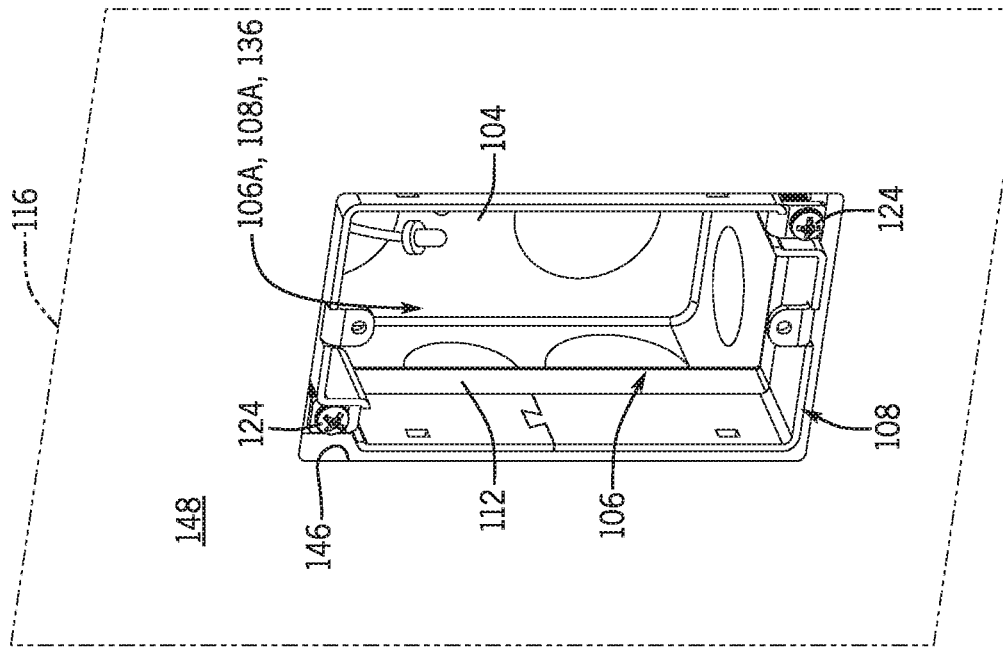
FIGS. 24-27 show operations for installation of an electrical device, using the adjustable depth electrical mount ring shown in FIG. 17, according to an embodiment of the invention.
Figure 26:
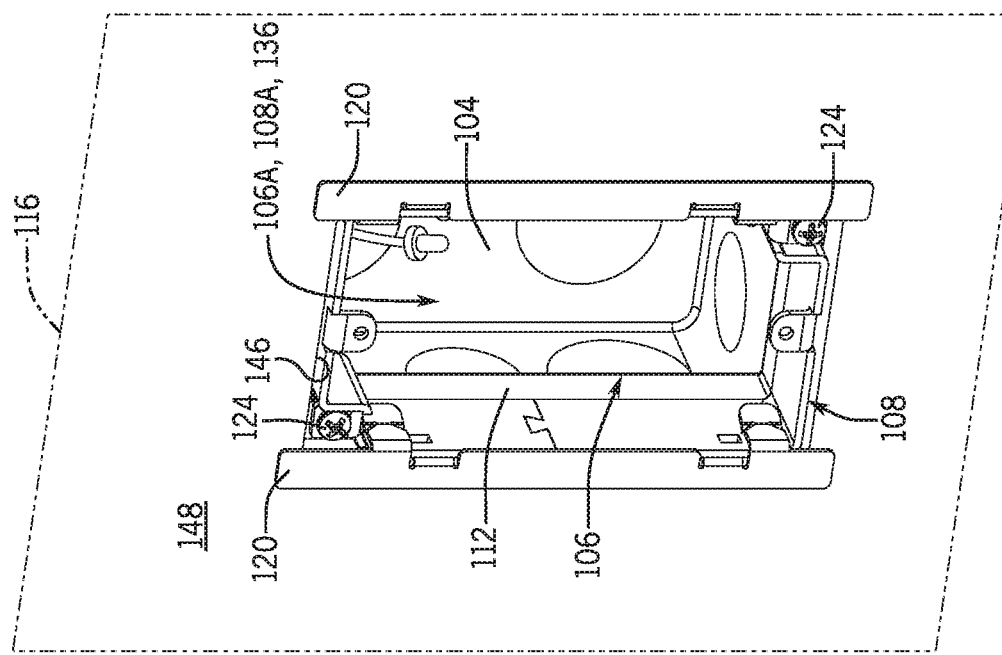

In the example configurations and operations illustrated in FIGS. 24-26, the electrical receptacle 102 has been removed in order to provide more convenient views of other components. However, in some embodiments, some or all of the operations described with respect to FIGS. 24-26 can be implemented with the electrical receptacle 102 in place.

In some embodiments, as also noted above, the alignment of the adjustable depth electrical wall mount ring 100 before the wall layer 116 is installed may result in the wall layer 116 being deflected away from the adjustable depth electrical wall mount ring 100 or the adjustable depth electrical wall mount ring 100 being deflected away from the wall layer 116, although this may not occur in all cases.

In some cases, once the opening 146 has been cut, an elastic response of the wall layer 116 or of the electrical assembly (e.g., a bracket supporting the junction box 104) can sometimes cause the ring portion 112 of the base ring 106 to spring into the opening 146. The result of this effect can be seen in FIG. 24, in which the ring portion 112 of the base ring 106 and the finishing ring 108 extend partly into the opening 146 from the interior side of the wall layer 116. This may usefully dispose the finishing ring 108 for easy access for further installation operations, including telescopic adjustment of the finishing ring 108. Notably, however, further successive operations, such as those discussed below, can be implemented regardless of whether such a spring response occurs, including for installations in which the electrical assembly is plastically deflected away from the wall layer 116 prior to cutting operations.

Once a hole has been cut through a wall layer (or layers), a finishing ring can then be adjusted in order to align the finishing ring to support the relevant electrical device in appropriate alignment with the exterior surface of the wall layer(s). In some implementations, as also noted above, this may include adjustment of a finishing ring that has been preinstalled prior to installation of the wall layer(s). For example, through actuation of the threaded fasteners 124 of the adjustable depth electrical wall mount ring 100, the finishing ring 108 can be telescopically adjusted in an axial direction from the retracted configuration of FIG. 24 to the extended configuration of FIG. 25.

In the illustrated examples, the front lip of the finishing ring 108 is flush (i.e., axially aligned) with the front lip of the base ring 106 in the retracted configuration, and is flush (i.e., axially aligned) with an exterior surface 148 of the wall layer 116 in the extended configuration. However, other alignments are possible. For example, in some cases the finishing ring 108 can first be adjusted so that the front lip thereof extends axially out of the opening 146 past the exterior surface 148, and can later be adjusted back towards the retracted configuration (e.g., to clamp the wall layer 116) between extensions of the finishing ring 108 and the attachment portion 110 of the base ring 106. Similarly, in some implementations, the finishing ring 108 can be retracted axially behind a front lip of the ring portion 112 of the base ring 106 when in the retracted configuration.

Generally, the threaded fasteners 124 can be rotated in a first direction to adjust the finishing ring 108 in an axially outward direction (i.e., towards the extended configuration) and in a second direction to adjust the finishing ring 108 in an axially inward direction (i.e., towards the retracted configuration). Other adjusters, however, may operate differently.

Once a finishing ring has been appropriately extended, lateral extensions of the finishing ring can be arranged for engagement with the relevant wall layer, such as for engagement with the exterior surface of the wall layer. As also noted above, some extensions can be included on a finishing ring when the finishing ring is installed, or otherwise prior to installation of a wall layer, then moved into an engagement position (e.g., pivoted or slid laterally outward) once the finishing ring has been appropriately extended into (e.g., fully through) a cut opening in the wall layer.

In some implementations, extensions can be attached after a hole has been cut through a wall layer, including after a finishing ring has been extended therethrough. For example, FIG. 26 shows the tabs 120 attached to the finishing ring 108, such as may be accomplished using hand tools (or otherwise) once the finishing ring 108 has been adjusted to extend through the opening 146. In some implementations, it may be helpful to adjust the finishing ring 108 to extend axially past the exterior surface 148 at the opening 146 so that the tabs 120 (or other extensions) can be easily attached, although other approaches are possible. For example, some extensions can be configured to extend axially partly through an opening through a wall layer, between an exterior surface of a wall layer and part of a finishing ring that is disposed within the opening.

As shown in FIG. 26, with appropriate configuration, the tabs 120 or other extensions can extend well past the edges of a cut opening in a wall layer, even if the edges of the opening are geometrically irregular or relatively wide with respect to the perimeter of the finishing ring. Thus, for example, engagement of a wall layer by extensions of a finishing ring can be readily achieved even in the case of less than ideal cutting operations. In other embodiments, however, other lateral extensions of other geometries can be used.

Once a finishing ring and its extensions are appropriately aligned relative to an opening of a wall layer, the finishing ring can then be adjusted back towards the retracted configuration. With sufficient adjustment, this can result in the extensions bearing against an exterior surface of the wall layer, to appropriately align and support the finishing ring and any electrical device supported by the finishing ring. For example, some extensions can engage a wall layer in order to appropriately align and support a yoke of an electrical receptacle relative to the exterior surface of the wall layer.

With sufficient actuation of an adjuster, extensions of a finishing ring can be urged into the exterior surface of a wall layer so as to correspondingly urge a base ring and attached components (e.g., a junction box) axially outward towards the exterior surface of the wall layer. This may be particularly useful, for example, when a junction box is not strongly secured behind the wall layer and has accordingly been deflected into the stud cavity by installation of the wall layer (as also discussed above). In this case, adjustment of the finishing ring to clamp the wall layer between the extensions and the base ring (or another component attached thereto) can help to return the junction box to appropriate alignment relative to the wall layer, and also generally further secure the junction box, and the electrical assembly as a whole, relative to the wall structure as a whole.

Figure 27:
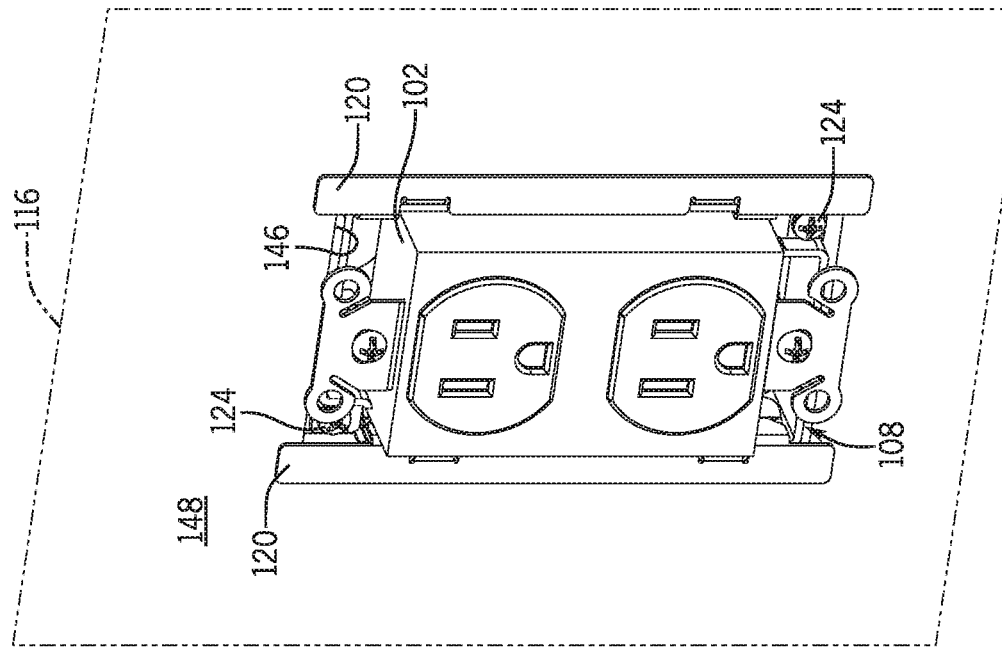

Consistent with these principles, FIG. 26 illustrates an example configuration in which the threaded fasteners 124 have been rotated to move the finishing ring 108 back toward the retracted configuration so that the tabs 120 bear against the exterior surface 148 of the wall layer 116. Correspondingly, the adjustable depth electrical wall mount ring 100 clamps the wall layer 116 between the tabs 120 and the base ring 106 (e.g., the attachment portion 110 thereof) to firmly secure the electrical receptacle 102 (see FIG. 27) in appropriate alignment relative to the wall layer 116. Further, with sufficient actuation of the threaded fasteners 124, the junction box 104 can be correspondingly urged toward the finishing ring 108, such as may help to remedy any previous misalignment of the junction box 104 (e.g., due to deflection thereof by installation of the wall layer 116).

As also noted above, in some installations, an electrical device can be installed after a wall layer. In some cases, such an installation can include installing an electrical assembly that includes a base ring, but not a finishing ring, before the wall layer is installed. Then, after the wall layer has been installed and cut to expose the base ring, a finishing ring can be installed, along with an attached electrical device. As also similarly discussed above, differently configured sub-assemblies for this type of installation can be prepared in different ways and in different locations. For example, a first sub-assembly that includes a junction box, a base ring, a cover, and associated wiring or other electrical components can be assembled in whole or in part in a prefabrication operation and then transported to an installation site. Or such a sub-assembly can be assembled in whole or in part at an installation site (e.g., with a prefabricated further sub-assembly, such as a base ring and a cover, thereafter secured thereto). Likewise, a second sub-assembly that includes a finishing ring and an electrical device can also be assembled in whole or in part in a prefabrication operation and then transported to an installation site (e.g., with appropriate labels to identify installation locations), or such a sub-assembly can be assembled in whole or in part at an installation site.

Once a first sub-assembly, such as a sub-assembly with a junction box, base ring, and a cover (as needed), has been installed on a wall structure (e.g., secured to a stud), a wall layer can then be installed over the sub-assembly, including as described above relative to FIGS. 22 and 23 (but without the electrical receptacle 102). A cut can then be made through the wall layer, as guided by the base ring or a cover attached thereto, to expose the base ring through the cut opening. A finishing ring can then be installed with an electrical device, or can be extended to receive an electrical device, and extensions on the finishing ring can be aligned and adjusted to engage the exterior surface of the wall layer (e.g., as discussed above relative to FIGS. 25-27).

Figure 29:
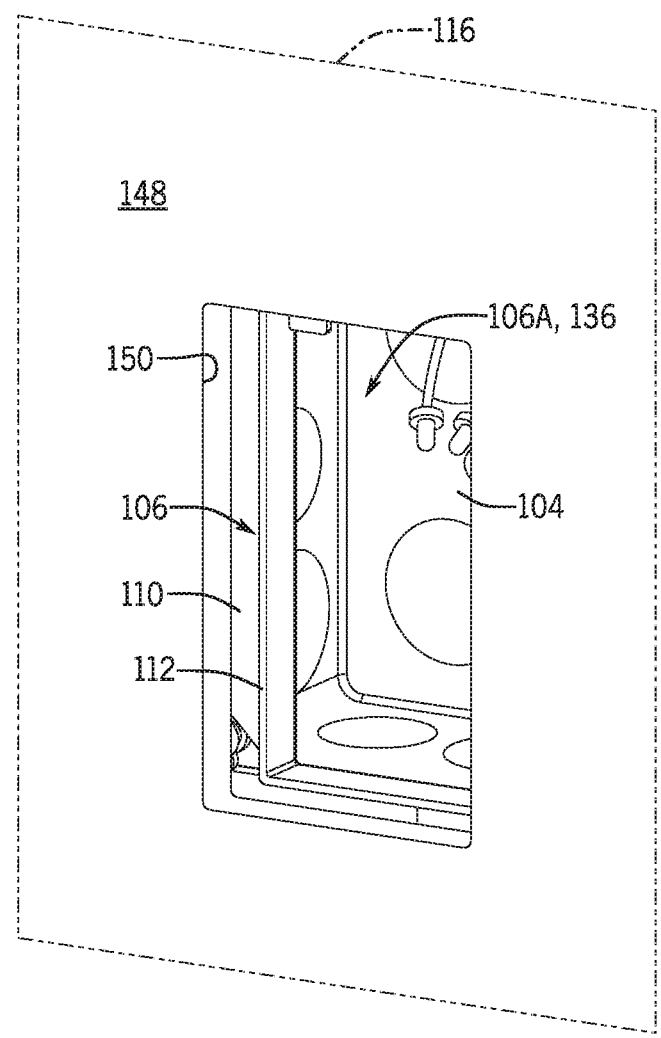
FIGS. 29-30 show operations for the installation of an electrical device, using the adjustable depth electrical mount ring shown in FIG. 17, according to an embodiment of the invention.
Figure 30:
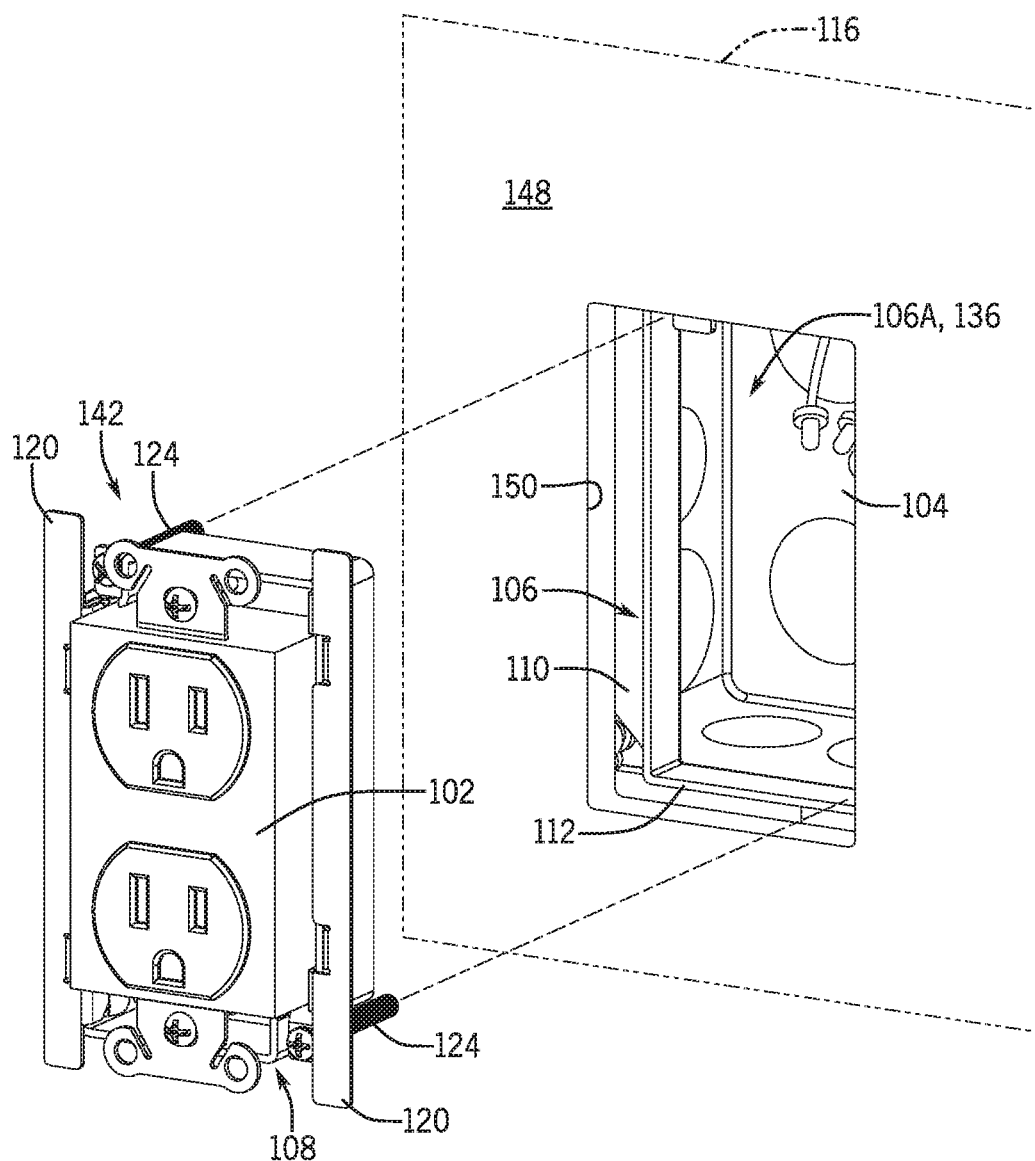

Consistent with these general principles, FIGS. 28-30 illustrate an example installation in which an electrical device is installed after a wall layer. In particular, as shown in FIG. 28, a first sub-assembly including the junction box 104, the base ring 106, and the cover 144 can be secured to the stud 138 (or other wall structure) using various known approaches. As similarly discussed above, this sub-assembly can be prefabricated and then transported as a whole for installation on a wall structure, can be partially prefabricated, or can be assembled in its entirety at the installation site.

Once the sub-assembly has been installed as shown in FIG. 28, the wall layer 116 can then be installed, to extend over the sub-assembly. As similarly noted above, in some implementations, installation of the wall layer 116 can result in deflection of the wall layer 116 or of the junction box 104, depending on the relative alignment of the base ring 106 and the wall layer 116, and the rigidity of the connection between the junction box 104 and the stud 138. In any case, the ring portion 112 of the base ring 106 may generally remain in contact with the interior side of the wall layer 116 and can correspondingly serve as a cutting guide, such as for a routering operation, so that an opening 150 can be cut in alignment with the central opening in the base ring 106. Depending on various factors, as also discussed above, the base ring 106 may sometimes spring into the opening 150 once the opening 150 has been cut (see, e.g., FIG. 29), although this effect is not required for completion of the remaining operations discussed below.

Once the opening 150 has been cut, a second sub-assembly, including a finishing ring and an electrical device, can then be installed. For example, as illustrated in FIG. 30, the finishing ring assembly 142, including the electrical receptacle 102, the finishing ring 108, and the tabs 120 can be aligned with the opening 150, then installed onto the base ring 106 using the threaded fasteners 124. The threaded fasteners 124 can then be adjusted, as similarly described with respect to FIGS. 26 and 27, to urge the tabs 126 into engagement with the exterior surface 148 of the wall layer 116 adjacent to the opening 150, to appropriately align the electrical receptacle 102, and, as needed, to clamp the wall layer 116 between the tabs 126 and the base ring 106 to also urge the junction box 104 towards the wall layer 116 and into appropriate alignment.

In some implementations, as similarly discussed above, it may be useful to prefabricate the finishing ring assembly 142, such as at an off-site prefabrication facility, so that the entire finishing ring assembly 142 can be received and installed at the appropriate installation site (e.g., as indicated with labeling on each instance of the assembly 142). In some implementations, however, other approaches are possible. For example, in some cases, the finishing ring 108 can be installed onto the base ring 106 after the opening 150 has been cut, and an electrical device (e.g., the receptacle 102) or the tabs 120 can then be installed onto the finishing ring 108. As another example, the finishing ring 108 can be installed onto the base ring 106 before the wall layer 116 is installed, with the finishing ring 108 also protected by the cover 144, and an electrical device and lateral extensions can be installed (or reoriented, as appropriate) after the opening 150 has been cut and, for example, after the finishing ring 108 has been adjusted toward the extended configuration.

In different embodiments, different types of covers can be used, as needed. In some embodiments, a cover can be configured to be secured to and removed from part of an adjustable depth electrical wall mount ring without requiring the use of tools or separate fasteners. In some embodiments, a cover can be configured to either of a base ring or a finish ring, to be secured only to a base ring or a finish ring, or to be secured to a base ring regardless of whether a finish ring has also been installed.

Figure 31:
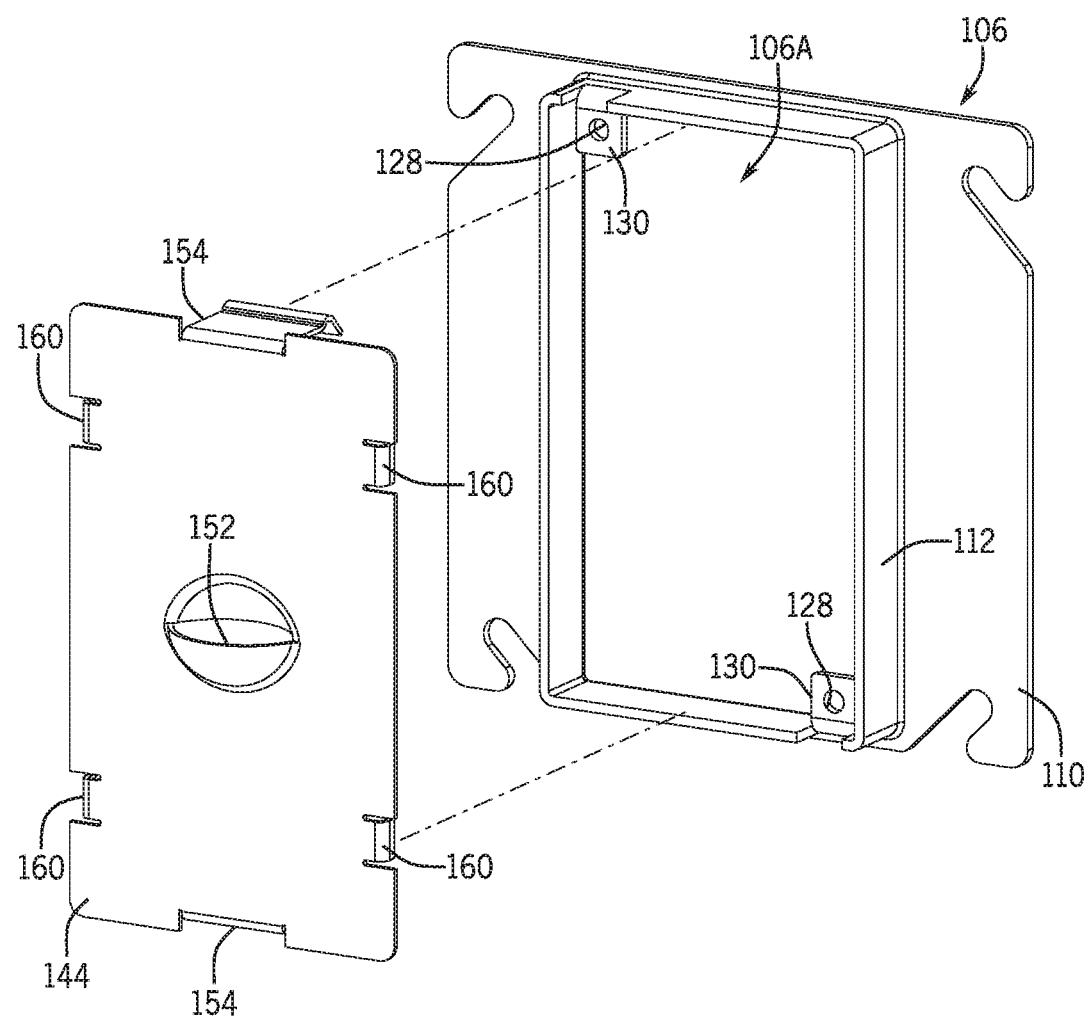
FIG. 31 is an exploded view of a cover and a base ring of the adjustable depth electrical ring shown in FIG. 17.

In some embodiments, a cover can include features that allow the cover to be easily (e.g., manually) removed via an opening that has been cut in a wall layer. For example, as shown in FIG. 31, the cover 144 includes a finger-hold 152, which is configured in the illustrated embodiment as a generally circular projection towards the center of the cover 144. The finger-hold 152 can provide a place to easily grip the cover 144 for removal via an opening in a wall layer (or otherwise). Removal of the cover 144 via a wall opening may be particularly easy if the cover 144 itself serves a guide for a cutting operation, such that the resulting opening is somewhat larger than the cover 144. However, other approaches are also possible.

Figure 32:
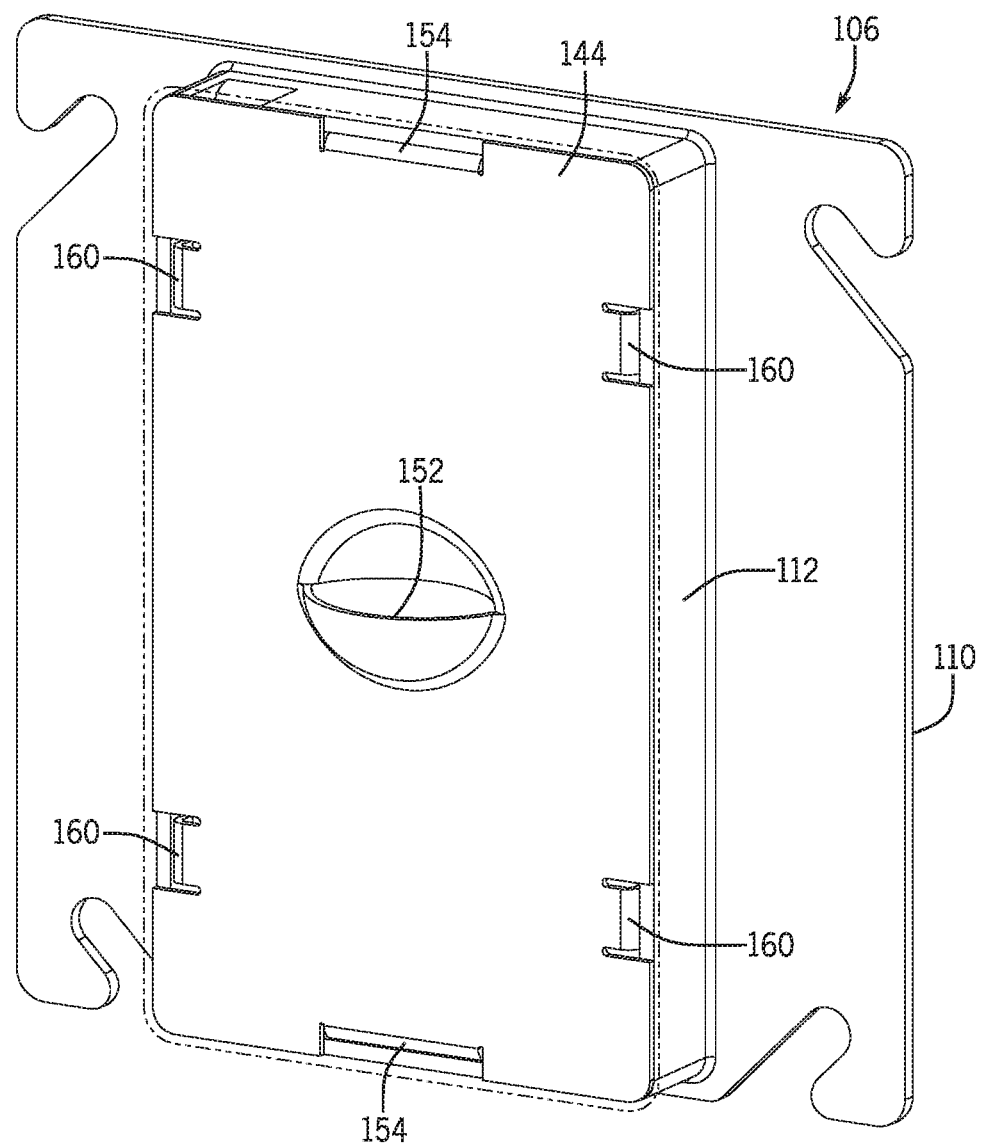
FIG. 32 shows a cover attached to a base ring of the adjustable depth electrical mount ring shown in FIG. 17.

In some embodiments, it may be useful to provide attachment features for a cover that extend only within the interior perimeter of a ring portion of a base ring (or of a finishing ring), so that cutting tools used to cut a hole around the base ring (or otherwise) do not tend to dislodge or damage the attachment features. For example, as shown in FIGS. 31 and 32 the cover 144 includes a set of attachment features configured as spring-like retainer arms 154 on a first set of opposing sides thereof, and a set of alignment tabs 160 extending along a second set of opposing sides thereof. As shown in FIG. 32 in particular, the retainer arms 154 and the alignment tabs 160 are fully enclosed by the ring portion 112 of the base ring 106 when the cover 144 is secured thereto. Further, due to the flexible configuration of the attachment features, the cover 144 can be appropriately securely attached to the base ring 106 during installation, but can still be relatively easily removed (e.g., manually, using the finger-hold 152) once a hole has been cut through the relevant wall layer.

In some embodiments, a cover can be sized to extend laterally to be flush with an outer perimeter of a ring portion of a base ring, to extend laterally only within the lateral interior of a ring portion of a base ring, or to extend laterally to the outside of a ring portion of a base ring (e.g., as shown for the cover 144 in FIG. 32, relative to the ring portion 112). In some embodiments, a cover can extend by different amounts beyond a ring portion than the cover 144, such as shown in dotted relief in FIG. 32.

Figure 33:
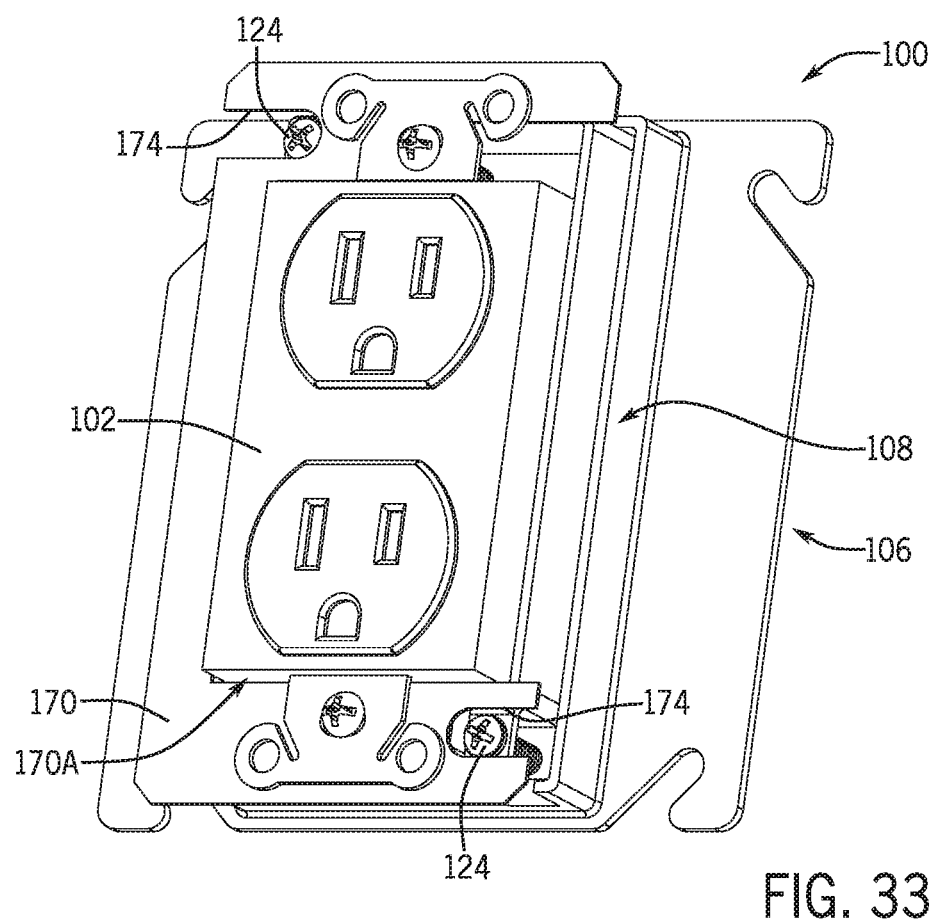
FIG. 33 is a front isometric view of an adjustable depth electrical mount ring with a tab plate according to an embodiment of the invention.

As also noted above, different types of lateral extensions can be provided for a finishing ring. For example, FIG. 33 illustrates an arrangement of the adjustable depth electrical wall mount ring with lateral extensions provided by a tab plate 170. In particular, the tab plate 170 is configured to extend along multiple (e.g., three) sides of the central opening 118 of the finishing ring 108, when the tab plate 170 is secured to the finishing ring 108, such as may help to ensure appropriate engagement with an exterior surface of a wall layer during installation. In this regard, similarly to the tabs 120, as the finishing ring 108 is moved towards the base ring 106 via actuation of the threaded fasteners 124, the tab plate 170 can make contact with the exterior surface of the relevant wall layer and, with continued driving of the threaded fasteners 124, can clamp the wall layer to urge an attached junction box, via the base ring 106, toward the finishing ring 108.

Figure 34:
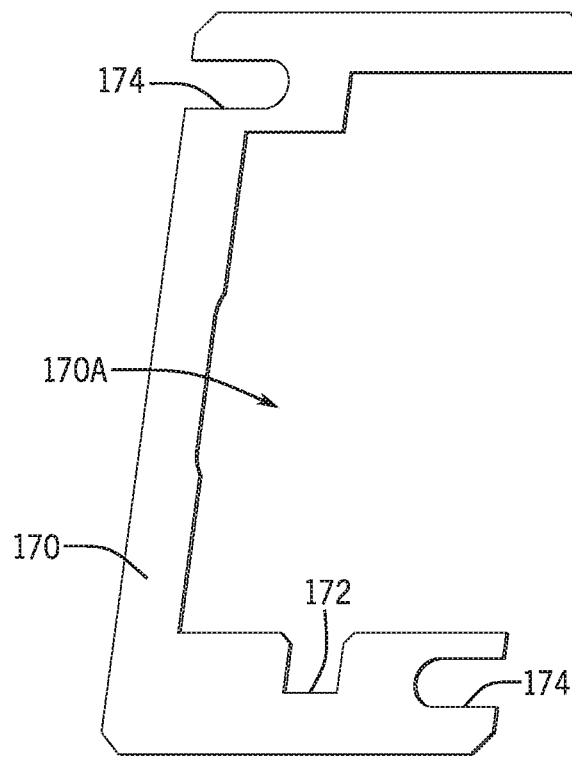
FIG. 34 is an isometric view of the tab plate of FIG. 33.

In different embodiments, a tab plate can be secured to a finishing ring in different ways, including through the use of clips (e.g. similar to the clips 122 on the tabs 120, as shown in FIGS. 17 and 18) or through the use of fasteners that also secure other components. For example, the tab plate 170 is configured to be secured to the finishing ring 108 using the fasteners that also secure the electrical receptacle 102 to the finishing ring 108 and the threaded fasteners 124 that allow the finishing ring 108 to be telescopically adjusted. Specifically, as shown in FIG. 34 in particular, the tab plate 170 includes an inner notch 172 that extends from a large central opening 170A that is configured to receive an electrical device, and a set of laterally opening notches 174 at opposing corners thereof.

Figure 35:
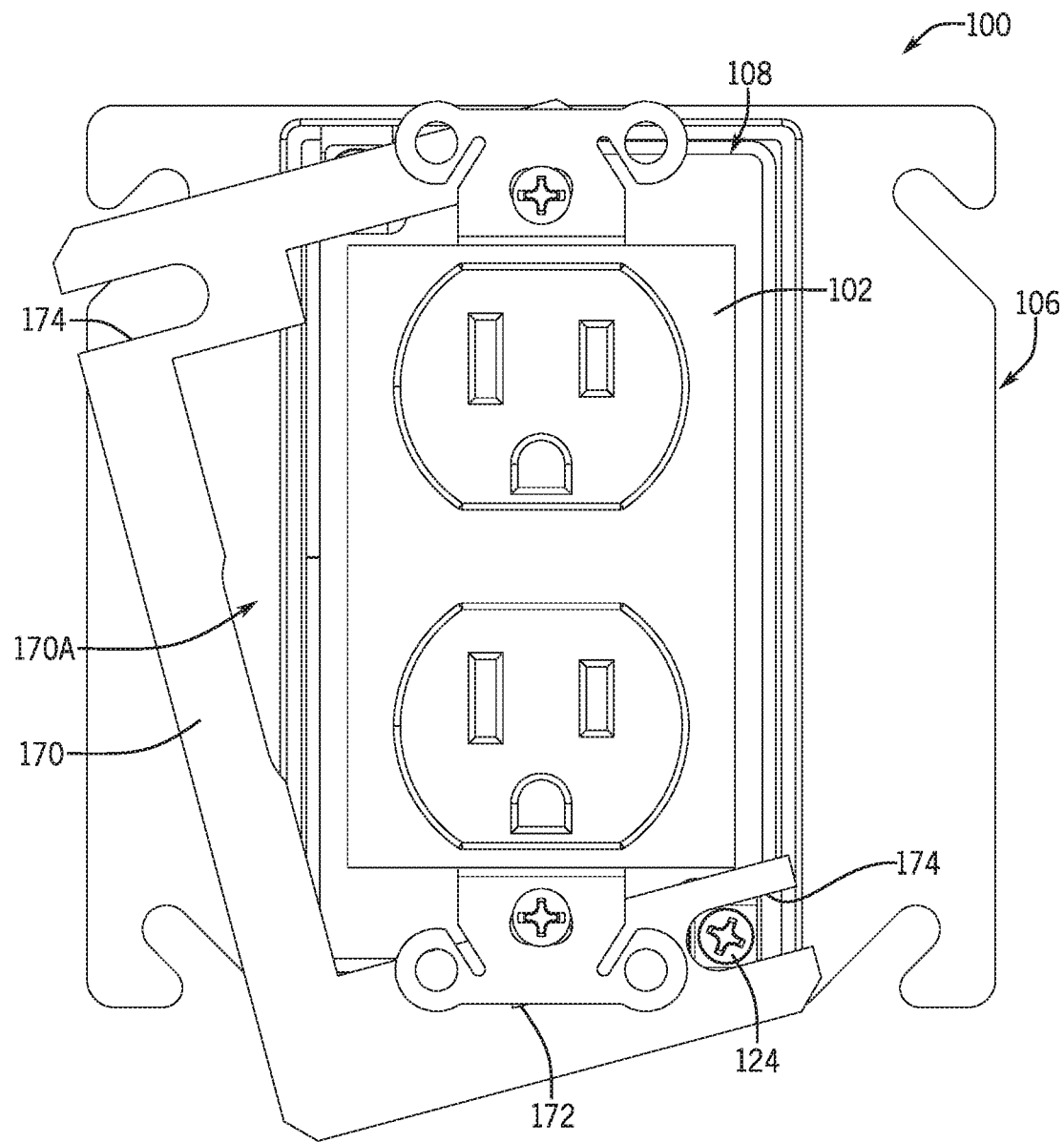
FIG. 35 is a front view illustrating installation of the tab plate onto the adjustable depth electrical mount ring of FIG. 33.

Thus, as illustrated in FIG. 35, the tab plate 170 can be installed without the need to remove the electrical receptacle 102 or the threaded fasteners 124. In particular, a first one of the notches 174 can be engaged with a first one of the threaded fasteners 124, then the tab plate 170 can be pivoted about that threaded fastener 124 (and the notch 174) until the inner notch 172 is seated around a screw to secure the electrical receptacle 102 and the other of the laterally opening notches 174 is seated around the other of the threaded fasteners 124 (see FIG. 33). In some cases, the relevant fasteners can then be tightened, as needed, to further secure the tab plate 170 to the finishing ring 108.

Figure 36:
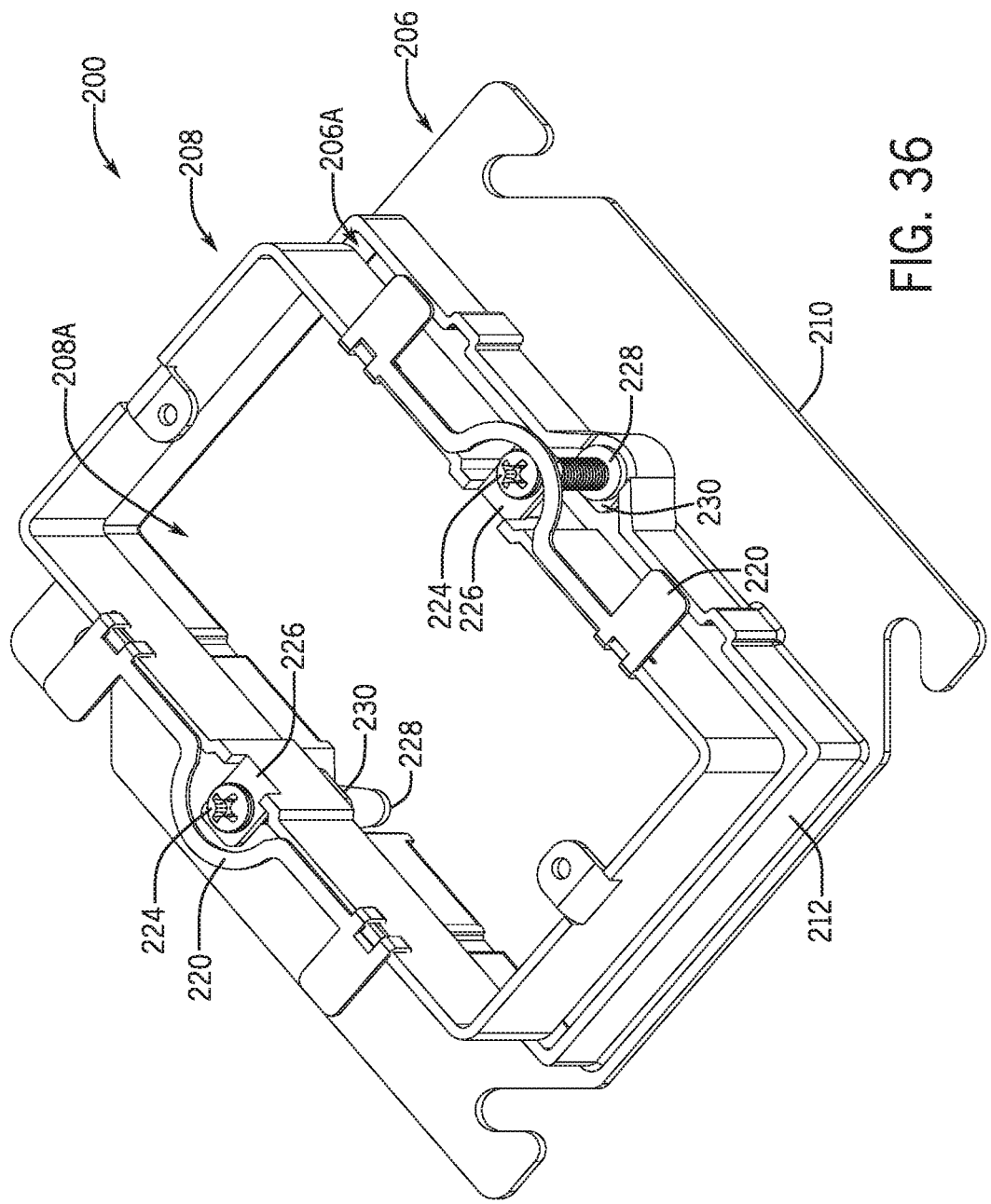
FIG. 36 is a front isometric view of an adjustable depth electrical mount ring according to an embodiment of the invention.

In other embodiments, as also noted above, different configurations are possible. For example, an adjustable depth electrical wall mount ring 200 according to another embodiment of the invention is illustrated in FIG. 36. In many aspects, the adjustable depth electrical wall mount ring 200 is similar to the adjustable depth electrical wall mount ring 100 described above, and is similarly operable. Correspondingly, similar numbering in the 200 series is used for the adjustable depth electrical wall mount ring 200. For example, the adjustable depth electrical wall mount ring 200 has a base ring 206 and a finishing ring 208. Likewise, the base ring 206 has an attachment portion 210 and a ring portion 212, and the finishing ring 208 has a central opening 208A and is configured to move telescopically within a central opening 206A of the ring portion 212 of the base ring 206.

In some aspects, however, the adjustable depth electrical wall mount rings 100, 200 differ from each other. For example, the finishing ring 208 includes outwardly extending tabs 226 along elongate sides thereof, which are configured to support threaded fasteners 224. Correspondingly, the ring portion 212 of the base ring 206 includes inwardly extending tabs 230 that support threaded sleeves 228 along the elongate sides of the ring portion 212. The threaded fasteners 224 extend along the lateral outside of the finishing ring 208 towards the threaded sleeves 228 and extend into and through the threaded sleeves 228 along the lateral inside of the ring portion 212.

The threaded sleeves 228 are also configured to extend into the interior of a junction box (not shown in FIG. 36) when the base ring 206 is secured thereto. Generally, the threaded sleeves 228 are configured to entirely circumferentially enclose the threaded fasteners 224 along the length of the threaded sleeves 228. Further, the threaded sleeves 228 have sufficient length, extending away from the finishing ring 208, so that the threaded fasteners 224 do not extend past the threaded sleeves 228 into the junction box, including when the finishing ring 208 is in the retracted configuration. Accordingly, the sleeves 228 can help to ensure that the threaded fasteners 224 do not adversely affect any electrical devices or connections within the junction box as the finishing ring 208 is adjusted.

In some embodiments, the threaded sleeves 228 can be configured as cap nuts, with closed ends of the sleeves 228 opposite the tabs 226 ensuring the threaded fasteners 224 do not make contact with any electrical conductors within a junction box when the finishing ring 208 is adjusted. In some embodiments, tapering of the threaded sleeves 228 can provide a similar benefit, as well as increase electrical bonding as the threaded fasteners 224 are tightened. In some embodiments, the threaded sleeves 228 can be secured to the tabs 226 against axial movement in both directions, such as through exterior threading (not shown), welding or adhesives, snap-fit or other similar mechanical connections, and so on.

The lateral extensions 220 of the adjustable depth electrical wall mount ring 200 also differ somewhat from the tabs 120. For example, the lateral extensions 220 extend only partly along the elongate length of the finishing ring 208 and, in some cases, can be pivoted to fold flat against the lateral interior (or exterior) of the finishing ring 208. Further, to allow access to the threaded fasteners 224 for adjustment of the finishing ring 208, the lateral extensions 220 also define arced openings in alignment with the fasteners 224.

Figure 37:
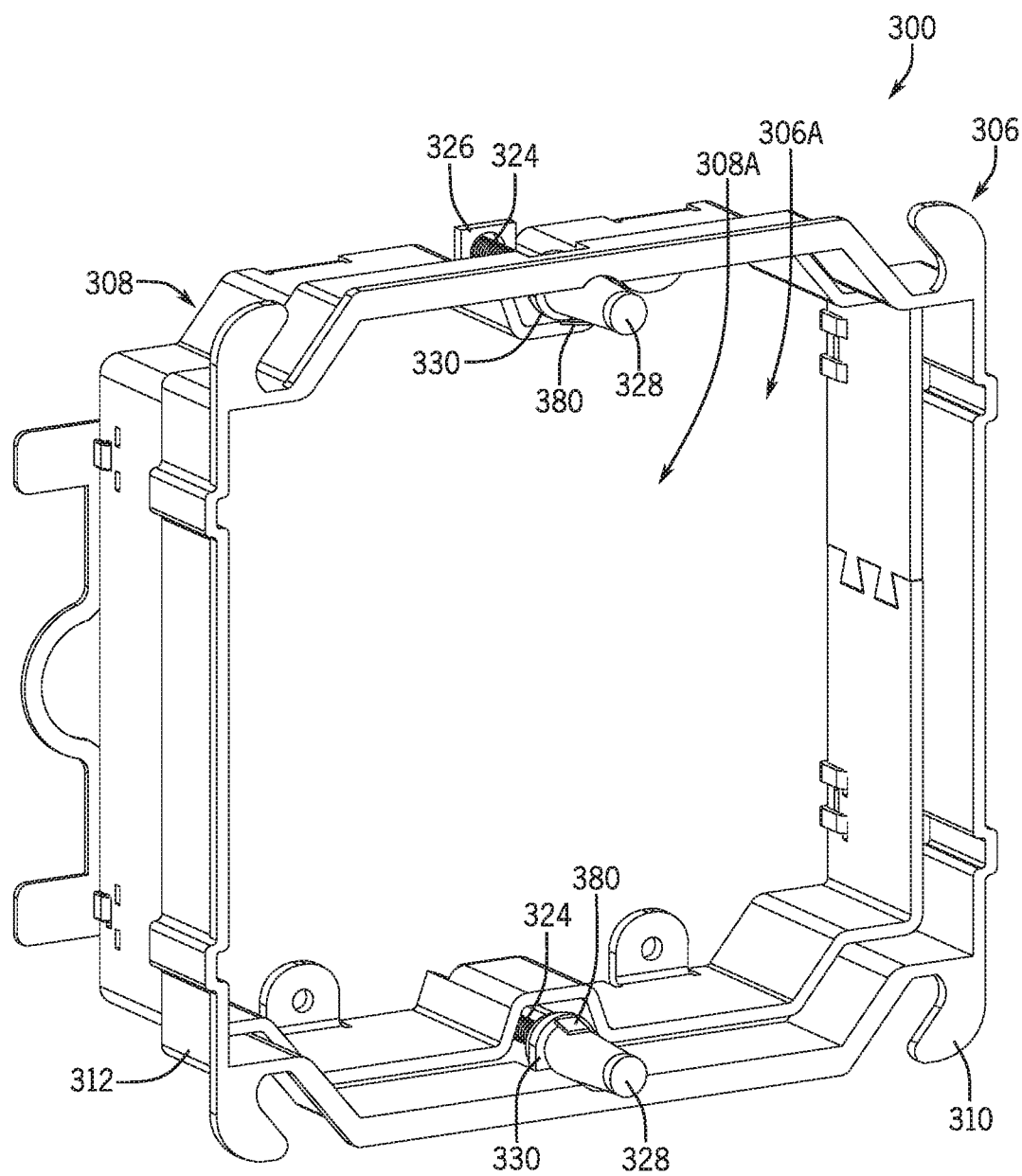
FIG. 37 is a rear isometric view of an adjustable depth electrical mount ring according to an embodiment of the invention.

FIG. 37 illustrates an adjustable depth electrical wall mount ring 300 according to another embodiment of the invention. In many aspects, the adjustable depth electrical wall mount ring 300 is similar to the adjustable depth electrical wall mount ring 200 described above, and can be similarly operated, and similar numbering in the 300 series is used for the adjustable depth electrical wall mount ring 300. For example, the adjustable depth electrical wall mount ring 300 has a base ring 306 and a finishing ring 308. Likewise, the base ring 306 has an attachment portion 310 and a ring portion 312, and the finishing ring 308 has a central opening 308A and is configured to move telescopically within a central opening 306A of the ring portion 312 of the base ring 306. Further, the finishing ring 308 includes laterally extending tabs 326 configured to support threaded fasteners 324, and the ring portion 312 of the base ring 306 includes inwardly extending tabs 330 to support threaded sleeves 328 that engage the threaded fasteners 324.

In some aspects, however, the adjustable depth electrical wall mount ring 300 differs from the adjustable depth electrical wall mount ring 200. For example, the base ring 306 and the finishing ring 308 are sized to support multiple electrical devices. In the illustrated embodiment, the rings 306, 308 can accommodate a two-gang installation. However, other embodiments can be sized to accommodate three-gang, four-gang, or any variety of other configurations. As another example, a set of spring tabs 380 are provided at the threaded sleeves 336, which can engage a rear side of the tabs 330 to secure the threaded sleeves 336 against movement when the finishing ring 308 is adjusted toward the retracted configuration. In other embodiments, other configurations are possible to provide similar effects, including arrangements in which a set of spring tabs (e.g., similar to the tabs 380) are provided on the tabs 330 to engage the threaded sleeves 336.

Figure 38:
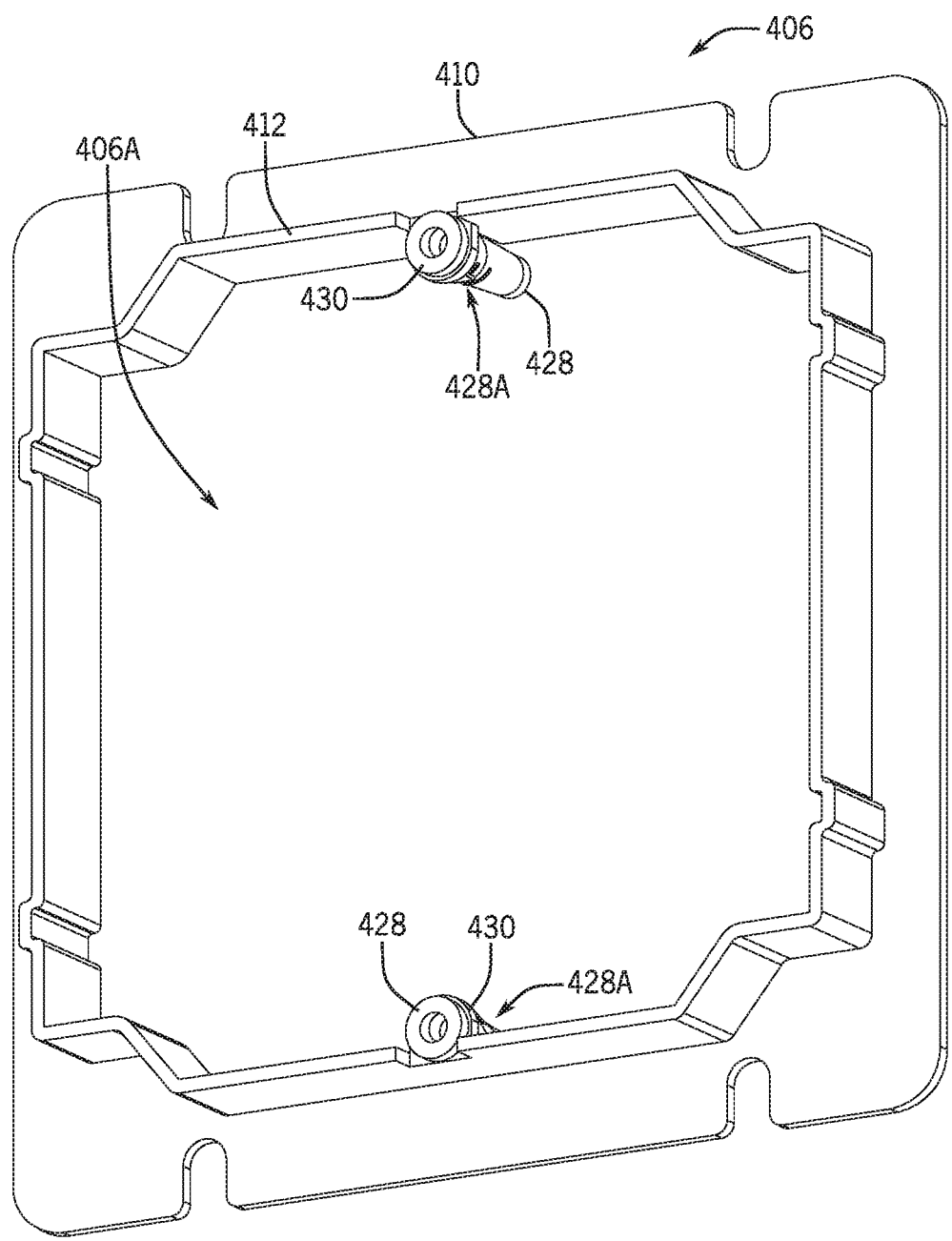
FIG. 38 is a front isometric view of a base ring of an adjustable depth electrical mount ring according to an embodiment of the invention.

FIG. 38 illustrates an example configuration of a base ring 406 according to another embodiment of the invention, such as may be used in combination with the finishing ring 308 (see FIG. 37) or in other multi-gang adjustable depth electrical wall mount rings. The base ring 406 is generally similar to the base ring 306, with an attachment portion 410, a ring portion 412, and inwardly extending tabs 430 that are configured to receive threaded sleeves 428. However, in some ways, the base rings 306, 406 differ. For example, the attachment portion 410 of the base ring 406 is configured to be attached to a larger junction box (e.g., a 4$^{11}$/₁₆" box) than is the attachment portion 310 of the base ring 306 (see FIG. 37). As another example, the threaded sleeves 428 have external threads 428A that can threadedly engage internal threads (not shown) on holes through the tabs 430 to prevent axial movement of the threaded sleeves 428 relative to the base ring 406 during adjustment of an associated finishing ring (not shown in FIG. 38).

In other embodiments, other configurations and methods are possible. In some embodiments not expressly illustrated or expressly discussed above, certain features and combinations of features that are presented with respect to particular embodiments in the discussion herein can be utilized in other combinations, as appropriate. For example, the disclosed arrangements of lateral extensions, threaded fasteners or other adjusters, associated threaded sleeves or holes, covers, electrical devices, and other components can generally be implemented interchangeably relative to a wide range of embodiments of an adjustable depth electrical wall mount ring or sub-assemblies thereof, consistent with the full scope of the disclosure herein.

In some implementations, installation methods according to the invention can include aspects other than those expressly described above. For example, installing an electrical device can include providing a base ring that includes an attachment (e.g., plate) portion and a ring portion that extends away from the attachment portion. The base ring can be secured to a junction box at the attachment portion with the ring portion extending away from a front opening of the junction box. A finishing ring can be provided that is sized to slide telescopically within the ring portion of the base ring. The finishing ring can have the electrical device secured thereto and can include one or more tabs. The electrical device can be installed after installing a wall layer. The method can further include installing the base ring in the wall structure prior to installing the wall layer, so that the ring portion is disposed to provide a guide for a first cutting operation to open the a wall layer for access to the front opening of the junction box. After the first cutting operation, the finishing ring can be installed into the ring portion of the base ring and the finishing ring can be telescopically adjusted relative to the ring portion of the base ring, to cause the one or more tabs to bear on an exterior surface of the a wall layer and thereby urge the junction box towards the a wall layer.

Some embodiments of a method of installing an electrical device can include providing a base ring that includes an attachment portion and a ring portion that extends away from the attachment portion. The base ring can be secured to a junction box at the attachment portion with the ring portion extending away from a front opening of the junction box. A finishing ring that is sized to slide telescopically within the ring portion of the base ring can be provided. The finishing ring can have the electrical device secured thereto and include one or more tabs. The electrical device can be installed before installing a wall layer. The method can include installing an assembly of the base ring, the finishing ring, and the electrical device prior to installing the a wall layer, with the finishing ring in a retracted configuration relative to the ring portion of the base ring and the ring portion or a cover over the electrical device disposed to provide a guide for a second cutting operation to open the a wall layer for access to the front opening of the junction box. The finishing ring can be telescopically extended relative to the ring portion of the base, after the second cutting operation. The finishing ring can be telescopically adjusted relative to the ring portion of the base ring, after the finishing ring is telescopically extended, to cause the one or more tabs to bear on an exterior surface of the a wall layer and thereby urge the junction box towards the a wall layer.

Some embodiments of a method of installing an electrical device can include securing a base ring to a junction box. A ring portion of the base ring can extend away from a front opening of the junction box. A finishing ring can be provided that is sized to slide telescopically within the ring portion of the base ring. An assembly of the finishing ring can be provided that is secured to the base ring and the junction box, with the finishing ring in a retracted configuration relative to the ring portion of the base ring, so that: the assembly can be configured to be installed in the wall structure prior to installing a wall layer; the finishing ring can be configured to be telescopically extended relative to the ring portion of the base, after a first cutting operation to open the a wall layer for access to the front opening of the junction box; and the finishing ring can be configured to be telescopically adjusted relative to the ring portion of the base ring, after being telescopically extended, to cause the one or more tabs to bear on an exterior surface of the a wall layer and thereby urge the junction box towards the a wall layer.

In some embodiments, an adjustable depth electrical wall mount ring for a junction box and an electrical device, for use with a wall layer, can include a base ring that includes an attachment portion and a ring portion that extends away from the attachment portion. The base ring can be configured to be secured to the junction box with the ring portion extending away from a front opening of the junction box. A finishing ring can be included that has one or more tabs, can be configured to secure the electrical device relative to the junction box, and can be sized to slide telescopically within the ring portion of the base ring between a retracted configuration and an extended configuration. One or more threaded fasteners can be included that extend between the base ring and the finishing ring. The one or more threaded fasteners can be configured to be actuated to telescopically adjust the finishing ring between the retracted and extended configurations. The one or more tabs can be configured to engage an exterior surface of the wall layer to urge the junction box towards the finishing ring and the wall layer, when the wall mount ring is installed with the finishing ring extending through an opening in the wall layer and the one or more threaded fasteners are actuated to move adjust the finishing ring towards the retracted configuration.

In some embodiments, the adjustable depth electrical wall mount ring can further include one or more threaded sleeves secured to the base ring to receive the one or more threaded fasteners. The one or more threaded sleeves can extend into the junction box when the base ring is secured to the junction box. The one or more threaded sleeves can entirely circumferentially enclose the one or more threaded fasteners over an entire length of each of the one or more threaded fasteners when the finishing ring is in the retracted configuration. The threaded sleeves can be threadedly secured to the base ring. The one or more fasteners can extend along the outside of the finishing ring towards the threaded sleeves. The one or more fasteners can extend along the inside of the ring portion of the base ring towards the threaded sleeves. The finishing ring can include one or more outwardly extending tabs to support the one or more fasteners and the ring portion of the base ring can include one or more inwardly extending tabs to support the threaded sleeves.

In some embodiments, the finishing ring can be flush with or retracted past a front lip of the ring portion of the base ring when the finishing ring is in the retracted configuration. The finishing ring can be spaced apart from the ring portion of the base ring in an extension direction when the finishing ring is in the extended configuration.

In some embodiments, one or more tabs can be removable from the finishing ring. The one or more tabs can be formed on a tab plate that is configured to extend along at least three sides of a central opening of the finishing ring when the tab plate is secured to the finishing ring. The tab plate can be configured to be secured to the finishing ring with a same set of fasteners as the electrical device.

In some embodiments, the base ring and the finishing ring can be sized to support multiple electrical devices.

While the invention herein disclosed has been described by means of specific embodiments and applications thereof, numerous modifications and variations could be made thereto by those skilled in the art without departing from the scope of the invention set forth in the claims.

I claim:

1. A method of configuring an electrical device for installation, the method comprising:

securing a base ring to a junction box, with a ring portion of the base ring extending away from a front opening of the junction box;

providing a finishing ring that is sized to slide telescopically within the ring portion of the base ring; and either of:

(a) separately providing a finishing ring assembly and the base ring secured to the junction box, with the finishing ring assembly including the finishing ring with the electrical device secured thereto, so that:

the base ring is configured to be installed in a wall structure prior to installing a wall layer, with the ring portion of the base ring or a cover arranged over the ring portion providing a guide for a first cutting operation to open the wall layer for access to the front opening of the junction box; and the finishing ring is configured to be installed into and telescopically adjusted relative to the ring portion of the base ring, after the first cutting operation, to align the electrical device with the front opening of the junction box and to cause one or more tabs that are coupled to the finishing ring to bear on an exterior surface of the wall structure and thereby urge the junction box towards the wall layer; and (b) providing a base ring assembly that includes the finishing ring secured to the base ring and the junction box, with the finishing ring in a retracted configuration relative to the ring portion of the base ring, so that:

the base ring assembly is configured to be installed in the wall structure prior to installing the wall layer;

the finishing ring is configured to be telescopically extended relative to the ring portion of the base, after a second cutting operation to open the wall layer for access to the front opening of the junction box, with the ring portion of the base ring or the cover providing a guide for the second cutting operation; and the finishing ring is configured to be telescopically adjusted towards to the junction box, after being telescopically extended, to cause the one or more tabs to bear on an exterior surface of the wall layer and thereby urge the junction box towards the wall layer.

2. The method of claim 1, further comprising:
securing the cover to block the front opening of the junction box so that the wall layer can be installed over the cover;
wherein the cover is configured to be removed after either of the first or second cutting operations to allow installation of the finishing ring into the ring portion of the base ring or installation of an electrical device into the finishing ring, respectively.

3. The method of claim 1, wherein the one or more tabs are configured to be attached to the finishing ring after the second cutting operation.

4. The method of claim 1, wherein the one or more tabs are configured to be attached to the finishing ring before the second cutting operation and to be adjusted after telescopically extending the finishing ring relative to the ring portion of the base to extend to bear on the exterior surface of the wall layer.

5. The method of claim 1, wherein the finishing ring is configured to be telescopically adjusted relative to the ring portion of the base ring by rotating one or more threaded fasteners that extend from the finishing ring to the base ring to cause the finishing ring to move in an axial direction defined by the one or more threaded fasteners.

6. The method of claim 5, wherein the one or more threaded fasteners are configured to extend from the finishing ring into one or more threaded sleeves within an interior volume of the junction box; and
wherein rotation of the one or more threaded fasteners to adjust the finishing ring relative to the ring portion does not extend the one or more threaded fasteners past the one or more threaded sleeves within the junction box.

7. The method of claim 5, wherein the one or more threaded fasteners electrically bond the finishing ring to the ring portion of the base ring with the finishing ring in the retracted configuration and a fully extended configuration.

8. The method of claim 1, wherein a front lip of the finishing ring is flush with or retracted past a front lip of the ring portion of the base ring toward the junction box when the finishing ring is in the retracted configuration.

9. The method of claim 8, wherein the finishing ring extends into the junction box by half or less of a total depth of the finishing ring when the finishing ring is in the retracted configuration.

10. The method of claim 9, wherein the finishing ring extends into the junction box by one half inch or less when the finishing ring is in the retracted configuration.

11. The method of claim 1, wherein the finishing ring is configured to be telescopically extended relative to the ring portion, after the first or second cutting operations, to be spaced apart from the ring portion of the base ring in an extension direction.

12. A method of configuring an electrical device for installation, the method comprising:
securing a plate portion of a base ring to a junction box, with a ring portion of the base ring extending away from the a front opening of the junction box;
securing an electrical device to a finishing ring as part of a finishing ring assembly, the finishing ring being sized to slide telescopically within the ring portion of the base ring;
securing the finishing ring assembly to the base ring and the junction box in a single assembly, so that:
the single assembly is configured to be installed in a wall structure prior to installing a wall layer, with the ring portion or a cover for the electrical device providing a guide for a cutting operation to open the a wall layer for access to the front opening of the junction box; and
the finishing ring is configured to be telescopically adjusted relative to the ring portion of the base ring, after the cutting operation:
to extend the finishing ring and the electrical device toward an exterior surface of the wall layer; and
subsequently, to telescopically adjust the finishing ring towards the junction box to cause one or more outward extensions on the finishing ring to bear on the exterior surface of the wall layer and thereby urge the junction box towards the wall layer.

13. The method of claim 12, further including:
securing the cover to the base ring as part of the single assembly so that the a wall layer can be installed over the cover;
wherein the cover is configured to be removed after the cutting operation to allow telescopic adjustment of the finishing ring.

14. The method of claim 12, wherein the one or more outward extensions on the finishing ring are configured as one or more tabs that are configured to be attached to the finishing ring after the finishing ring is extended toward the exterior surface of the wall layer.

15. The method of claim 12, wherein the one or more outward extensions on the finishing ring are configured to be moved from a retracted configuration to an extended configuration after the finishing ring is extended toward the exterior surface of the wall layer.

16. The method of claim 12, wherein the finishing ring is configured to be telescopically adjusted relative to the ring portion by rotating one or more threaded fasteners to cause the finishing ring to move in an axial direction defined by the one or more threaded fasteners.

17. The method of claim 16, wherein the one or more threaded fasteners extend along the outside of the finishing ring to engage one or more threaded sleeves within an interior volume of the junction box; and
wherein rotation of the one or more threaded fasteners to adjust the finishing ring relative to the ring portion does not extend the one or more threaded fasteners past the one or more threaded sleeves within the junction box.

18. The method of claim 17, further comprising:
threadedly securing the one or more threaded sleeves to the base ring.

19. The method of claim 16, wherein securing the finishing ring assembly to the base ring includes electrically bonding the finishing ring to the base ring via the one or more threaded fasteners.

20. The method of claim 17, wherein at least one of the one or more threaded sleeves is configured as a blind nut.

* * * * *